United States Patent [19]
Saburi et al.

[11] Patent Number: 5,760,931
[45] Date of Patent: Jun. 2, 1998

[54] IMAGE DISPLAY UNIT

[75] Inventors: Toshiki Saburi, Inazawa; Yasuhiro Mizutani, Inabe-gun; Naoyuki Kawazoe, Yokkaichi; Yoshiaki Fukatsu, Nagoya; Satoshi Koike, Kariya; Teiyuu Kimura, Obu; Shunichi Ogawa, Toyota; Takekazu Terui, Tokai; Hiroshi Ando, Nagoya; Masahiro Higuchi, Obu, all of Japan

[73] Assignee: Nippondenso Co., Ltd., Kariya, Japan

[21] Appl. No.: 290,753

[22] PCT Filed: Dec. 13, 1993

[86] PCT No.: PCT/JP93/01805

§ 371 Date: Oct. 13, 1994

§ 102(e) Date: Oct. 13, 1994

[87] PCT Pub. No.: WO94/14098

PCT Pub. Date: Jun. 23, 1994

[30] Foreign Application Priority Data

| Dec. 14, 1992 | [JP] | Japan | 4-333206 |
| Dec. 18, 1992 | [JP] | Japan | 4-338563 |
| Dec. 24, 1992 | [JP] | Japan | 4-344062 |
| Jan. 12, 1993 | [JP] | Japan | 5-003544 |
| Jun. 25, 1993 | [JP] | Japan | 5-155116 |
| Aug. 6, 1993 | [JP] | Japan | 5-215187 |
| Sep. 14, 1993 | [JP] | Japan | 5-252526 |
| Sep. 14, 1993 | [JP] | Japan | 5-252628 |
| Sep. 14, 1993 | [JP] | Japan | 5-252632 |
| Sep. 14, 1993 | [JP] | Japan | 5-252633 |

[51] Int. Cl.$^6$ ............. G03H 1/00; G09G 5/00; H04N 5/74
[52] U.S. Cl. ................ 359/13; 359/14; 359/25; 359/630; 359/637; 359/858; 345/7; 348/782
[58] Field of Search .................. 359/1, 13, 14, 359/15, 16, 630, 637, 858, 862, 863, 859, 25; 345/7-9; 348/744, 781-785

[56] References Cited

U.S. PATENT DOCUMENTS

| 3,940,204 | 2/1976 | Withrington . |
| 4,032,343 | 6/1977 | Demi et al. . |

(List continued on next page.)

FOREIGN PATENT DOCUMENTS

| 104114 | 5/1984 | European Pat. Off. . |
| 286962 | 10/1988 | European Pat. Off. . |

(List continued on next page.)

OTHER PUBLICATIONS

R.L. Fisher, "Design methods for a holographic head–up display curved combiner", Optical Engineering, Jun. 1989, pp. 616–621.

Hans–Jurgen Dobschal et al, "Beugungsgitter und Hohlspiegel Zugleich", Feinwerktechnik & Messtechnik, Feb. 1992 pp. 25–27.

R.J. Withrington, "Optical Design of a Holographic Visor Helmet Mounted Display", SPIE, Computer–Aided Optical Design, 1978, pp. 161–170.

*Primary Examiner*—Paul M. Dzierzynski
*Assistant Examiner*—Darren E. Schuberg
*Attorney, Agent, or Firm*—Cushman, Darby & Cushman IP Group of Pillsbury, Madison & Sutro LLP

[57] ABSTRACT

A heads-up display unit provided with a display device serving as display image forming means which displays a display image. A hologram serves as a reflecting means, and reflects the display light emitted from the display device, causing reflection of the display image on the interior surface of a vehicle's windshield. A display image is formed outside the windshield towards the front of the vehicle. A concave mirror having a different focal length in different directions is recorded in the hologram serving as a reflecting means so as to offset distortion of the display image caused by curvatures of the windshield. This construction makes it possible to cause the windshield to display a display image free from distortion.

20 Claims, 47 Drawing Sheets

U.S. PATENT DOCUMENTS

| | | |
|---|---|---|
| 4,361,384 | 11/1982 | Bosserman . |
| 4,880,287 | 11/1989 | Moss . |
| 4,981,332 | 1/1991 | Smith . |
| 5,144,459 | 9/1992 | Felske et al. ............... 359/13 |
| 5,172,252 | 12/1992 | Toyoshima et al. ............. 359/16 |
| 5,210,626 | 5/1993 | Kuwayama et al. ............. 359/13 |

FOREIGN PATENT DOCUMENTS

| | | |
|---|---|---|
| 324496 | 7/1989 | European Pat. Off. . |
| 479059 | 4/1992 | European Pat. Off. . |
| 2411436 | 11/1978 | France . |
| 2582414 | 11/1986 | France . |
| 62-173336 | 7/1987 | Japan . |
| 63-194222 | 8/1988 | Japan . |
| 2113218 | 4/1990 | Japan . |
| 2204714 | 8/1990 | Japan . |
| 2308120 | 12/1990 | Japan . |
| 2309314 | 12/1990 | Japan . |
| 3-69985 | 3/1991 | Japan . |
| 4-11525 | 1/1992 | Japan . |
| 4-56633 | 2/1992 | Japan . |
| 4118620 | 4/1992 | Japan . |
| 8903059 | 4/1989 | WIPO . |

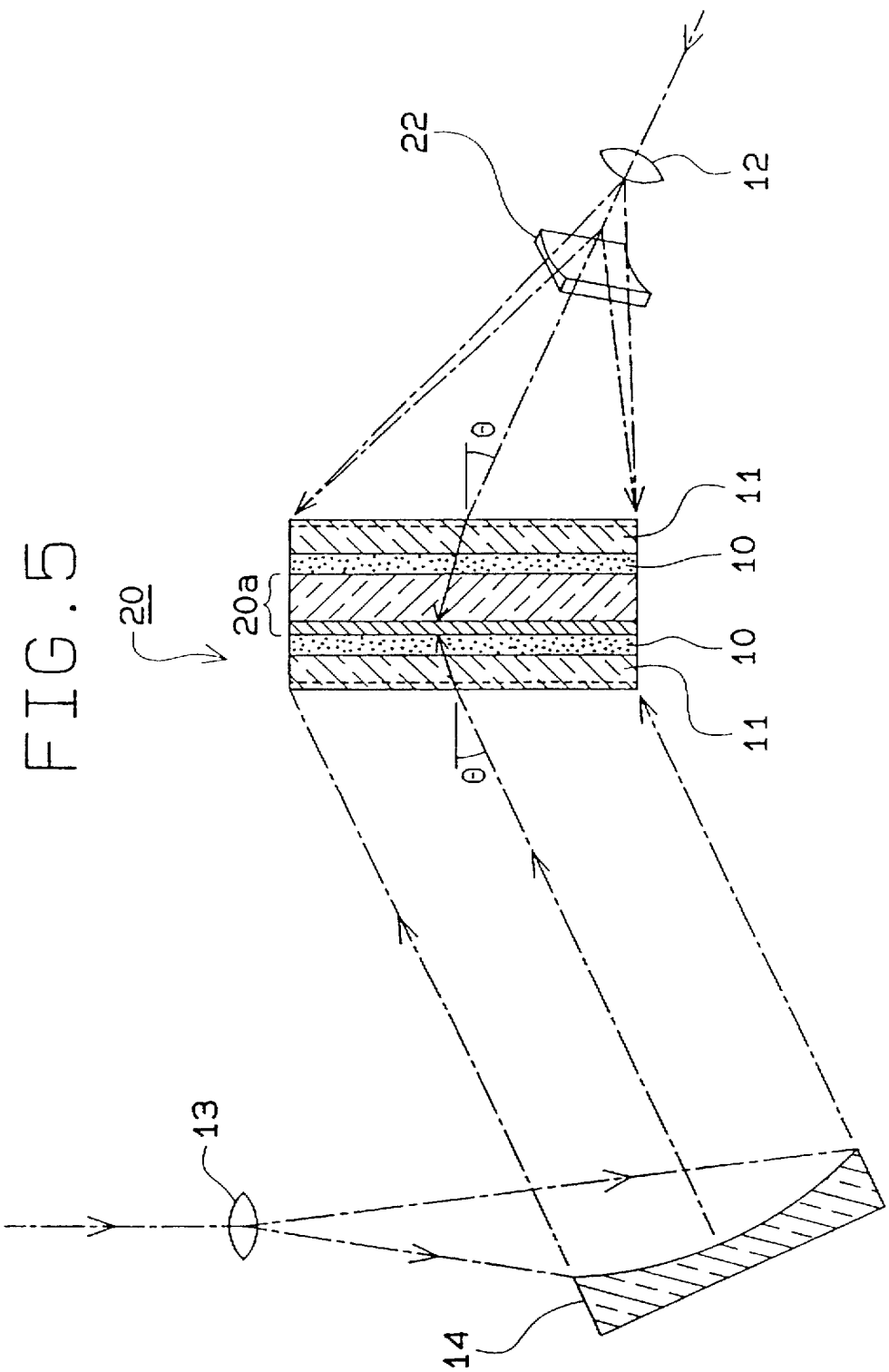

IMAGE DISPLAY UNIT

TECHNICAL FIELD

The present invention relates to an image display unit for displaying a virtual image, and more particularly, to an image display apparatus used as in a heads-up display unit.

BACKGROUND ART

A heads-up display unit, which enables driver visually monitor a meters or the like without averting his or her eyes from the road, is known in the art. This device projects an image of the meter onto the windshield, and forms an image externally in front of the windshield through the incidence of an image reflected by the windshield to the eyes of the driver.

However, such a display on the windshield causes distortion of the virtual image because the windshield itself is a curved surface having different curvatures in the longitudinal and transverse directions. Furthermore, the windshield is not always perpendicular to the display light.

In addition, it is necessary to enlarge the display light from the display because of the necessity of achieving a compact display image forming means with a view to downsizing the apparatus.

As an example of solving these problems the Japanese Patent Provisional Publication No. 4-11525 discloses a method which provides a lens for correcting the distortion of the image caused by the curved shape of the windshield, and separately provides a lens that enlarges the display image from the display unit.

With such a construction in which a lens is separately provided, the size of the entire apparatus becomes large, and poses problems of image distortion caused by the frequent passage of the display light through the lens and losses in the tone clarity of the displayed image.

The present invention was developed in view of the circumstances as described above. The object of the present invention is to provide an image display unit which permits enlargement of the image by means of a single member, and which supplies an image with clear color tones free from distortion.

DISCLOSURE OF THE INVENTION

The present invention provides an image display unit having a display image forming means which forms a display image, and a display means which forms the display image after causing a reflection of the display light emitted from the display image forming means. The display image forming means comprises a reflecting means, provided between the display image forming means and the display means. The display means consists of a member having simultaneously a function of enlarging the display light from the display image forming means, an optical path changing function of causing the display light enlarged by this enlarging function to enter the display means, and a correcting function of correcting the distortion of the display image formed by the display means.

BRIEF DESCRIPTION OF THE DRAWINGS

FIG. 5 is a descriptive view illustrating the optical system upon exposure of a hologram according to a third embodiment;

BEST MODE FOR CARRYING OUT THE INVENTION (First embodiment)

Figure 1:
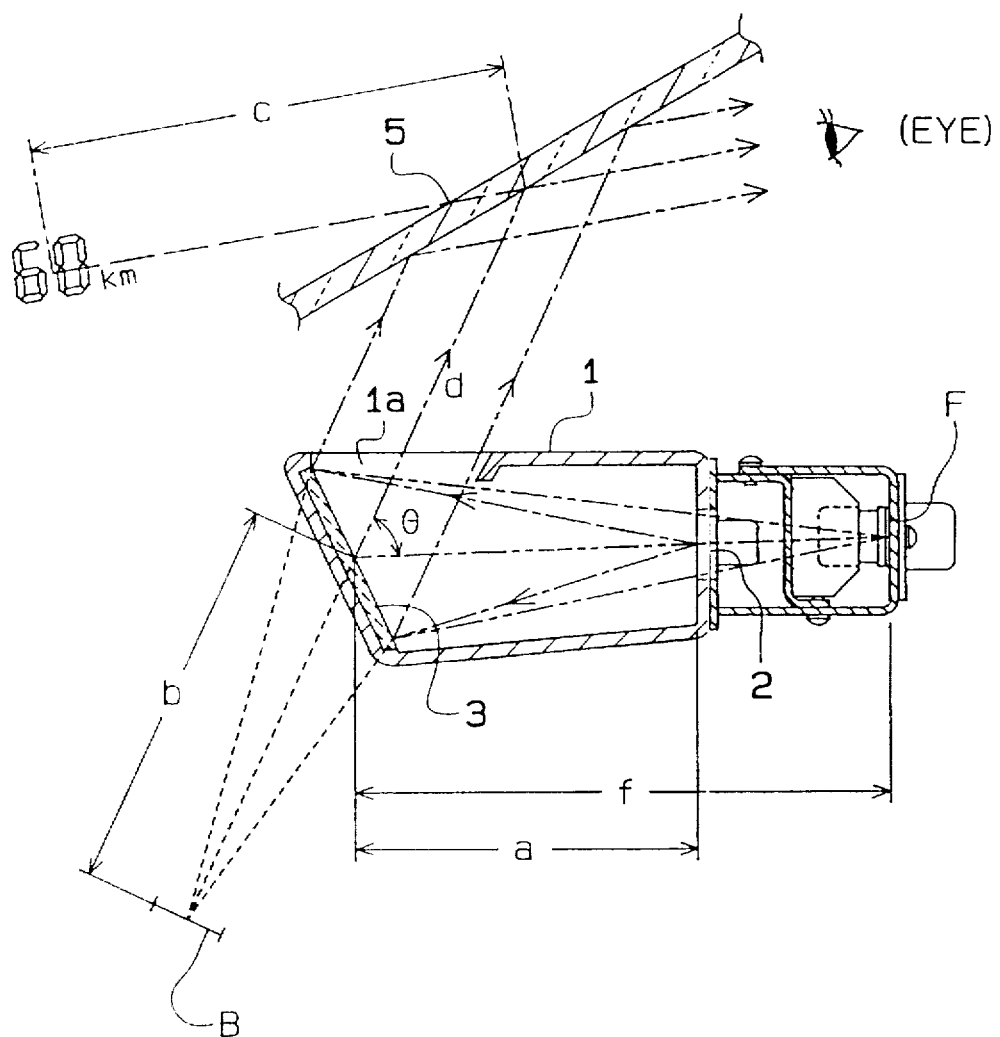
FIG. 1 is a schematic sectional constructional view of the heads-up display unit of a first embodiment of the present invention.

FIG. 1 is a schematic constructional view illustrating an embodiment in which the present invention is used with a heads-up display unit.

This heads-up display unit is to project an image of a meter or the like onto a windshield, causes light reflected by the windshield to enter the eyes of the driver, and thus forms an image externally in front of the windshield. This enables the driver to visually interpret a meter or the like without averting his or her eyes from the straight ahead position.

In FIG. 1, main body 1 of the heads-up display is attached to the interior of an instrument panel of an automobile. In the main body formed into a box-shaped case, display device 2 comprising a liquid crystal display which is a display image forming means is attached. A display image such as the speed indication image of an automobile, or a warning image is displayed by the action of a display control circuit (not shown).

Hologram 3 serves as a reflecting means and is attached at an angle and position which receives the display light of the display image emitted from the display device.

As described in detail below, hologram 3 has an optical path changing function causing a change in the optical path of the display light emitted from display device 2, an enlarging function of magnifying the display light from display device 2, and a correcting function of correcting the distortion of the display image.

Opening 1a for the discharge of light reflected by the optical path changing function of hologram 3 is formed in the upper portion of main body 1. The position of main body 1 is set so that the light reflected from hologram 3 goes up, is reflected from the inner side of the windshield 5 which is a display means located thereabove, and a display image formed from the display light enters the eyes of the driver.

A vapor-deposited film of a material such as titanium oxide is deposited as a semi-transmissive reflection film onto the inside of the windshield 5 serving as a combiner. A reflection plane may however be formed on the glass surface without depositing a vapor-deposited film.

Hologram 3 used here has a light reflecting characteristic for reflecting only light of a particular wavelength and is manufactured by exposing it to light of that particular wavelength, which is reflected from an off-axis parabolic concave mirror and recorded.

Figure 2:
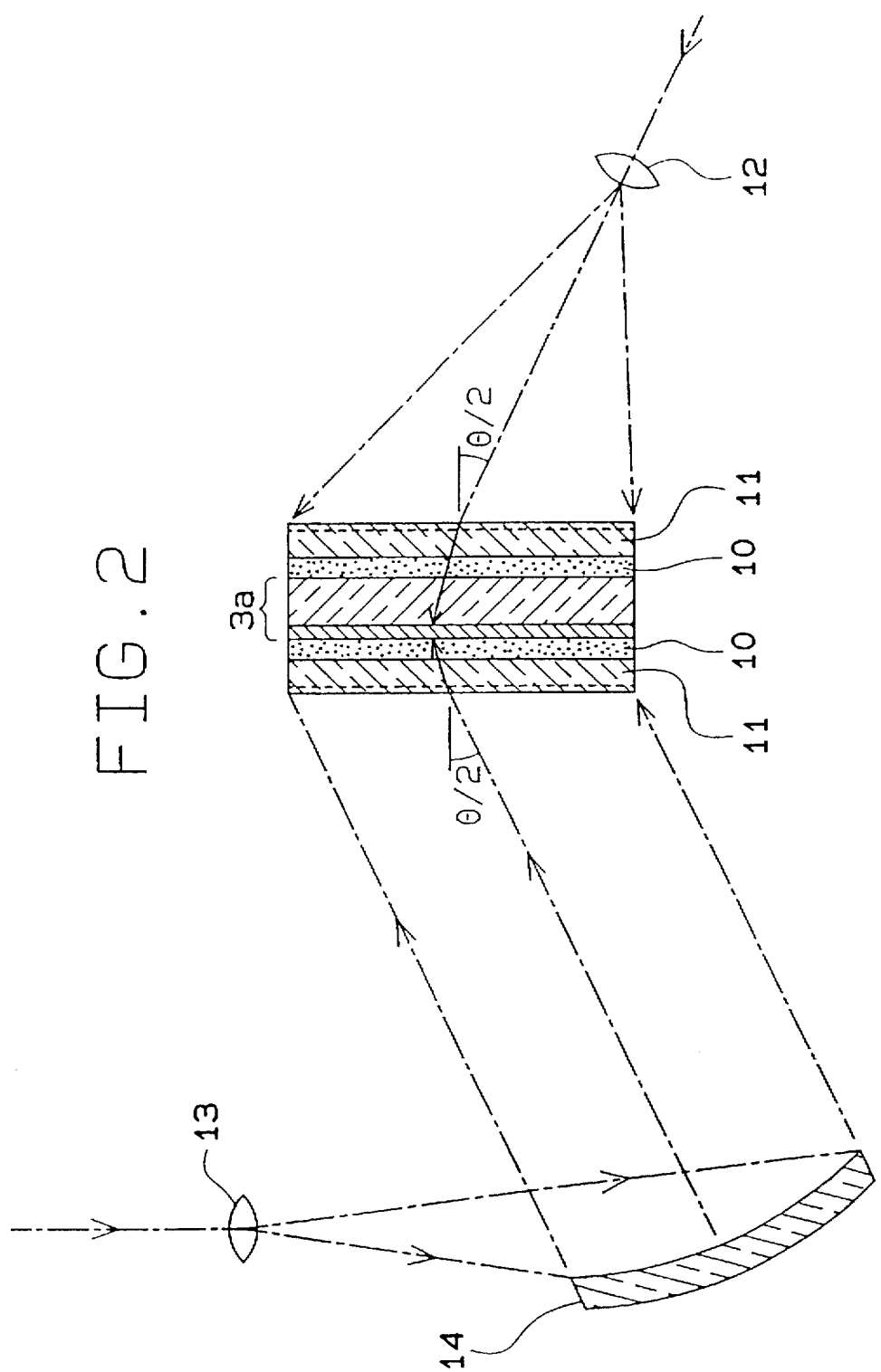
FIG. 2 is a schematic view illustrating the optical system upon exposure of a hologram 3.

Hologram 3 is made with the use of the optical system as shown in FIG. 2. In FIG. 2, 3a is a hologram dry plate which is formed by depositing gelatin bichromate serving as a photosensitive agent to a thickness of about 20 μm onto a substrate of a material such as soda glass, and drying the same. As shown in FIG. 2, glass plates 11 with reflection preventive films are closely adhered through refraction adjusting liquid 10 to both sides of hologram dry plate 3a which is in the middle. Hologram dry plate 3a in this state is arranged on a portion of the optical system so as to be exposed to both parallel and reference rays of the same wavelength from the both sides.

A laser beam having a wavelength of, for example, 514.5 nm is used as a light source. The optical system is arranged so that the laser beam emitted from a laser oscillator (not shown) passes through reference lens 12 and enters a side of hologram dry plate 3a. On the other side of hologram dry plate 3a, an off-axis parabolic concave mirror 14 is disposed obliquely in front of film 10a to 10b. The entire configuration is such that part of the laser beam emitted from the laser oscillator is irradiated through lens 13 onto off-axis parabolic concave mirror 14, and the parallel rays reflected from off-axis parabolic concave mirror 14 enter hologram dry plate 3a.

Figure 3:
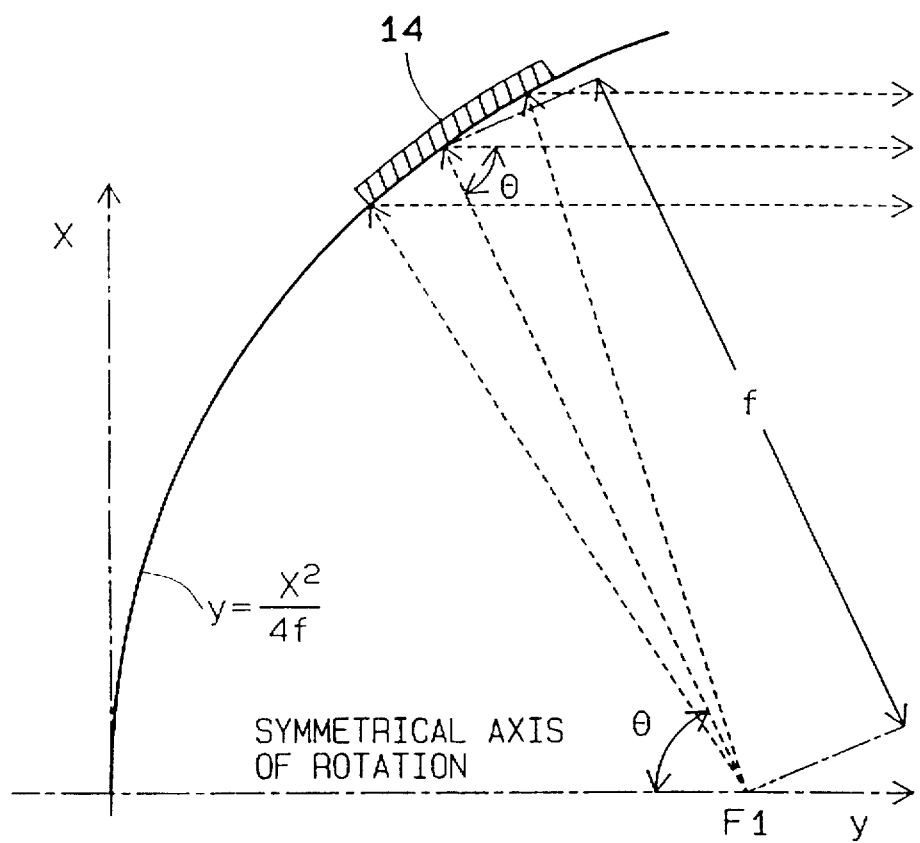
FIG. 3 is a descriptive view illustrating the off-axis angle θ of the off-axial parabolic concave mirror 14.

As shown in FIG. 3, off-axis parabolic concave mirror 14 is a concave mirror having the off-axis portion of a parabolic surface produced by rotating a parabolic curve of $y=x^2/4 f$, for example, around the y-axis, with an off-axis angle θ (67°, for example) and a focal length of f.

As shown in FIG. 2, the angle of incidence formed by the reference and parallel rays is set to half the off-axis angle θ of off-axis parabolic concave mirror 14.

Hologram 3 is prepared, with the use of such an optical system, by exposing the hologram dry plate 3a to the parallel and reference rays, and subjecting the exposed dry plate to development and fixing treatments. The image of the off-axis parabolic concave mirror is recorded as an interference fringe on this hologram 3.

Cover plates of an epoxy resin are closely adhered via a sealing agent to the thus prepared hologram 3 in a sandwich shape from both sides to prevent scattering or reflection on the surface and to avoid deterioration of the hologram layer, and forming a reflection preventive film and a scattering preventive film on the surfaces of the face and back cover plates. As shown in FIG. 1, the above-mentioned hologram 3 is attached in the interior of main body 1 of the heads-up display unit, at an angle θ (the off-axis angle of the off-axis parabolic concave mirror as recorded in the hologram) relative to the optical axis of display device 2.

In a heads-up display unit having the construction as described above, and shown in FIG. 1, the display light of a display image such as a speed indication image or a warning image emitted from display device 2 enters hologram 3 in the main body 1, is diffracted in the hologram 3 and reflected. Rays having a particular wavelength of the display light go upward from opening 1a, and are reflected on the inside of windshield 5. A display image thus formed from the display light enters the eyes of the driver. As a result, to the eyes of the driver, the speed image as a display image displayed on display device 2 is visually interpreted as an image projected in front of the windshield 5. At this point, as shown in FIG. 1, the focal point F of the off-axis parabolic concave mirror recorded in the hologram 3 is located behind display device 2, and the distance between the focal point F and center of hologram 3 becomes focal length f. If the distance between display device 2 and hologram 3 is a, the distance between the virtual image B of the display image produced on back of the hologram 3 and the center of the hologram is b, and the curvature of the windshield is G, the following formula is valid: $1/b=(1/a)-(1/f)$. If the distance between the reflection point of the windshield and display image is c, and the distance between the hologram 3 and the reflection point of the windshield is d, the following two formulae are valid: $1/c=1/(b+d)-(1/G)$, and the enlargement ratio $m=b\cdot c/a(b+d)$. This means that by taking an enlargement ratio m of the display image of a value larger than 1, an enlarged image will be displayed.

As described above, the off-axis parabolic concave mirror is recorded on hologram 3, and hologram 3 is arranged so that the angle formed between the optical axis of incidence on the display device 2 side and the optical axis of emission on the windshield side becomes equal to off-axis angle θ of the off-axis parabolic concave mirror. There occurs therefore no aberration in the display image formed as a virtual image B, and the driver can visually interpret a display image free from distortions or blurs.

It is therefore possible to obtain a display image free from distortion even by enlarging the display by raising the expansion ratio, thus permitting an enlarged display at a high expansion ratio. When displaying a display image of a prescribed size, consequently, the display screen of the display device may be reduced, and the distance a between the display device and hologram may be shortened.

In the above-mentioned first embodiment, the concave mirror has been recorded on the hologram by the double beam method of forming two beams upon exposure, and causing the parallel and reference rays to enter the hologram dry plate from both sides thereof. However, the concave mirror may also be recorded by a single beam method which comprises bringing a concave reflecting plate into contact with the back of the hologram dry plate, allowing incidence from the surface side, and accomplishing exposure with the direct rays from the surface and the reflected rays from the back.

While a concave reflection plate has been employed in the above-mentioned embodiment, a convex mirror may be used instead.

A hologram prepared with two beams may be used as the master for duplication.

(Second embodiment)

Figure 4:
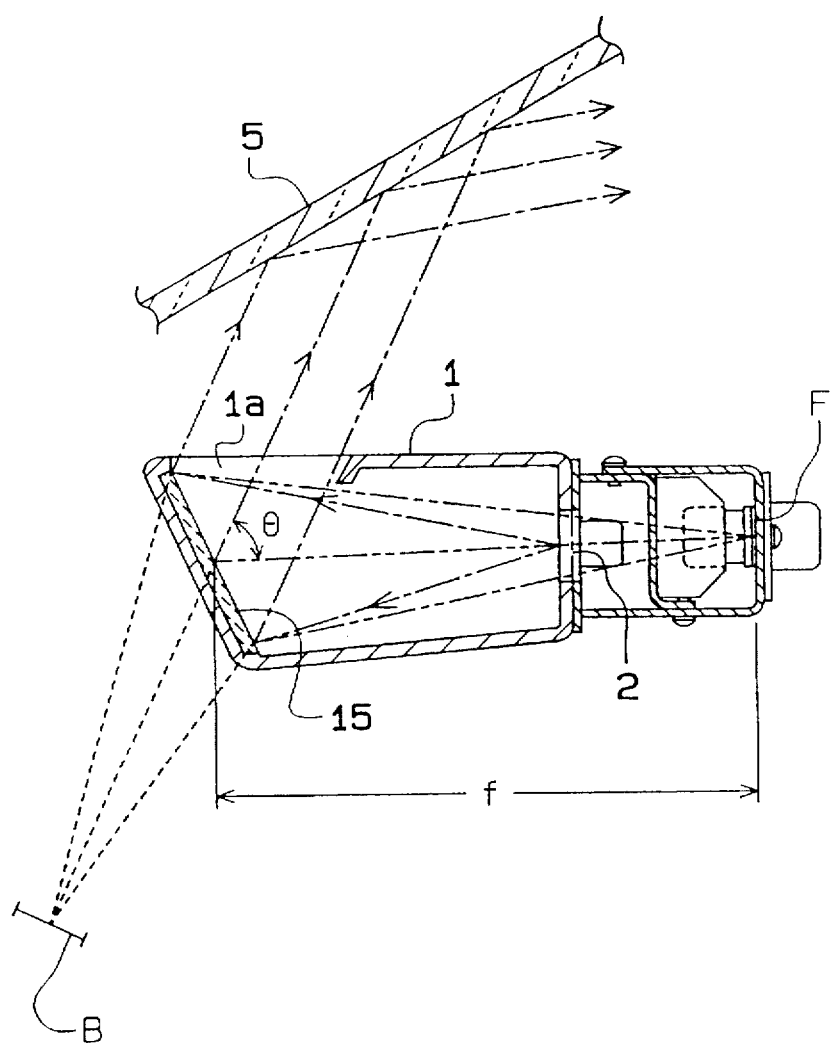
FIG. 4 is a schematic sectional constructional view of the heads-up display unit of a second embodiment.

FIG. 4 is a schematic constructional view of a second embodiment.

In this embodiment, off-axis parabolic concave mirror 15 is used directly in place of hologram 3 described above. More specifically, a display device 2 serving as display image forming means which comprises a liquid crystal display and the like is attached to the right end of main body 1 formed into a box-shaped case, and an off-axis parabolic concave mirror 15, which is a reflecting means is attached in an inclined posture to the left end of the main body 1 at a position where the mirror receives the display light reflected from the display device 2.

An opening 1a for discharging the display light reflected from off-axis parabolic concave mirror 15 is formed in the upper portion of main body 1. The light reflected from the off-axis parabolic concave mirror 15 goes upward, is reflected on the inside of windshield 5 serving as display means located thereabove, and enters the eyes of the driver.

Off-axis parabolic concave mirror 15 is, like the above-mentioned off-axis parabolic concave mirror 14, a concave mirror having an off-axis portion of a parabolic plane produced when rotating a parabolic curve of, for example, $y=x^2/4 f$ around the y-axis, having an off-axis angle θ (67°, for example) and a focal length of f. Off-axis parabolic concave mirror 15 is provided in main body 1 so that the angle between the optical axis of incidence on the display device 2 side and the optical axis of emission on the windshield side becomes the off-axis angle θ thereof.

In a heads-up display unit as described above, as shown in FIG. 4, the display light of an image display such as a speed image or a warning image emitted from display device 2 enters off-axis parabolic concave mirror 15 in main body 1, and the light reflected from off-axis parabolic concave mirror 15 goes up through opening 1a, is reflected from the inside of the windshield 5, and enters the eyes of the driver.

(Third embodiment)

As in the first embodiment, as viewed from the driver, the speed image displayed by display device 2 is visually interpreted as an image projected in front of windshield 5. Since off-axis parabolic concave mirror 15 is used and arranged so that the angle between the optical axis of incidence and the optical axis of projection becomes the off-axis angle θ thereof, no aberration occurs in the display image formed as a virtual image B, as in the first embodiment, and a display image free from distortions or blurs can be interpreted clearly.

Table 1 shows the results of experiments carried out to confirm the effects available in the first and the second embodiments. In the first embodiment, holograms recording three kinds of off-axis parabolic concave mirror, respectively, were used with focal lengths f of 500 mm, 400 mm and 260 mm. In the second embodiment, the same three kinds of off-axis parabolic concave mirror were used as in the first embodiment, with focal lengths of 500 mm, 400 mm and 260 mm. In the first comparative example, a conventional spherical concave mirror was employed.

For each apparatus, display was carried out while gradually raising the expansion ratio, and the maximum expansion ratio up to which no blurring was produced in the display image was determined through functional evaluation.

TABLE 1

|  | Focal length, f | Maximum expansion ratio with no distortion |
| --- | --- | --- |
| Embodiment 1 | 500 (mm) | 3.6 (magnifications) |
|  | 400 | 3.6 |
|  | 260 | 2.4 |
| Embodiment 2 | 500 (mm) | 3.6 |
|  | 400 | 3.6 |
|  | 260 | 2.2 |
| Comparative example | 500 | 1.4 |
|  | 400 | 1.4 |
|  | 260 | 1.2 |

The experimental results shown in Table 1 suggest that in the case where a hologram recording the off-axis parabolic concave mirror is adopted as the reflecting means (the first embodiment), and in the case where the off-axis parabolic concave mirror is used directly as the reflecting section of the display light (the second embodiment), display can be accomplished without the occurrence of blurring at an expansion ratio about 2 to 2.5 times as large as that in the case where a conventional spherical concave mirror is used (the first comparative example).

Although, in the first and the second embodiments, an off-axis parabolic concave mirror has been employed as the concave mirror, any other non-spherical concave mirror giving only a slight aberration such as an off-axis elliptical concave mirror or a toroidal concave mirror may well be employed.

Furthermore, it is not always necessary to place main body 1 of this apparatus directly below the windshield to emit the image vertically upward, but the main body 1 of the apparatus may be installed with a slight inclination at a position slightly off the point directly below the windshield.

While, in the above-mentioned first and second embodiments, a liquid crystal display has been adopted as the display device serving as display image forming means, the present invention is not limited to a liquid crystal display, but display image forming means comprising an EL display device or a CRT may well be used.

In the third embodiment, unlike hologram 3 in the first embodiment, hologram 20 having a better correcting function for correcting the distortion of the display image is provided, with all the other requirements kept the same as in FIG. 1.

Hologram 20 used in this embodiment has the characteristic of only reflecting light of a particular wavelength, by exposing it to light of that particular wavelength, and a concave mirror with only a slight aberration such as an off-axis concave mirror is recorded. Hologram 20 of the third embodiment is, furthermore, manufactured so that the longitudinal and transverse focal lengths (expansion ratio) of the concave mirror may differ in response to the curvature (1/radius) of the inside of the windshield 5.

Since the concave mirror, not susceptible to aberration, is recorded in the hologram 20 of the third embodiment as described above, it has an optical path changing function and an enlarging function, and in addition, it is formed so as to cause a difference in the focal length (expansion ratio) between the longitudinal and transverse directions of the concave mirror. It has therefore a correcting function at the same time.

Now, the way the hologram of the third embodiment is made is described.

Hologram 20 is manufactured by exposing it to the optical system shown in FIG. 5. In FIG. 5, 20a is a hologram dry plate which is formed by depositing gelatin bichromate as the photosensitive agent to a thickness of about 20 μm on a substrate of a material such as soda glass. On both sides of hologram dry plate 20a, glass plates 11 with reflection preventive films are closely adhered through refraction adjusting liquid 10 with the dry plate in the middle, as shown in FIG. 5. Then, hologram dry plate 20a in this state is disposed in a section of the optical system so as to permit exposure to both parallel and dispersion rays of the same wavelengths.

For example, a laser beam having a wavelength of 514.5 μm is used, and the optical system is arranged so that the laser beam emitted from a laser oscillator (not shown) passes through reference lens 12 and cylindrical lens 22 for adjusting the focal length, and enters a side of the hologram dry plate as a reference light. On the other side of the hologram 20a, off-axis parabolic concave mirror 14 is disposed obliquely in front thereof, and part of the laser beam emitted from the same laser oscillator is irradiated through the lens 13 onto the concave mirror 14. Parallel rays reflected from the concave mirror 14 enter the hologram dry plate 20a.

As shown in FIG. 5, the angle of incidence θ between the reference and parallel rays to hologram dry plate 20a is set, for example, to θ=33.5° to meet the reproduction angle upon actual application of hologram 20 to a heads-up display.

Figure 6A:
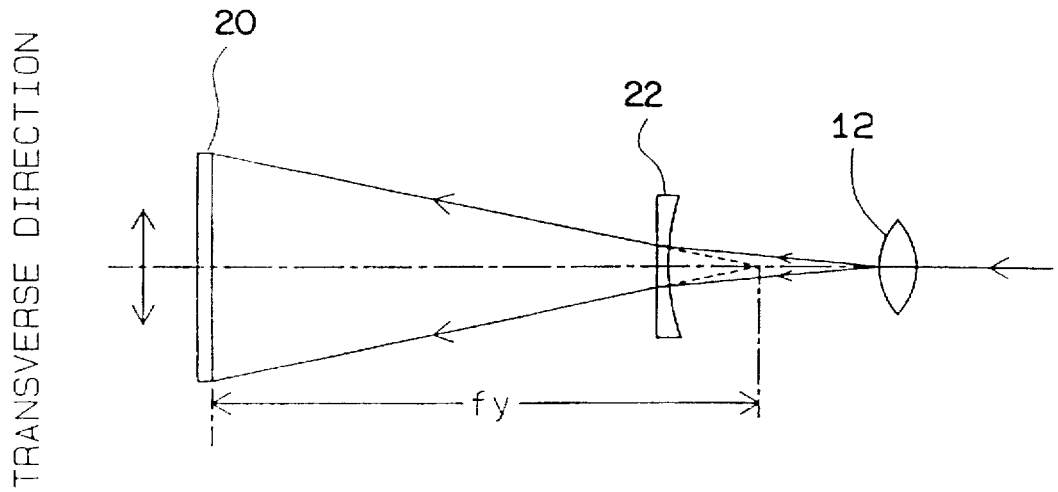
FIG. 6a and FIG. 6b are views illustrating the focal lengths in various directions of a cylindrical lens 22.
Figure 6B:
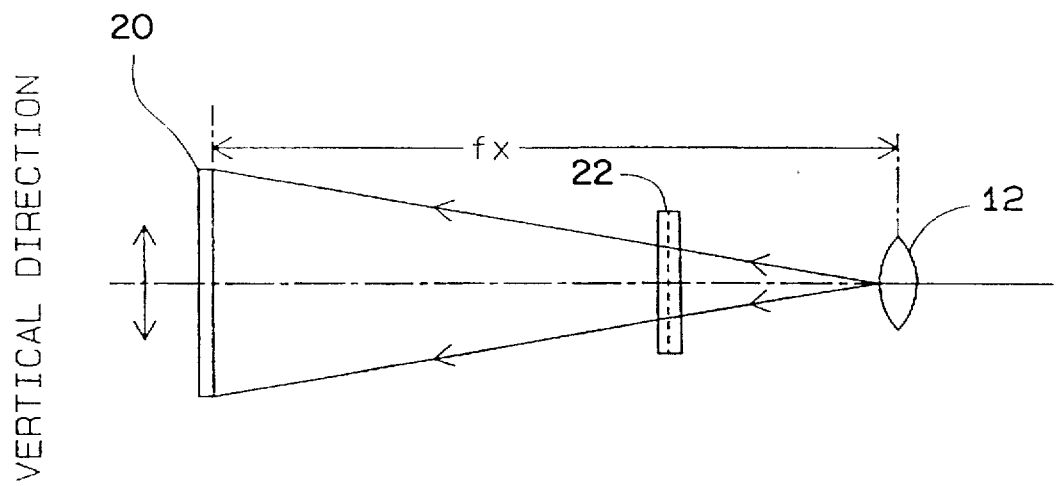

Cylindrical lens 22 is mounted on a part of the optical system on the dispersion ray side so as to offset the enlargement distortion of the display image caused by the curvature of windshield 5. The curvature of windshield 5 differs in the longitudinal and transverse directions. As shown in FIGS. 6(a) and (b) therefore, cylindrical lens 22 is formed with a focal length fy in the transverse direction on the plan surface of lens 22 of, for example, 400 mm, and a longitudinal focal length fx in vertical direction, for example, 450 mm, and is disposed, as shown in FIG. 5, between lens 12 and hologram dry plate 20a.

The hologram 20 is prepared, using the optical system shown in FIG. 5, by exposing hologram dry plate 20a to both reference and parallel rays, and subjecting the exposed dry plate to prescribed development and fixing treatments. Concave mirror 14 is recorded on hologram 20 as an interference fringe in the state in which the longitudinal and transverse focal lengths fx and fy of concave mirror 14 are corrected in response to the curvature of windshield 5.

Thus prepared hologram 20 is perfected by bringing epoxy resin cover plates into close contact via a sealing agent with the surface and back of the hologram 20 in a sandwich shape, and then forming a reflection preventive film and a scattering preventive film on the surfaces of the cover plates to prevent scattering or reflection on the surface and avoid deterioration of the hologram layer. Hologram 20 of the third embodiment is attached to the interior of main body 1 of the heads-up display unit in the manner shown in FIG. 1 at a prescribed angle $\theta$ (33.5°) relative to the optical axis of the display device 2.

In the heads-up display unit having the construction as described above and shown in FIG. 1, the light of a display image such as a speed indication image or a warning image emitted from display device 2 is projected as a display light and enters hologram 20 in the main body 1. This display light is diffracted, and the reflected light of a particular wavelength goes upward through opening 1a, and is reflected again from the inside of windshield 5. A display image formed from the reflected display light enters the eyes of the driver.

To the eyes of the driver, therefore, the speed image displayed on display device 2 is visually interpreted as an image projected in front of windshield 5. At this moment, as shown in FIG. 1, the focal point F of the concave mirror recorded in hologram 20 is located behind display device 2. Consequently, the focal length f of the display image becomes longer than distance a between display device 2 and hologram 20. If it is assumed that a virtual image B of the display image is produced on the back of hologram 20, the distance between the virtual image B and the hologram 20 becomes longer than the distance a. As a result, the expansion ratio m of the display image (m=b/a) exceeds 1, thus permitting display of an enlarged image onto windshield 5.

As described above, the concave mirror is recorded in the hologram 20 by causing dispersion rays to enter hologram dry plate 20a through cylindrical lens 22 having different focal lengths in the longitudinal and transverse directions with, for example, a longitudinal focal length fy of 400 mm and a transverse focal length fx of 450 mm. When the display image refracted and reflected from hologram 20 is reflected on the inside of windshield 5, the distortion of the image is corrected by the transverse curvature of windshield 5. Consequently, the driver can visually interpret a display image free from distortions or blurs, and particularly, it is possible to give an enlarged display without distortion or blur even when the eyes of the driver shift to the periphery of the hologram.

Figure 7:
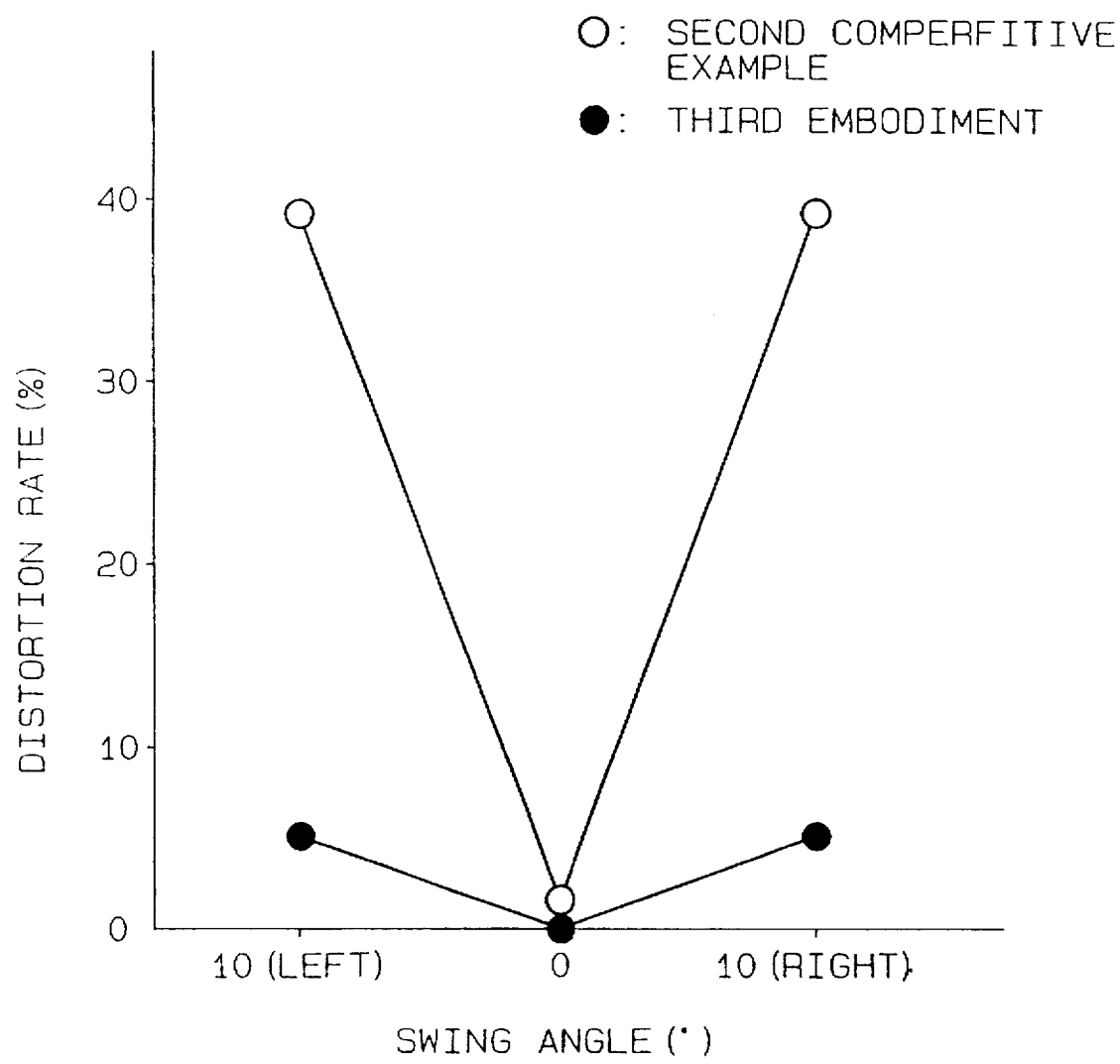
FIG. 7 is a graph illustrating the amount of image distortion upon visual recognition of the display images in the third embodiment and the second comparative example.

FIG. 7 illustrates the amount of distortion of the display image observed when displaying the image by the use of the heads-up display unit of the third embodiment, and the amount of distortion of the display image observed when using a hologram made by causing ordinary reference rays not corrected upon recording of the hologram to enter the hologram dry plate as the second comparative example.

The units of the first comparative example and the third embodiment use a display device having a display screen with a length of 13 mm and a width of 30 mm, are attached to a hologram having a length of 50 mm and a width of 110 mm, and set with a distance between the display device and the hologram of 250 mm, a distance between the hologram and the windshield of 140 mm, and a distance between the windshield and the observer of 900 mm. Changes in the amount of distortion taking place in the display image to be visually interpreted were measured by shifting the eyes of the observer 10° horizontally.

The graph shown in FIG. 7 suggests that, in the second comparative example making no correction of the hologram in response to the curvature of the windshield upon recording, a shift of the observer's eyes by 10° led to an amount of distortion in the display image of about 40%, whereas the same shift of the eyes showed a reduction of about 5% in the amount of distortion of the display image in the third embodiment.

In the third embodiment, it has been assumed that the windshield has a large transverse curvature and almost no curvature in the longitudinal direction. When the longitudinal curvature is larger, however, it suffices to adjust the focal distance of the concave mirror to be recorded in the hologram in response to the direction and extent of curvature by means of the installation angle of the cylindrical lens and the use of another lens.

In the third embodiment, furthermore, an off-axis parabolic concave mirror was recorded in the hologram, but a non-spherical mirror with a slight aberration may be recorded, and the hologram may simply be one having the reflection characteristics of a concave mirror with different longitudinal and transverse curvatures.

In the third embodiment also, the concave mirror was recorded in the hologram by the double beam method comprising making two beams upon exposure, and causing the parallel and reference rays to enter the hologram dry plate from both sides thereof. Recording may be accomplished by the single beam method comprising attaching a concave reflecting plate to the back of the hologram dry plate, allowing in only the rays from the surface, and conducting exposure with a direct ray from the surface and a reflected ray from the back.

Although a concave reflecting plate was used in the above-mentioned embodiments, a convex mirror may be recorded by adopting a convex reflecting plate.

A hologram prepared by means of two beams may be used as the master for duplication.

It is not always necessary that main body 1 of the apparatus of the third embodiment should be located directly below the windshield for projecting vertically upward. Main body 1 may be installed at a position slightly off the point directly below the windshield and be slightly aslant.

In the third embodiment, a liquid crystal display has been adopted as the display device serving as the display image forming means. The invention is not, however, limited to a liquid crystal display, but may use a display image forming means comprising an EL display device or a CRT.

In the third embodiment, the reflecting means was formed by a hologram. In the present invention, however, it is not necessary to form the reflecting means with a hologram, but an off-axis concave mirror having different longitudinal and transverse curvatures for correcting the distortion of the image caused by the windshield or a non-spherical mirror with a slight aberration may be used, or the means may be a concave mirror having simply different curvatures in different directions.

(Fourth embodiment)

Figure 8:
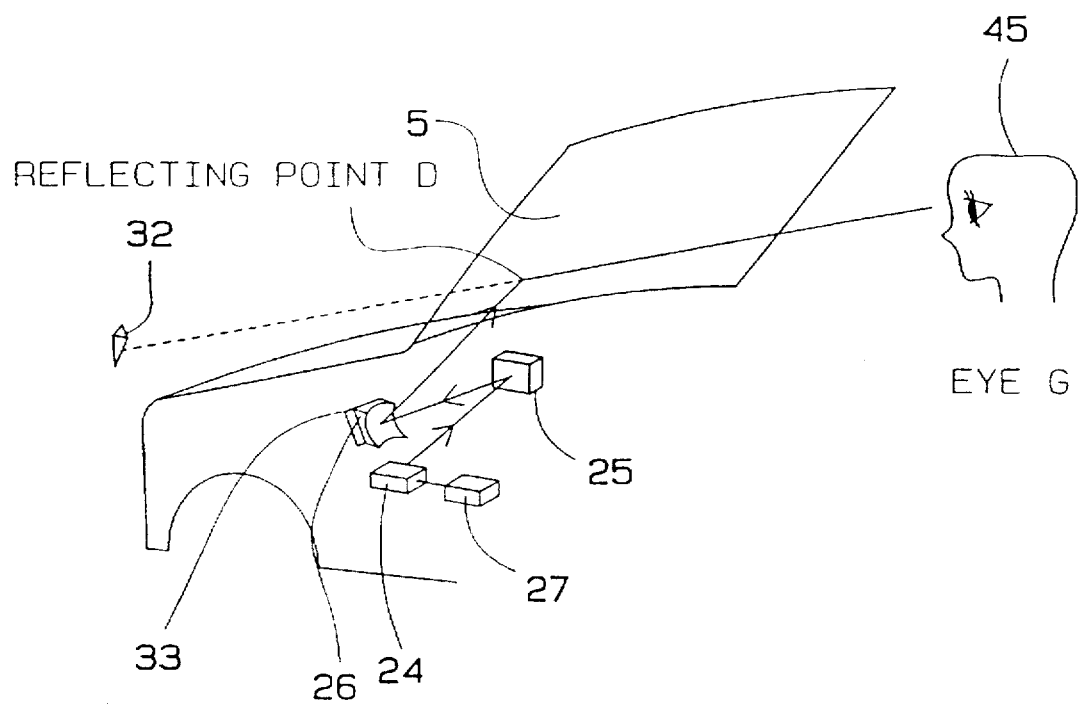
FIG. 8 is a schematic perspective view of the image display unit of the third embodiment.

As an example of the image display unit in the fourth embodiment, a leading end position display unit for a vehicle is illustrated in FIG. 8. In FIG. 8 the same reference numerals are assigned to the same components as in the first embodiment.

This unit is provided with display device 24, serving as a display image forming means, provided in the dashboard (not shown) of an automobile, flat mirror 25 sequentially reflecting the image light projected from display device 24, toroidal concave mirror 26 serving as a reflecting means, and control circuit 27 for controlling display device 24 and toroidal concave mirror 26.

Figure 12:
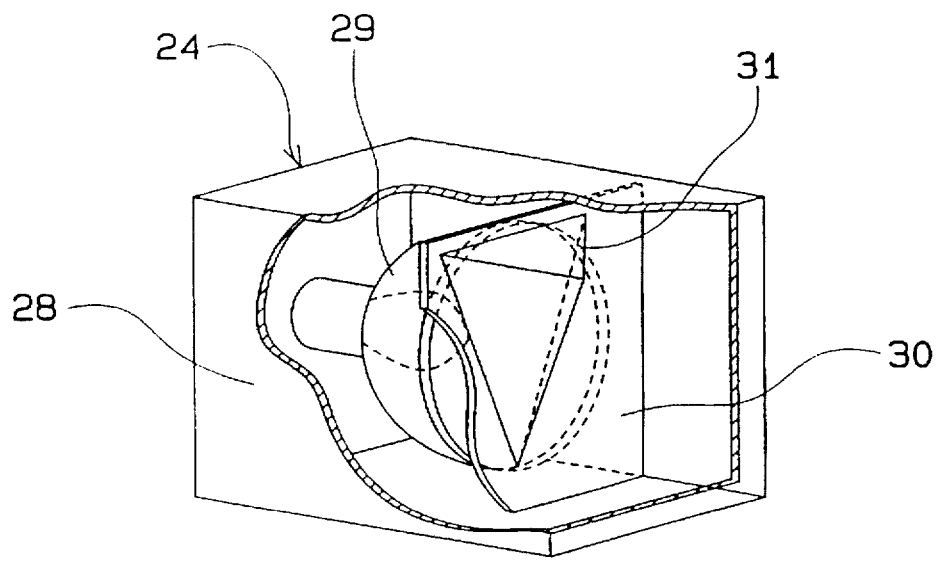
FIG. 12 is a partially cutaway perspective view of the display unit in FIG. 8.

Display device 27 serves as a display image forming means. Display device 27 is formed, as shown in FIG. 12, by arranging halogen lamp 29 with a reflector, for example, in box-shaped case 28, providing a light diffusing plate (not shown), such as frosted glass, in front of lamp 29, and attaching end mark display section (hereinafter simply referred to as "display section") 31, having a light transmitting section with a color filter at the center, with a covered periphery, on transparent plate 30 such as a glass plate provided in front of it.

Figure 9:
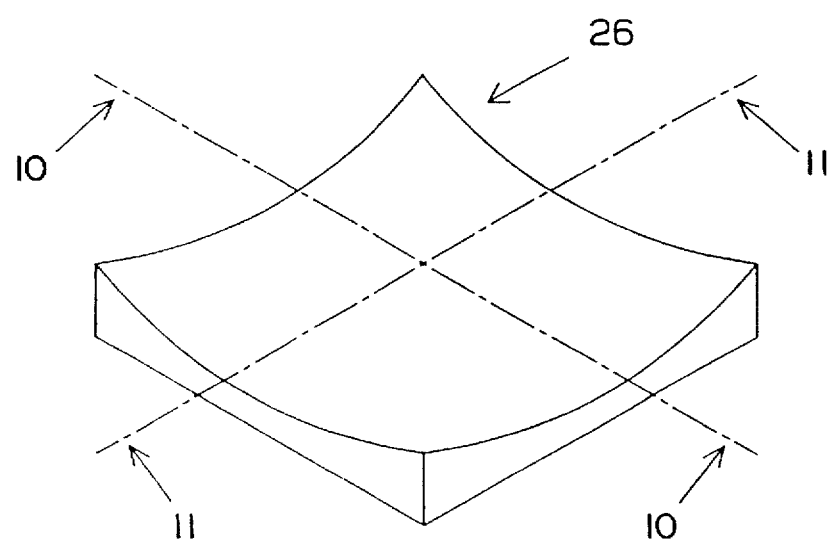
FIG. 9 is a perspective view of a toroidal concave mirror of the unit shown in FIG. 8.

Toroidal concave mirror 26 is formed, as shown in FIG. 9, by vapor-depositing a silver or aluminum reflecting layer on a substrate made of a synthetic resin, for example. The mirror surface is calculated from the horizontal curvature at reflecting point D on the windshield 5 serving as the display means, and display position of the display mark (a virtual image of the display section 31; see FIG. 8) 32. The details of this concave mirror are described below.

Figure 13:
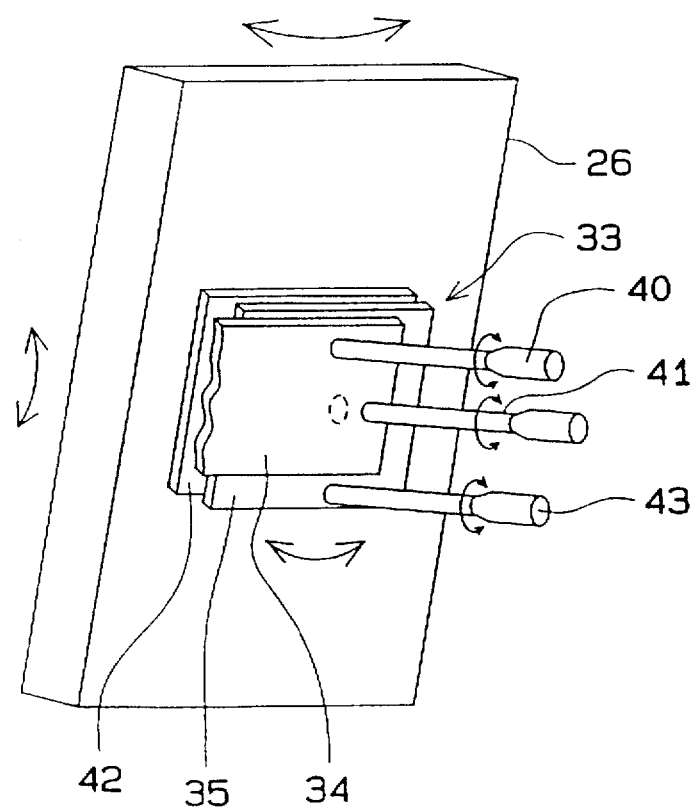
FIG. 13 is a perspective view of the angle adjusting mechanism shown in FIG. 8.
Figure 14:
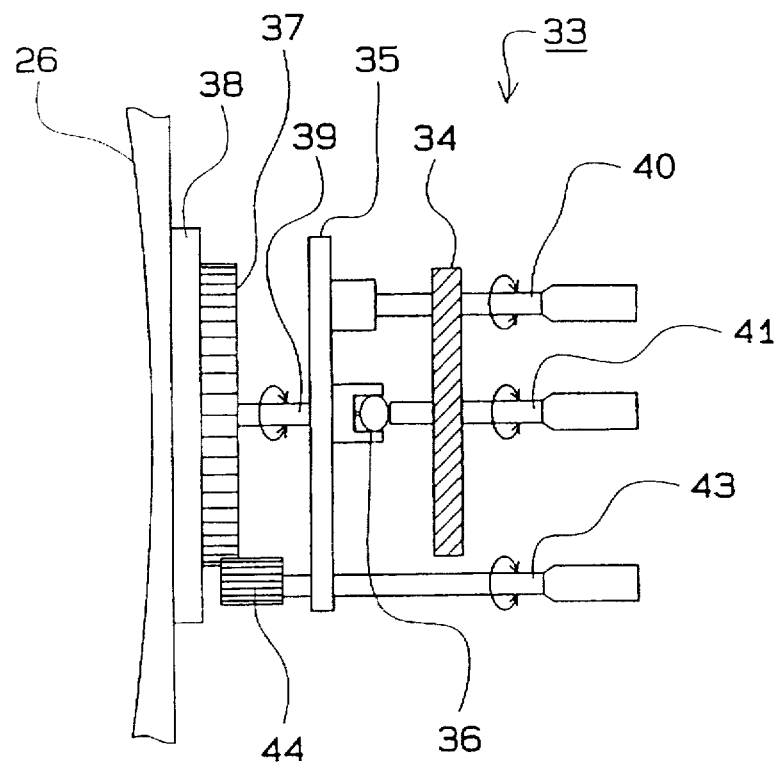
FIG. 14 is a plan view of the angle adjusting mechanism shown in FIG. 8.

Toroidal concave mirror 26 is disposed at a variable angle on the dashboard section (not shown) through an angle adjusting mechanism 33 serving as a drive adjusting means. Angle adjusting mechanism 33 is formed, as shown in FIGS. 13 and 14, by attaching a base plate 35, having a variable angle, through a universal joint 36, to a fixed plate 34 fixed to the dashboard (not shown). Fitting plate 38 is rotatably attached via gears 37 through shaft 39 to the front surface of base plate 35. Vertical angle adjusting screw 40 and horizontal angle adjusting screw 41 are driven into their respective screw holes (not shown) in fixed plate 34. Pinion 44 at the leading end of rotary shaft 43 engages with gears 37 on fitting plate 42. The leading ends of vertical angle adjusting screw 40 and horizontal angle adjusting screw 41 are rotatably connected to the upper portion and the right side of base plate 35. Toroidal concave mirror 26 is secured to the front surface of fitting plate 42.

By turning vertical angle adjusting screw 40, there is a change in the vertical inclination angle (flapping angle). By turning horizontal angle adjusting screw 41, there occurs a change in the horizontal inclination angle (flapping angle) of toroidal concave mirror 26. By turning rotary shaft 43, the toroidal concave mirror 26 rotates around the shaft 39, thus permitting adjustment of the angle in the same rotation plane of toroidal concave mirror 26.

In this embodiment, display device 24, flat mirror 25 and toroidal concave mirror 26 are disposed in such a manner that the image of display section 31 radiated from the display device 24 is reflected at point D on windshield 5 through flat mirror 25 and toroidal concave mirror 26. The reflected images enters the eyes G of the driver to form display mark 32 at a position at the front end of the automobile body.

Figure 10:
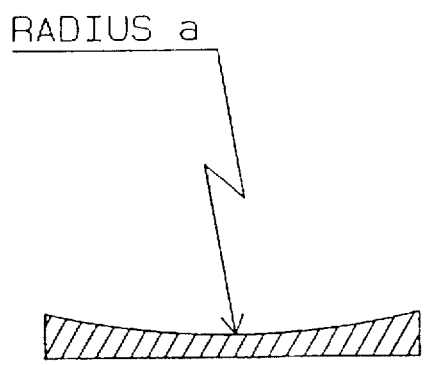
FIG. 10 is a sectional view of FIG. 9 cut along the line 10—10.
Figure 11:
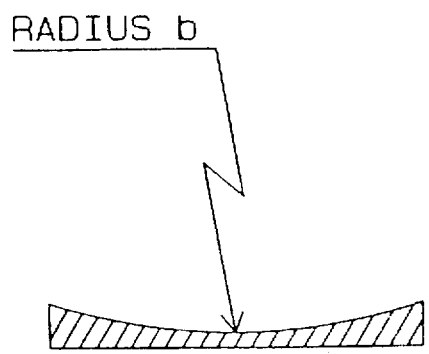
FIG. 11 is a sectional view of FIG. 9 cut along the line 11—11.

Now, toroidal concave mirror 26 serving as the reflecting means in the fourth embodiment is described. Toroidal concave mirror 26 is a concave mirror as shown in FIG. 9, of which the x-direction section (corresponding to the horizontal direction of windshield 5 along the optical path) and the y-direction section (corresponding to the vertical direction of windshield along the optical path) are illustrated in FIGS. 10 and 11, respectively. As shown in FIGS. 10 and 11, the radius of curvature "a" in the x-direction is designed to be smaller than the radius "b" in the y-direction. Radii of curvature "a" and "b" are determined as follows.

It is now assumed that the horizontal radius of curvature of windshield 5 is p, the vertical direction is flat, the distance between display section 31 and toroidal concave mirror 26 is t, the distance between toroidal concave mirror 26 and reflecting point D of the windshield 5 is d; the distance between reflecting point D of windshield 5 and display mark 32 is h; and the distance between the virtual image of display section 31 produced by toroidal concave mirror 26 is x or x', provided however that x is based on the radius of curvature "a", and x' is based on the radius of curvature "b".

1. Determination of radius of curvature "a"

First, in the reflection of windshield 5:

$$1/(x+d)-1/h=2/p, \text{ therefore: } x=(p\times h)/(2\times h+p)-d$$

d. From the reflection by the radius of curvature "a"

$$(1/t)-(1/x)=2/a$$

Therefore:

$$\begin{aligned}a &= 2\times t\times x(x-t)\\ &= 2\times t\times\{(p\times h)/(2\times h+p)-d\}/[\{(p\times h)/\\ &\quad (2\times h+p)-d\}-t]\end{aligned}$$

2. Determination of radius of curvature "b"

$$x'=h-d, \text{ therefore: } x'-h-d,$$

From the reflection by the radius of curvature "a"

$$(1/t)-1/(h-d)=2/b$$

therefore:

$$b=\{2\times t\times(h-d)\}/(h-d-t)$$

Although not shown, above-mentioned display device 24, flat mirror 25 and toroidal concave mirror 26 are set within a box of which the inner surface is coated in matt black, and an opening for emitting the image of end mark display section 31 toward the point D of windshield 5 is provided in a part of the box.

In a front end position display unit for a vehicle having the construction described above, when parking the automobile in a parking lot, the driver turns on lamp 29 of display device 24. Then, virtual image 32 which is the display light of end mark display section 31 is emitted from display device 24, and enters from flat mirror 25 into toroidal concave mirror 26. Virtual image 32 is reflected by toroidal concave mirror 26 at point D of windshield 5, and a virtual image is formed in the eyes G of driver 45.

At this point, virtual image 32 of end mark display section 31 is formed and displayed near the end position of the vehicle. By appropriately adjusting the angle to the optical axis of toroidal concave mirror 26, both optical beams from windshield 5 toward the eyes are corrected so as to pass through the horizontal plane containing the eyes. In other words, the corresponding points in the left-eye virtual image and in the right-eye virtual image are recognized as being at the same height. As a result, the difference in height in the vertical direction between the images of the two eyes caused by the curved surface of the windshield 5 is eliminated.

Therefore, the driver can see image 32 in which two images are combined clearly in the space near the end position of the vehicle, and can easily recognize the end position of the vehicle relative to an obstacle from the relative positional relationship between image 32 and the obstacle.

Since angle adjusting mechanism 33 is provided for toroidal concave mirror 26, it is possible to adjust the attachment angle of toroidal concave mirror 26 by means of the angle adjusting mechanism 33 in response to the position in height of the driver's eyes and the horizontal position of the eyes. The difference in height can thus be eliminated even with individual differences in the heights of eyes of different drivers.

Figure 15:
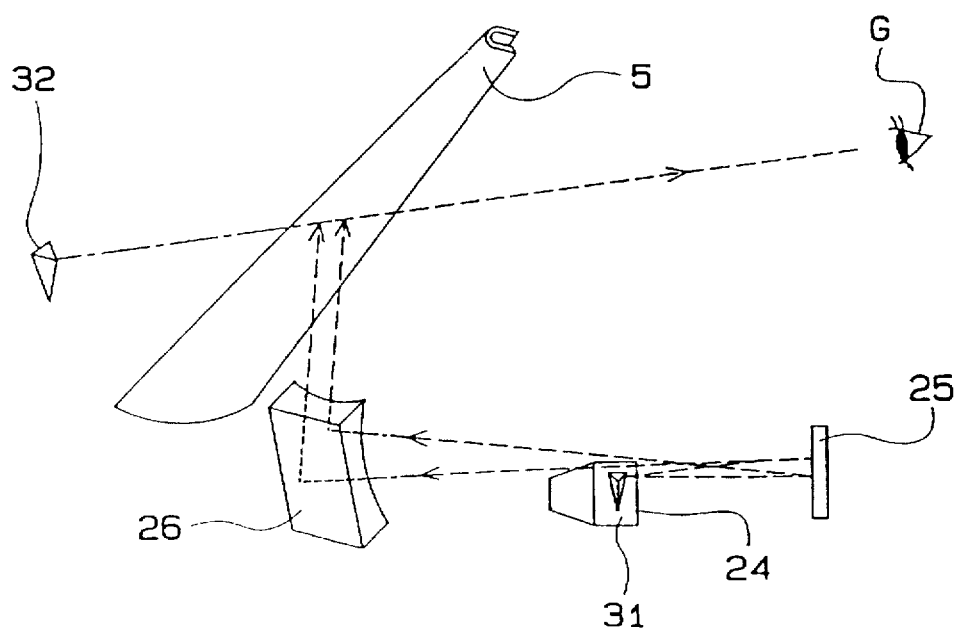
FIG. 15 is a descriptive view illustrating the function of eliminating up-down parallax of the apparatus shown in FIG. 8.
Figure 20:
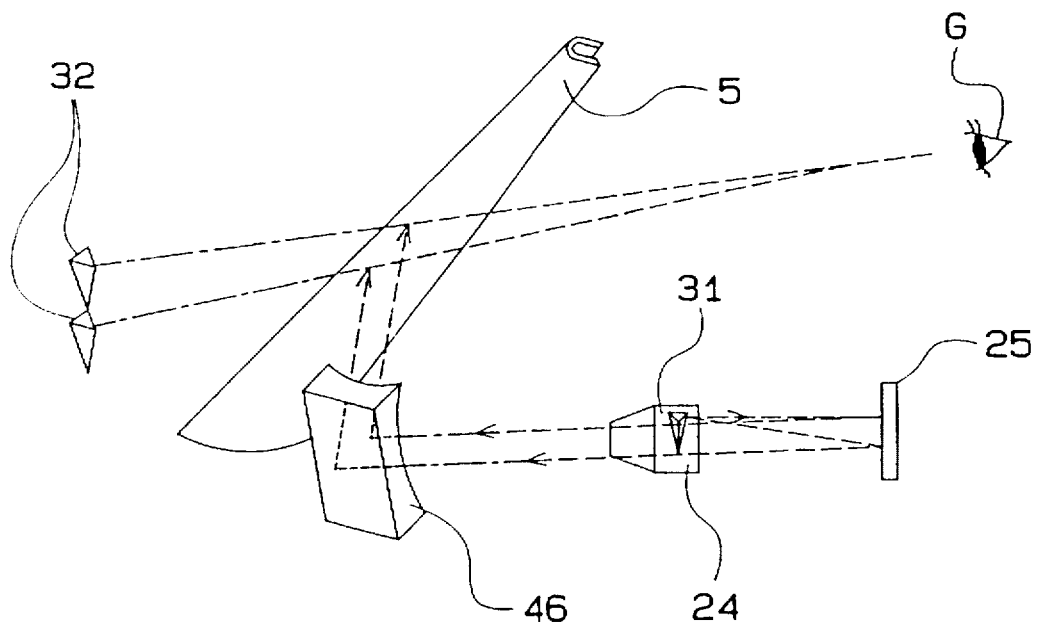
FIG. 20 is a descriptive view illustrating the occurrence of up-down parallax in the conventional apparatus.

Now, the functions of toroidal concave mirror 26 are additionally described by means of FIGS. 15 and 20. As shown in FIGS. 15 and 20, windshield 5, having a substantially flat vertical surface, has a horizontally curved surface. The mirror acts as a cylindrical concave mirror. If toroidal concave mirror 26 in FIG. 15 is assumed to be ordinary spherical concave mirror 46 as shown in FIG. 20, there occurs a difference in height between the two rays reaching the eyes G of the driver after reflection from windshield 5 under the effect of windshield 5 acting as a cylindrical concave mirror. It is therefore difficult for the driver to combine two images reaching his or her left and right eyes. This is also the case when toroidal concave mirror 26 is assumed to be a flat mirror.

Toroidal concave mirror 26 adds the same concave mirror action as that of windshield 5 in the horizontal direction also to the vertical direction, resulting in windshield 5 acting as a spherical concave mirror. Because the windshield 5 thus becomes an ordinary spherical concave mirror, the vertical difference between the left and right eyes is eliminated, and the driver can now see an image which combines the images reaching each eye. In addition to the correction of the vertical shift between the left and right eyes, an image enlarging function is also performed, thus permitting a reduction in the number of parts required.

Furthermore, it is possible to impart an area of magnification to the windshield, thus enabling the display unit to be downsized.

According to the display unit of this embodiment, the following effects are available:

(1) Although the inner surface of the windshield forms a non-spherical reflecting concave surface, the present embodiment adopts a construction serving as a single spherical concave mirror for the optical system as a whole, by the use of the toroidal concave mirror, which is a reflecting means having different curvatures "a" and "b" between two directions and forming a right angle. It is therefore possible to eliminate the difference in height between the images reaching the right and left eyes caused by the windshield 5, thus facilitating the combination of both images into one.

(2) The image is free from distortion in spite of the inner surface of windshield 5 serving as a non-spherical reflecting concave surface.

(3) An enlarged display is possible without causing an increase in the number of parts, an increase in loss of the amount of light or complications in the optical path design.

(4) Adjustment of the individual differences in the distances between the two eyes, variations in curvature of the windshield, and the display position of the virtual image can be achieved by the angle adjusting mechanism serving as a drive adjusting means.

If the curvature "a" in the direction X (the third direction in the present invention) of toroidal concave mirror 26, which is a reflecting means optically in parallel with the horizontal direction (the first direction in the present invention) of windshield 5 serving as a display means, is set to be smaller than the curvature "b" in the direction Y (the fourth direction in the present invention) optically in parallel with the vertical direction (the second direction in the present invention) of windshield 5, it is possible to decrease the vertical difference in view caused by the above-mentioned curvature P of windshield 5 and to display an enlarged virtual image.

The methods of manufacturing toroidal concave mirror 26 are described below in some detail.

The first manufacturing method comprises preparing a reflecting surface by grinding a piece of resin or a glass block and forming a reflecting film and a protecting film by vapor deposition, as in a conventional lens or concave mirror.

The second manufacturing method comprises injection-molding molten resin or molten glass into a precision die, and after cooling, depositing a reflecting film and a protecting film onto the surface.

Figure 16:
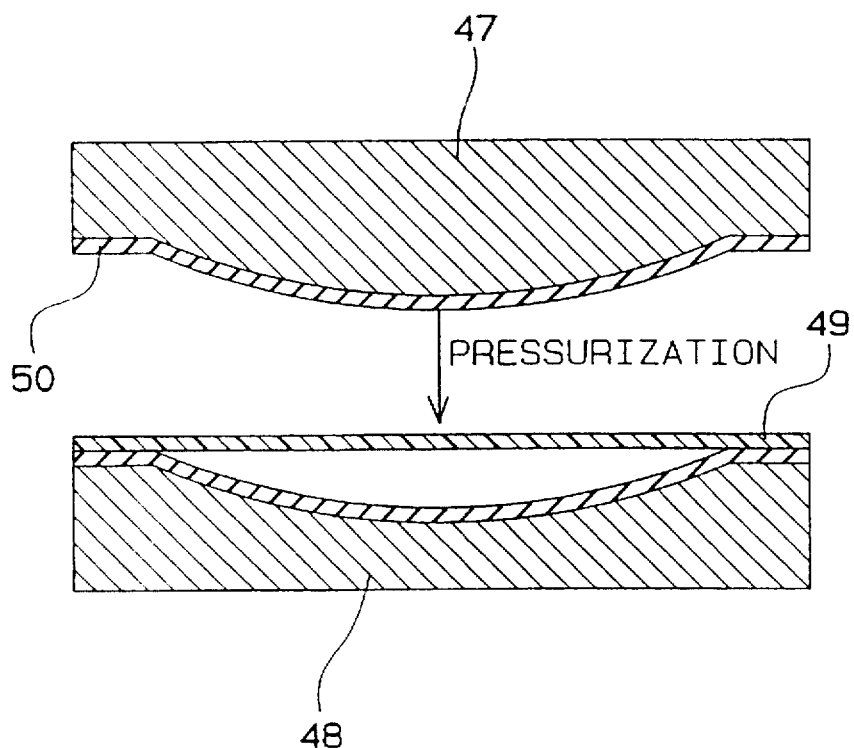
FIG. 16 is a sectional view illustrating a typical manufacturing method of a toroidal concave mirror.

The third manufacturing method comprises, as shown in FIG. 16, preparing a set of male die 47 and female die 48 formed into the curved surface shape of the toroidal concave mirror 26, placing flat soft resin plate (or a soft glass plate) 49 on female die 48, causing male die 47 to descend to bend the plate, and after cooling, depositing a reflecting film and a protecting film onto the surface. The surfaces of male die 47 and female die 48 are given a smooth finish through grinding or by coating them with soft material 50 such as felt or rubber.

Figure 17:
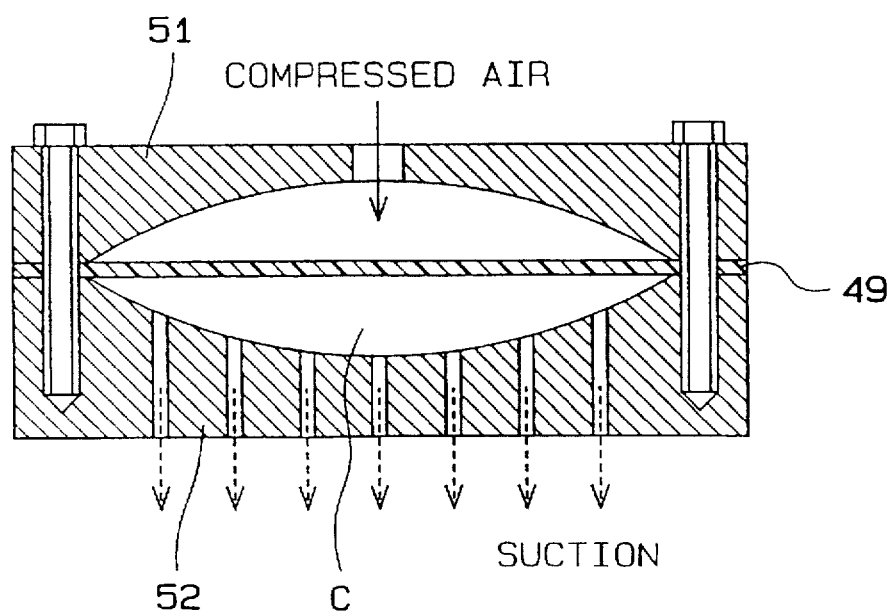
FIG. 17 is a sectional view illustrating another typical manufacturing method of a toroidal concave mirror.

The fourth manufacturing method comprises, as shown in FIG. 17, placing flat soft resin plate (or a soft glass plate) 49 between upper die 51 and lower die 52 which form a cavity C there between.

The surface of lower die 52 facing the cavity C has a curved shape corresponding to toroidal concave mirror 26. Compressed air is introduced through the upper die 51 into the cavity C, which is evacuated through small evacuating holes in the lower die 52 to form the plate. After cooling, a reflecting film and a protecting film are vapor-deposited.

Figure 18:
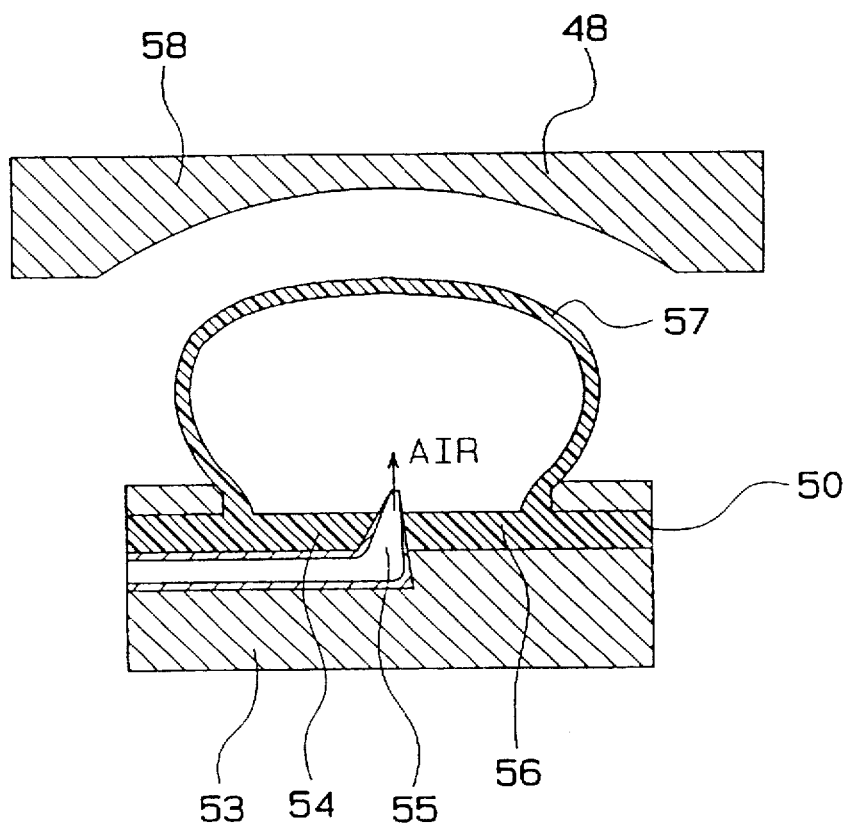
FIG. 18 is a sectional view illustrating another typical manufacturing method of a toroidal concave mirror.

The fifth manufacturing method comprises, as shown in FIG. 18, forming a recess to hold molten resin on the upper surface of lower die 53, and supplying molten resin through feed hole 56 into recess 54 while introducing air into the molten resin in recess 54 through feed hole 55. This forms molten resin balloon 57 which adheres to the toroidal concave surface of lower part of upper die 58, and is cooled and formed. Then, the toroidal concave portion is separated, and a reflecting film and a protecting film are formed by vapor deposition or the like.

Figure 19:
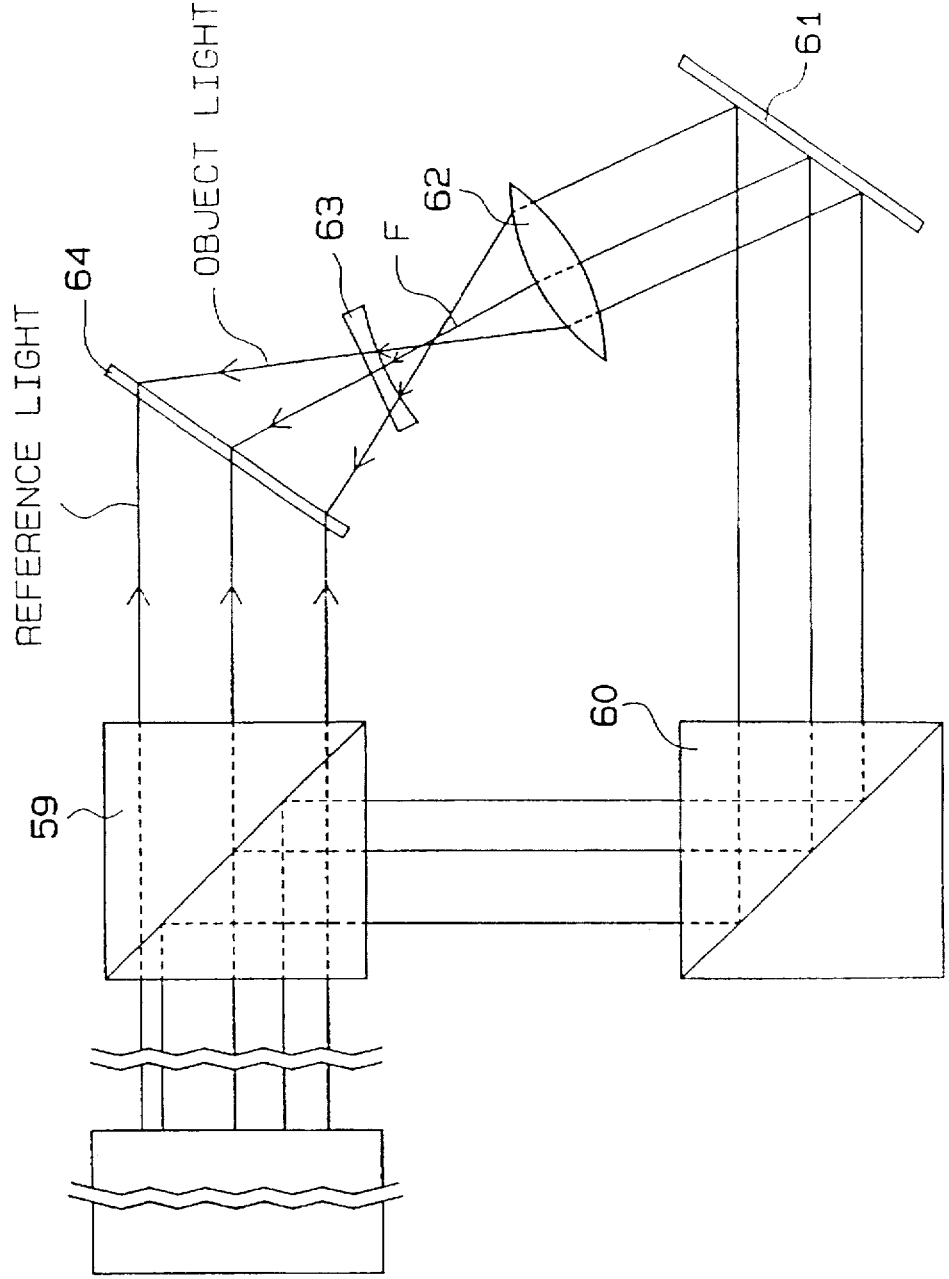
FIG. 19 is a sectional view illustrating another typical manufacturing method of a toroidal concave mirror.

The sixth manufacturing method is a method of manufacturing a hologram toroidal concave mirror as shown in FIG. 19. The method comprises first branching parallel rays emitted from a laser source by means of half mirror 59, causing the branched rays emitted from half mirror 59 to converge at focal point F by means of mirrors 60 and 61 and convex lens 62. Then, the split beams are passed through cylindrical lens 63 to become object rays, causing them to enter into a photosensitive agent applied to dry plate 64 resulting in exposure of the photosensitive agent, and at the same time, causing the other branched rays to enter into the photosensitive agent as reference rays for the exposure. Dry plate 64 is, after development, coated with a protecting film to finish a hologram toroidal concave mirror.

By adopting any of the above-mentioned manufacturing methods, toroidal concave mirror 26 is formed of resin or a glass, and coated with a reflection film.

The fourth embodiment includes the following advantageous features and effects.

The display image forming device projects display light through the toroidal concave mirror, which serves as a reflecting means, to the display means having a non-spherical reflecting concave surface in which the curvature in the first direction is larger than the curvature in the second direction.

The toroidal concave mirror, wherein the curvature in the third direction is optically parallel to the first direction of the display means and wherein the curvature in the third direction is smaller than that in the fourth direction, which is optically parallel to the second direction, successfully reduces the vertical difference in view caused by the curvature of the reflecting concave surface of the display means. Further, it is possible to display an enlarged virtual image less susceptible to distortion. According to the fourth embodiment, therefore, it is possible to reduce the vertical difference in view caused by the non-spherical concave surface of the display means. It is also possible to achieve an enlarged display by utilizing the reflecting concave surface of the display means itself.

By causing the drive adjusting means to drive the above-mentioned reflecting means, it is possible to reduce the vertical difference in view irrespective of variations in the distance of separation of eyes of an observer between different individuals or the curvature of the reflector, and also to adjust the virtual image display position.

Furthermore, in the heads-up display unit having the windshield as a display means, it is possible to reduce the distortion of the image caused by the non-spherical reflecting concave surface of the windshield.

The above-mentioned reflecting means, in the form of a toroidal concave mirror, as well as in the form of a hologram having the same reflecting characteristics as those of this toroidal concave mirror, can have the same effects.

(Fifth embodiment)

The fifth embodiment relates to an image display unit free from distortion of the display image even upon a shift in the viewing point.

Figure 21:
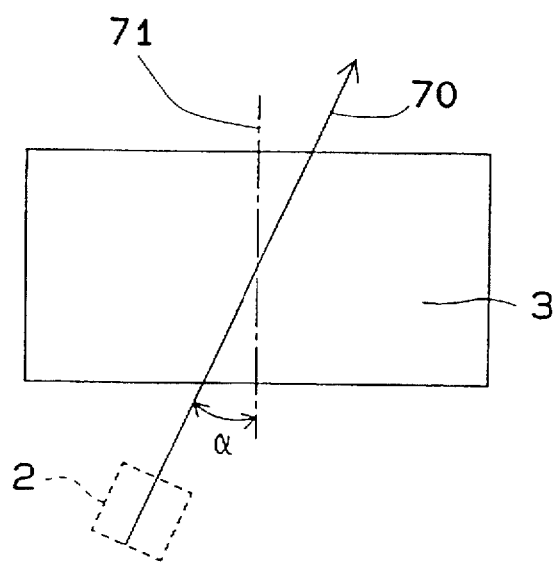
FIG. 21 is a descriptive view illustrating the inclination of the optical axis in the holographic optical element.

In the image display unit as shown in FIG. 1, the display light irradiated from the display device 2 enters the hologram 3 serving as slanted reflecting means. As shown in FIG. 21, consequently, the optical axis 70 forms an inclination angle α relative to the axis 71 of the hologram 3.

In this case, the optical path length between the display device 2 and the hologram 3 varies between the case of viewing the display image through the right side of the hologram 3 and the case of viewing the display image through the left side. This results in a difference in the enlargement ratio of the display image.

As a result, the display image formed on the windshield 5 is distorted, and gives an unsettling feeling.

With these problems in view, the fifth embodiment is to provide an image display unit which gives an image free from distortion even when the viewing point is shifted.

The heads-up display unit which is an image display unit according to the fifth embodiment, is described below with reference to FIGS. 22 and 23.

The same reference numerals are assigned to the same components as those in the first embodiment.

Figure 22:
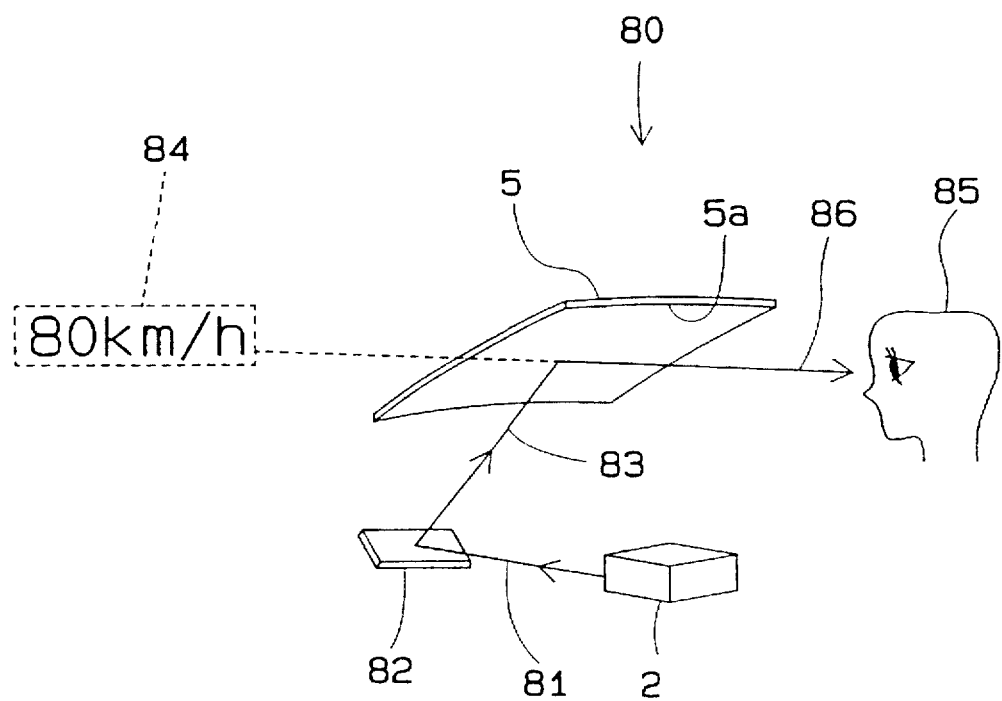
FIG. 22 is a schematic descriptive view of the image display unit according to a fifth embodiment.

Heads-up display unit 80 of the fifth embodiment includes, as shown in FIG. 22, display device 2 serving as a display image forming means having a light source.

Hologram optical element 82, which is a reflecting means, causes the diffraction and reflection of display light 81 emitted from display device 2. Windshield 5, which is a display means, causes observer 85 to visually interpret display image 84 by reflecting refracted rays 83 resulting from reflection of display light from hologram optical element 82, which has a particular wavelength only.

Figure 23:
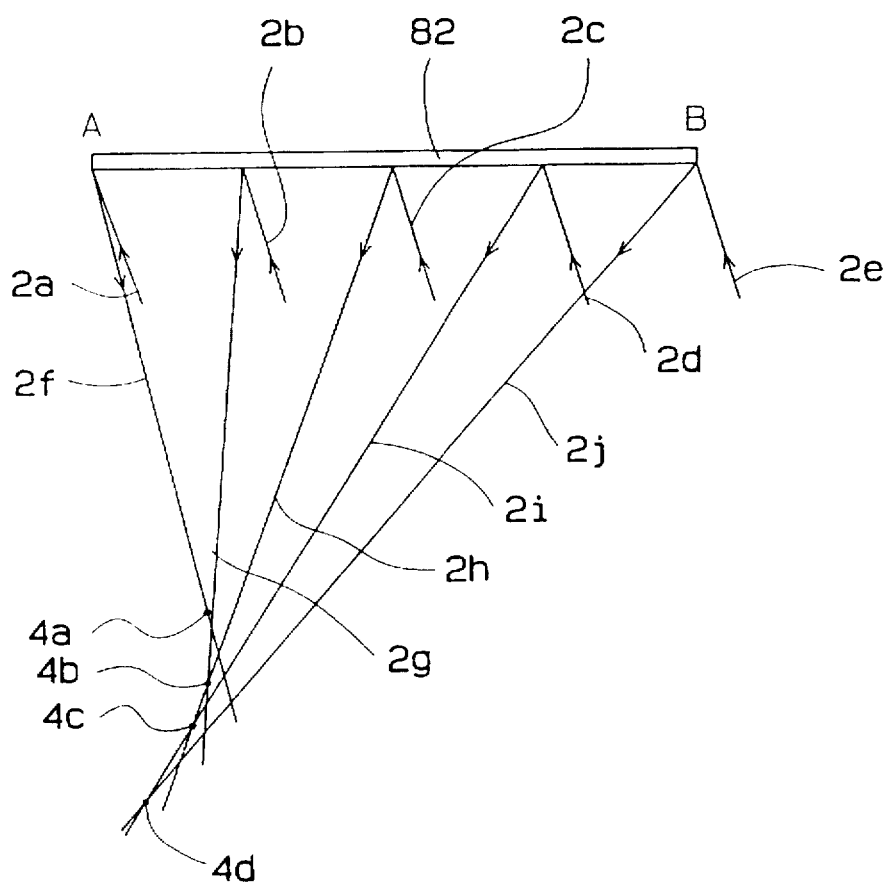
FIG. 23 is a descriptive view of functions of the hologram optical element according to the fifth embodiment.

Hologram optical element 82 has, as shown in FIG. 23, a construction so as to reduce the focal length of the hologram at point A with a short optical path length from the display device and to increase the focal length at position B with a long optical path length of the display device. For example, hologram optical element 82 records, when parallel rays are irradiated, a hologram in which focal points 4a to 4d of the individual diffracted rays 2f to 2j correspond to the components 2a to 2e of the irradiated parallel rays.

Hologram optical element 82 records a hologram so as to offset the effect of distortion of the display image caused by the shape of the windshield. The above-mentioned holograms are recorded by irradiating rays which have passed through a lens having a large aberration to the hologram optical element.

Hologram 82 shown in FIG. 23 is arranged so that display device 2 is located on the focal point side.

Film 5a shown in FIG. 22 for reflecting diffracted rays 83 is vapor-deposited onto windshield 5.

From the driver's viewpoint the diffracted rays 86 reflected from windshield 5 can be seen and the display image 84 is visually interpreted as a virtual image displayed in front of the windshield 5.

Now, the functions and the effects of the fifth embodiment are as follows:

In heads-up display unit 80 of the fifth embodiment, hologram optical element 82 has the diffraction and reflection characteristics of a magnifier. Display light 81 emitted from display device 2 is diffracted and reflected by hologram optical element 82, and radiated onto the windshield as diffracted rays 83.

There is a slight difference at this moment in the optical path length of the rays emitted from display device 2 between points A and B where the rays enter hologram optical element 82. Hologram optical element 82 of the fifth embodiment has such a construction that the focal points 4a to 4d of the diffracted rays 2f to 2j vary continuously between points A and B, and that the focal length of the hologram at point A, having a shorter optical path length from the display device 2, is shortened, and the focal length at point B, having a longer optical path length from display device 2, is increased.

As shown in FIG. 22, therefore, distortion of the display image created by display light 81 is corrected by hologram optical element 82, and displayed on windshield 5.

According to heads-up display unit 80 of the fifth embodiment, therefore, it is possible to achieve enlarged display image 84 free from distortion. The observer can therefore view windshield 5 and visually interpret an enlarged, non-distorted display image without any unsettling feelings even when the position of the view point 85 is shifted.

The hologram optical element 82 has a construction such as to eliminate the effect of distortion of the display image caused by the shape of windshield 5. A display image less susceptible to distortion can be displayed on the windshield 5.

In hologram optical element 82 of the fifth embodiment, the manner of changing the focal length varies with the optical arrangement of heads-up display unit 80 in use. As shown in FIG. 23, therefore, point A to the left of hologram optical element 82 does not always have a long focal length, and point B to the right does not always have a short focal length, but the arrangement may be such that the focal length is the shortest at the center and the focal length is long at both ends.

Similar effects are available even with an inclination angle α of 0.

While, in the fifth embodiment, the hologram has been caused to record a lens having gradually increasing multiple focal lengths, this embodiment is not limited to this, but a concave mirror having gradually increasing multiple focal lengths may be used as the reflecting means.

A lens having gradually increasing multiple focal lengths may be provided between the hologram and the windshield, or between the hologram and the display device.

(Sixth embodiment)

Now, the manufacturing method of a heads-up display unit of the sixth embodiment is described with reference to FIGS. 24 and 25.

Figure 24:
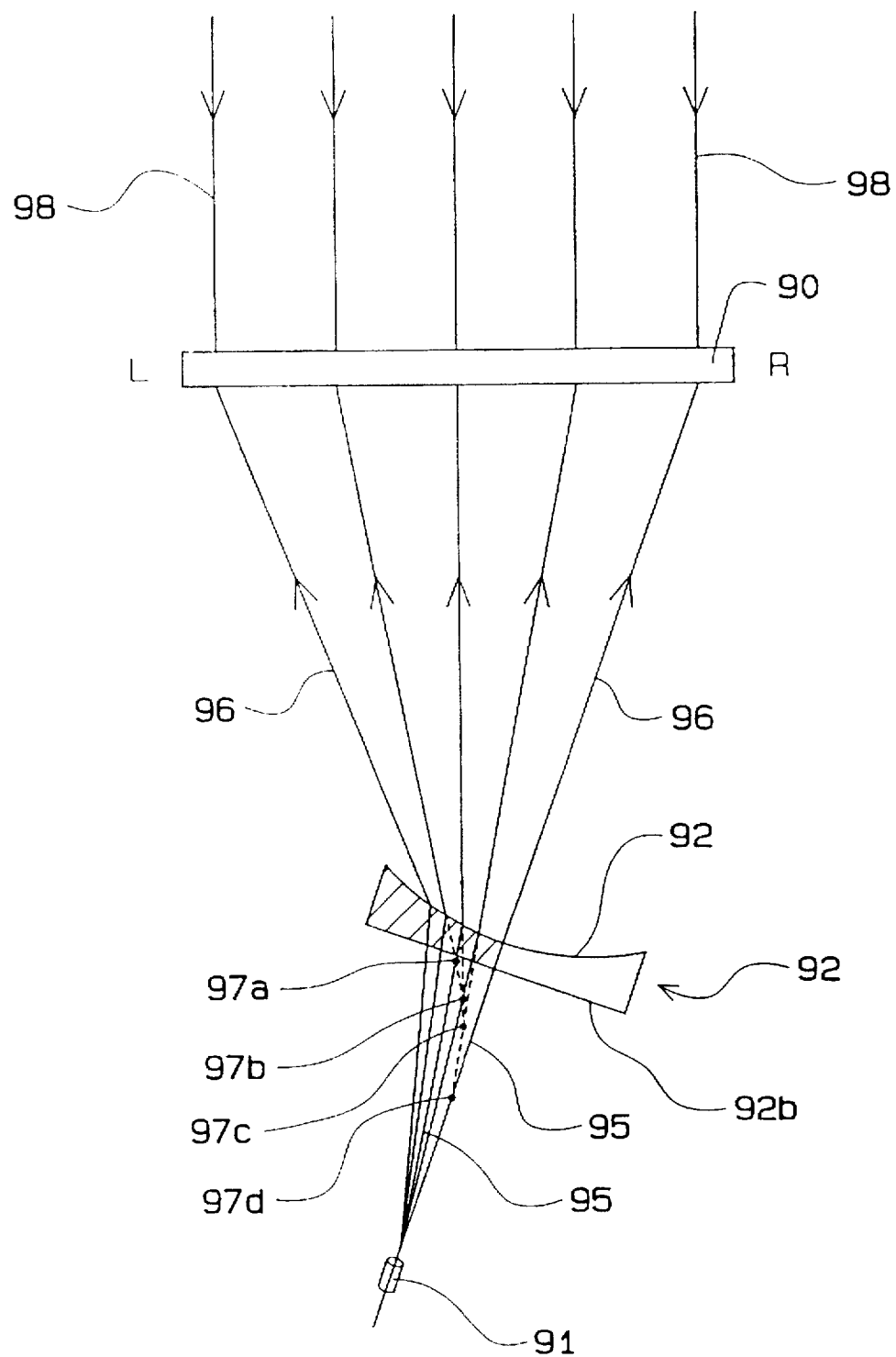
FIG. 24 is a descriptive view illustrating the method of recording an interference fringe on a hologram dry plate in a sixth embodiment.
Figure 25A:
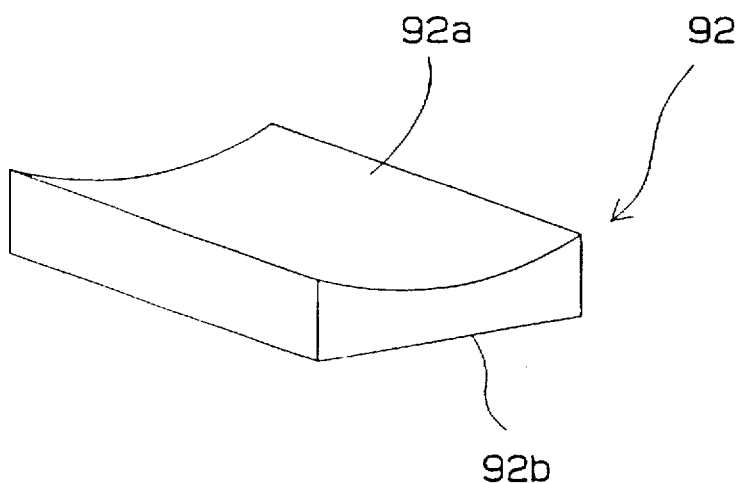
FIGS. 25(a) and (b) show a perspective view (a) and a sectional view (b) of a concave cylindrical lens according to the sixth embodiment.
Figure 25B:
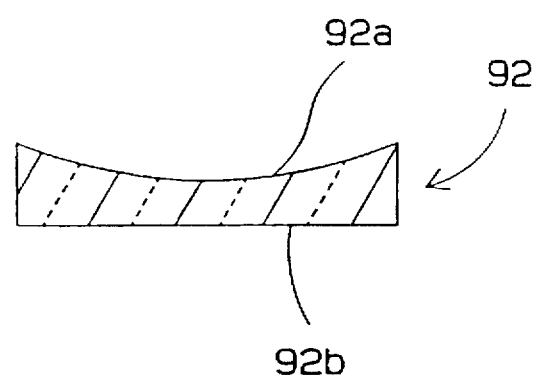

Prior to manufacturing, it is necessary to provide, as shown in FIG. 24, hologram dry plate 90, pinhole 91, which serves as a point source, and aberration producing lens 92 arranged between them. Aberration producing lens 92 is, as shown in FIGS. 25(a) and 25(b) a concave cylindrical lens having concave surface 92a given an arcuate form. The aberration producing lens 92 has an aberration caused by the spherical shape: the focal point is different between the center of concave surface 92a and its ends.

The spherical surface aberration may be expanded by using a larger curvature of concave surface 92a of aberration producing lens 92. By arranging flat surface 92b of aberration producing lens 92 on pinhole 91 side, the amount of aberration can be increased.

Dispersion rays 95 emitted from pinhole 91 are caused to pass through aberration producing lens 92. Transmitted rays 96 are radiated onto the hologram dry plate 90. Transmitted rays 96 have the spherical surface aberration of aberration producing lens 92. The transmitted rays 96 do not therefore form rays dispersed from a single point, but enter hologram dry plate 90 in the form of rays dispersed from left L to right R from focal positions 97a to 97d.

At this point, if dispersed rays 95 are caused to pass through only one side of aberration producing lens 92 (the shaded portion in the left half of FIG. 24), it is possible to irradiate the rays onto the hologram dry plate 90 in a direction from a longer to shorter, or from a shorter to longer, focal length.

Simultaneously with radiation of transmitted rays, parallel rays 98 are radiated onto the side opposite the hologram dry plate, counter to the transmitted rays described above.

Focusing the transmitted rays having passed through aberration producing lens 92 and parallel rays 98 causes mutual interference.

Consequently, interference fringes with difference aberrations are recorded on the hologram dry plate. As described in the fifth embodiment, hologram optical element 1 having continuously changing gradually increasing multiple focal points is available with the left side L as the short focal point and the right side R as the long focal point (see FIG. 23).

According to this manufacturing method, the effect of aberration can be intensified or alleviated and the focal length of the hologram can be adjusted by changing the curvature of aberration producing lens 92 and the distance from pinhole 91.

In the sixth embodiment, a cylindrical lens is used as aberration producing lens 92. It is therefore possible to freely change the ratio of the horizontal focal length to the vertical focal length.

Figure 26A:
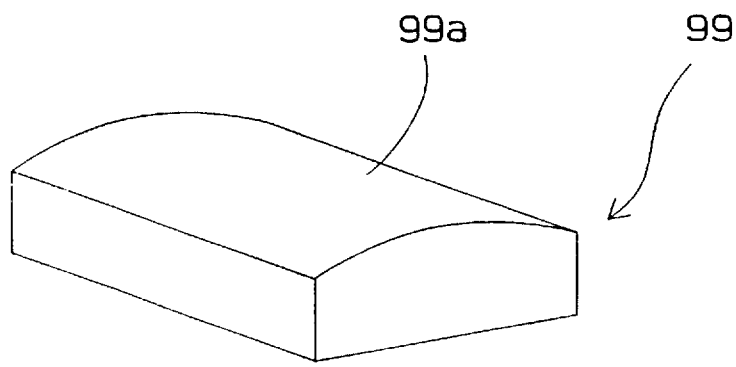
FIGS. 26(a) and (b) show a perspective view (a) and a sectional view (b) of a concave cylindrical lens in the sixth embodiment.
Figure 26B:
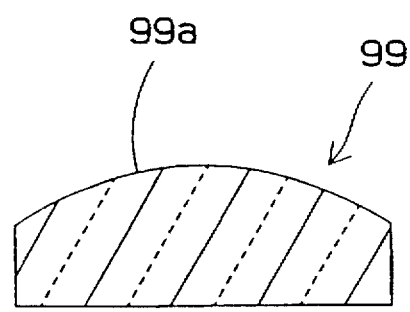

While a concave cylindrical lens has been used in the sixth embodiment as aberration producing lens 92 shown in FIGS. 25(a) and 25(b) a convex cylindrical lens as shown in FIGS. 26(a) and 26(b) may also be employed as the aberration producing lens 99. This aberration producing lens 99 has a convex surface 99a rising in an arcuate shape. Rays having passed through this aberration producing lens 99 are focused on the convex surface 99a, and then dispersed and enter the hologram dry plate.

(Seventh embodiment)

Figure 27:
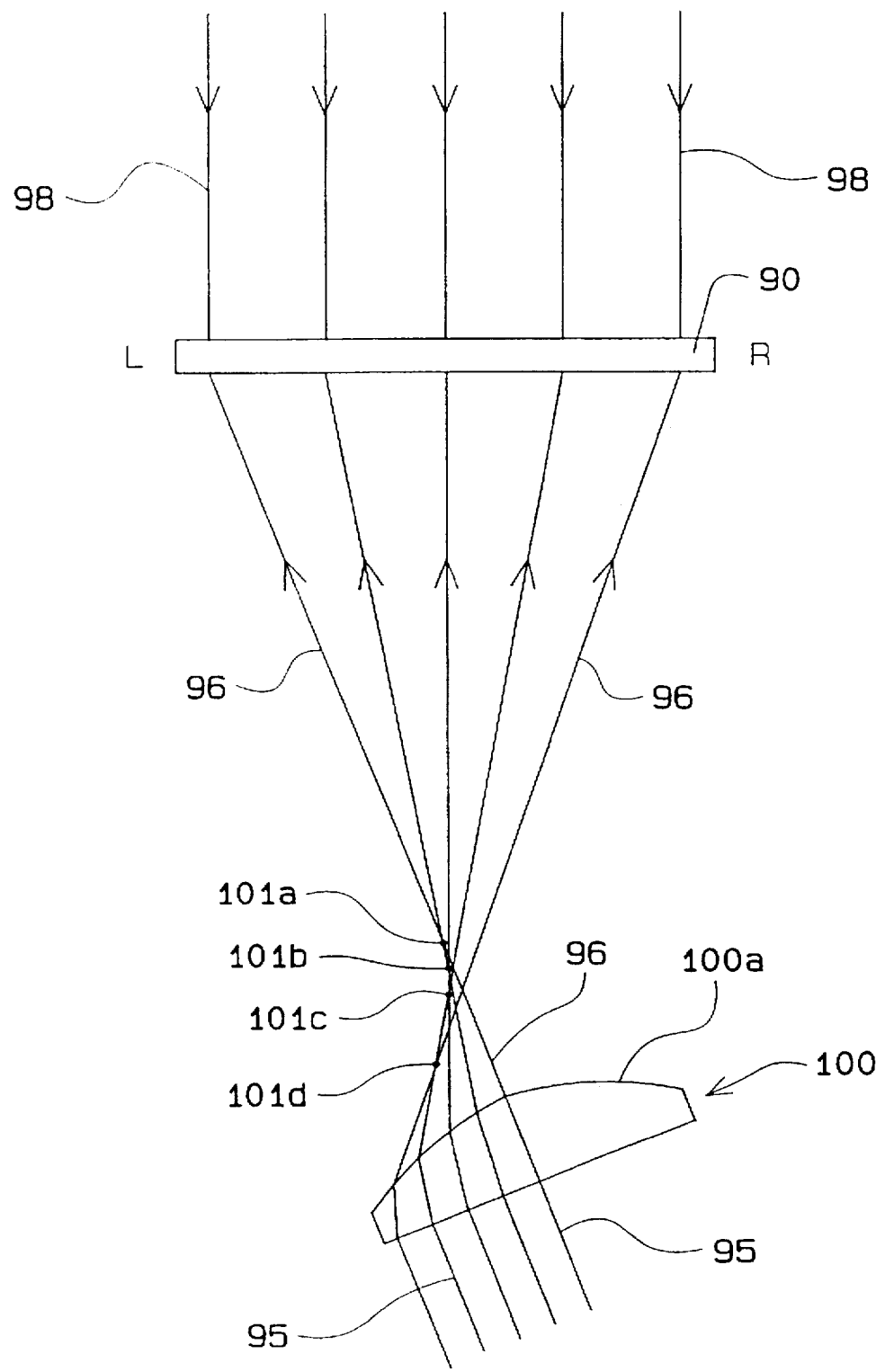
FIG. 27 is a descriptive view illustrating the method of recording an interference fringe on a hologram dry plate in a seventh embodiment.

In the seventh embodiment, as shown in FIGS. 27 and 28, a convex spherical lens is used as aberration producing lens 100 in place of the concave cylindrical lens in the sixth embodiment. This aberration producing lens 100 has a spherically projecting surface 100a as shown in FIG. 28.

As shown in FIG. 27, transmission rays 96 having passed through the aberration producing lens 100 are once condensed on the spherical surface 100a of the aberration producing lens 100. The condensation points 101a to 101d do not gather at a point because of the aberration produced by the aberration producing lens, but are continuously distributed. Then, the light is dispersed again and enters hologram dry plate 90.

Transmission rays 96 having entered the hologram dry plate 90 mutually interfere with parallel rays 98 entering from another source, and this is recorded in the form of interference fringes on the hologram dry plate 90. There is thus available a hologram optical element having progressive multiple focal points, in which the horizontal as well as the vertical aberration is substantially the same.

The other steps are the same as those in the sixth embodiment. In the seventh embodiment also, effects similar to those in the sixth embodiment are available.

Figure 28A:
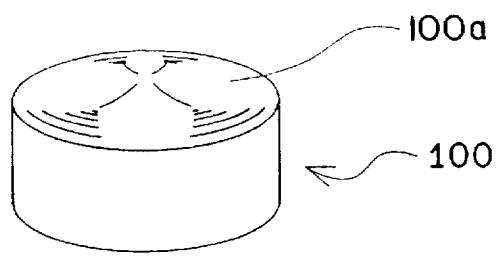
FIGS. 28(a) and (b) show a perspective view (a) and a sectional view (b) of a convex spherical lens in the seventh embodiment.
Figure 28B:
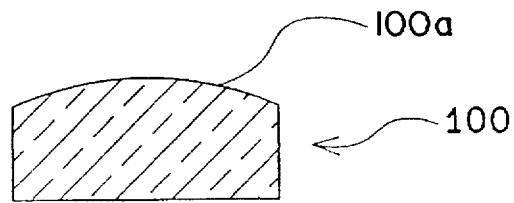
Figure 29A:
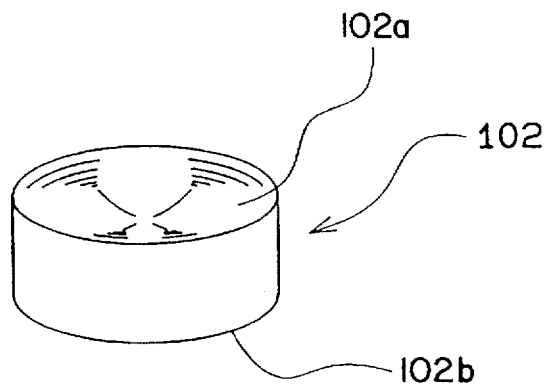
FIGS. 29(a) and (b) show a perspective view (a) and a sectional view (b) of a concave spherical lens in the seventh embodiment.
Figure 29B:
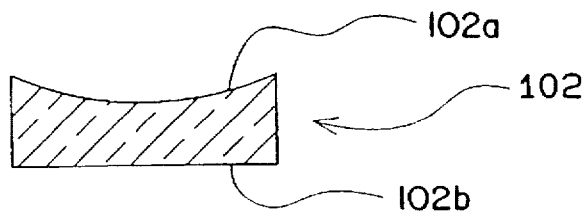

While the convex spherical lens as shown in FIGS. 28(a) and 28(b) is used as the aberration producing lens in the seventh embodiment, a concave spherical lens as shown in FIGS. 29(a) and 29(b) is also applicable as aberration producing lens 102. Aberration producing lens 102 has a spherically depressed surface 102a. The transmission rays having passed through this aberration producing lens 102 are not condensed on the spherical surface 102a but have progressive multiple focal points on the opposite flat surface side 102b.

(Eighth embodiment)

Figure 30:
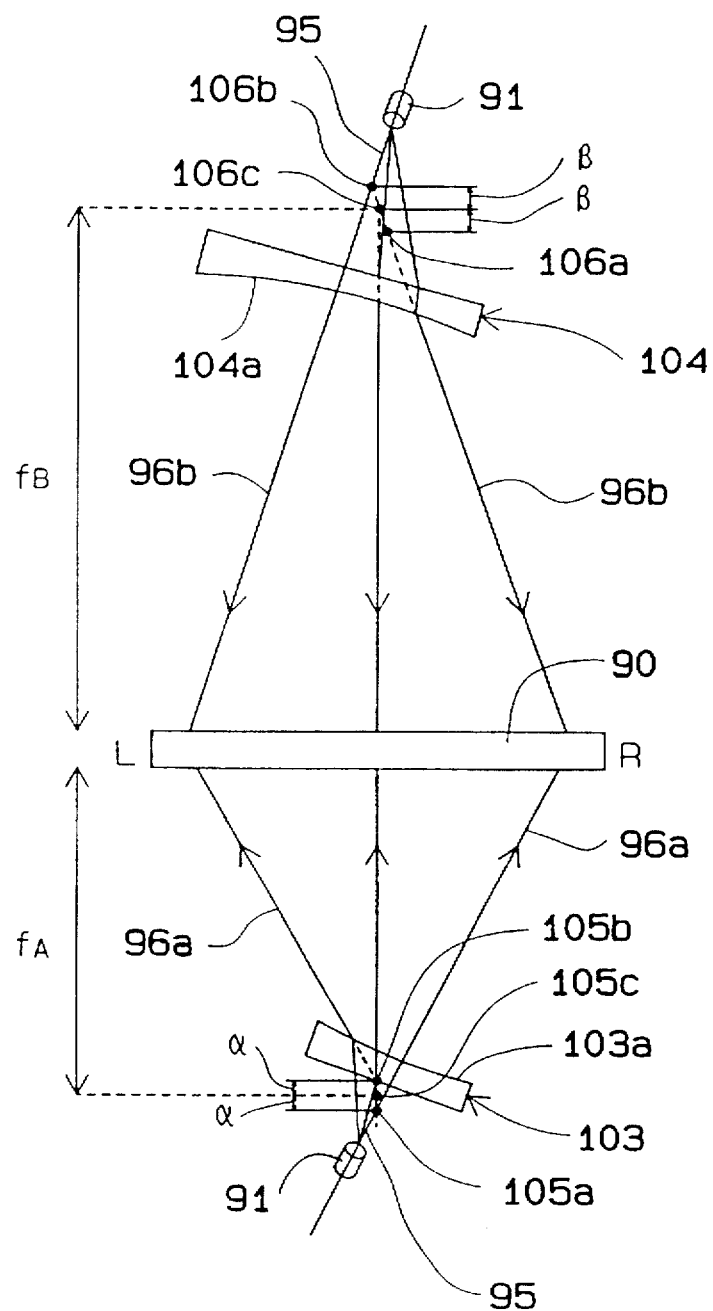
FIG. 30 is a descriptive view illustrating a method of recording an interference fringe on a hologram dry plate according to an eighth embodiment.

In the eighth embodiment, as shown in FIG. 30, aberration producing lens 103 and concave cylindrical lens 104 are arranged so that two sets of transmission rays enter hologram dry plate 90.

Transmission rays 96a entering right side R of hologram dry plate 90 from the aberration producing lens 103 have longer focal length 105a and transmission rays 96a entering left side L have shorter focal length 105b.

On the other hand, transmission rays 96b from aberration producing lens 104 entering right side R of the hologram dry plate 90 have a shorter focal length 106a and transmission rays 96b entering left side L have longer focal length 106b.

The average values $f_A$ 105c and $f_B$ 106c of the focal length of transmission rays 96a and 96b are compared: when $f_B > f_A$, the right side R of hologram dry plate 90 has a longer focal length, and when $f_A > f_B$, the left side L has a longer focal length.

If the hologram to be recorded on the hologram dry plate is assumed to have a focal length of f, $f_B > f_A$ results in: $1/f = 1/f_A - 1/f_B$.

On right side R of the hologram dry plate, the relationship $1/f_R = 1/(f_A + \alpha) - 1/(f_B - \beta) < 1/f_A - 1/f_B = 1/f$ is valid. As a result, $1/f_R < 1/f$ is valid for the focal length $f_R$ on the right side R, and the right side R would have a longer focal length. In this formula, α means the difference between the focal point 105a on the right side of $f_A$ and the average value 105c or between the focal point 105b on the left side of $f_A$ and the average value 105c, and β means the difference between the focal point 106a on the right side of $f_B$ and the average value 106c, or between the focal point 106b on the left side of $f_B$ and the average value 106c.

As for the focal length $f_L$, on the other hand, the relationship $1/f_L = 1/(f_A - \alpha) - 1/(f_B + \beta) > 1/f_A - 1/f_B = 1/f$ is valid, resulting in $1/f_L < 1/f$, resulting in a shorter focal length to the left.

By setting focal lengths of transmission rays 96a and 96b, it is possible to record interference fringes having continuously changing progressive multiple focal points on hologram dry plate 90. The remaining steps are the same as those in the sixth embodiment. In the eighth embodiment also, effects similar to those in the sixth embodiment are available.

While in the fifth to eighth embodiments, progressive multiple focal point lenses have been recorded in the hologram as the reflecting means, the reflecting means is not limited to a hologram, but a progressive multiple focal point lens may simply be adopted in place of the hologram.

The term "progressive multiple focal points" as used in the fifth to eighth embodiments means giving a distribution to the hologram focal length by imparting a distribution to the dispersion point of rays through the aberrations of the aberration producing lens, and using the transmission rays thereof as a light to be recorded on a hologram dry plate.

Aberration producing lens is a lens producing progressive multiple focal points by radiating rays dispersed from a point source.

The convex or concave cylindrical lens adopted in the sixth embodiment is used to provide a difference in the focal lengths in the horizontal and vertical directions of the hologram dry plate.

The convex or concave spherical lens used in the seventh embodiment is used to achieve focal lengths of the same order in the horizontal as well as the vertical directions of the hologram dry plate.

As in the sixth and seventh embodiments, the transmission rays having passed through the aberration producing lens are radiated onto the hologram dry plate, and at the same time, parallel or dispersed rays are radiated from the opposite side. By causing interference of the transmission rays and the parallel or dispersed rays in the hologram dry plate, interference fringes having progressive focal points are recorded.

Interference fringes having progressive focal points can be recorded by arranging the aberration producing lenses on both sides of the hologram dry plate, as in the eighth embodiment, and causing the transmission of the dispersed rays through the aberration producing lens. In this case, the effect of focus distribution can be further improved by setting the directions of aberration of both lenses, i.e., the shift of focal points, in a reverse direction.

Now, by adopting the fifth embodiment, the display image formed by the rays emitted from the display device, whose distortion is caused by the differences in the optical path length by the hologram optical element, is enlarged and projected onto the windshield serving as the display means. Therefore, the observer can visually interpret an enlarged display image free from distortion by looking at the windshield.

The enlargement ratio of the display image is uniform at various positions on the windshield. Consequently, movement of the view point never causes distortion of the display image nor causes unsettling feelings.

According to the fifth to eighth embodiments, as described above, an image display unit is provided which does not cause distortion of the display image even when the view point is moved.

(Ninth embodiment)

The ninth embodiment is to solve the problems that arise when, in a heads-up display for vehicles, adopting a hologram reflecting, means only the display light falling within a particular wavelength range from the total wavelength range of the display light from the display device serves as a reflecting means, and hence a display image forming means.

More particularly, if there are ranges of light source wavelengths and hologram reflection wavelength, the display image may get blurred according to the wavelength ranges.

Figure 32:
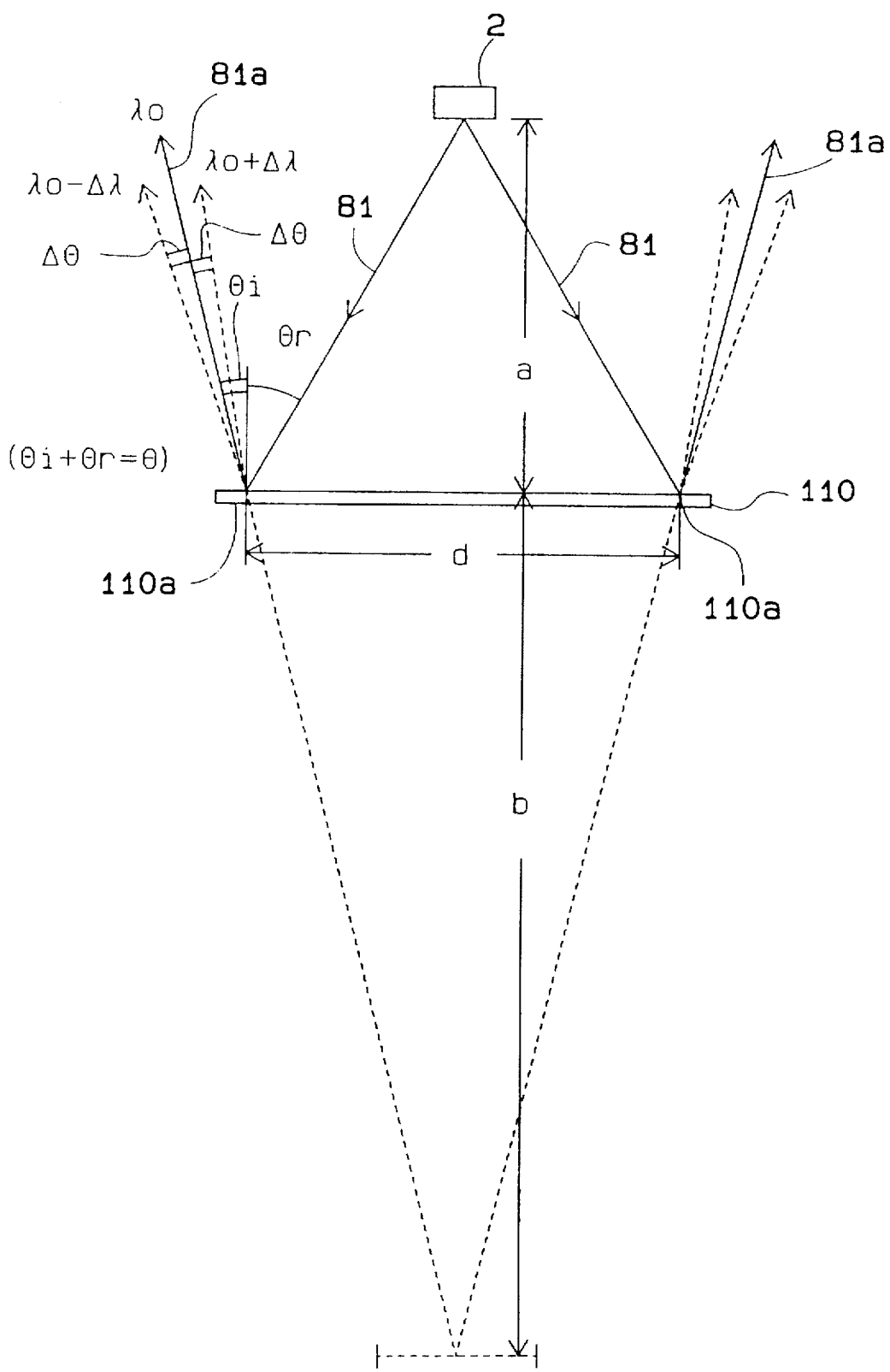
FIG. 32 is a descriptive view of color dispersion (dispersion angle Δθ) of a hologram of the heads-up display unit in the ninth embodiment.
Figure 33:
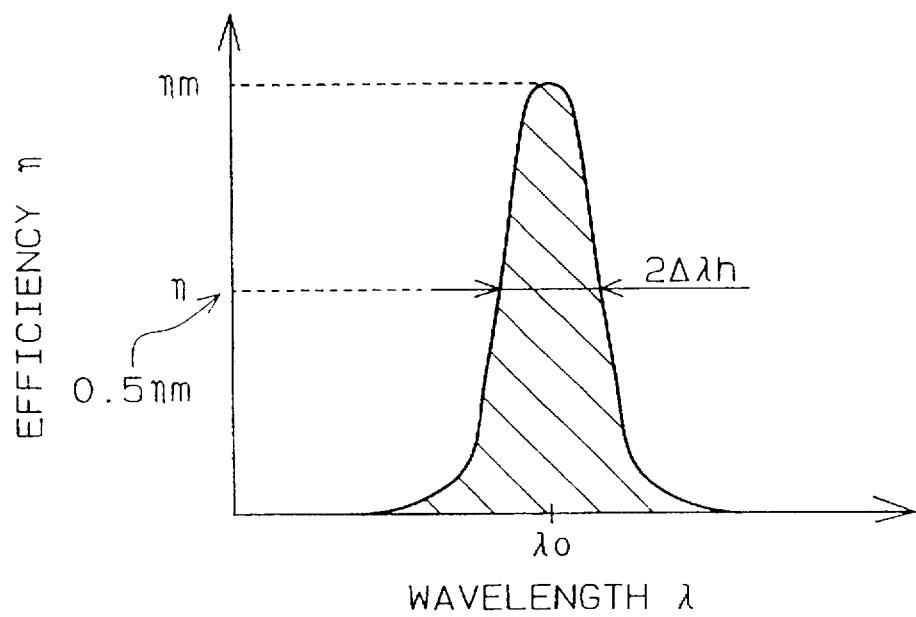
FIG. 33 is a graph illustrating the wavelength characteristics of hologram diffraction of the heads-up display unit according to the ninth embodiment.

More specifically, in the case of a hologram which reflects only selected wavelengths of the display light, the diffraction efficiency thereof varies with the wavelength λ, as shown in FIG. 33, for example. Because of the presence of fluctuation Δλ of the wavelength, as shown in FIG. 32, dispersion caused by wavelength appear, particularly at the periphery of the hologram 110.

On the assumption that hologram 110 has width d, a focal length with a wavelength λ of the concave mirror recorded on hologram 110 is f, angle of incidence $\theta_r$ of display light 81 emitted from display device 2 at distance a from the hologram surface on the periphery of hologram 110, an emitting angle thereof of $\theta_i$, and a distance b between hologram 110 and the virtual image, the change in the emitting angle $\theta_i$ on the periphery caused by fluctuation Δλ of wavelength, i.e., the dispersion angle Δθ can theoretically be expressed by the following formulae:

$$\Delta\theta = \sin^{-1}\{(1+\Delta\lambda/\lambda)(\sin\theta_r + \sin\theta_i) - \sin\theta_r\} - \theta_i \quad (1)$$

$$\sin\theta_r = d/2 \times (a^2 + d^2/4)^{-1/2} \quad (2)$$

$$\sin\theta_i = d/2 \times (b^2 + d^2/4)^{-1/2} \quad (3)$$

In an image display unit as shown in FIG. 1, however, the dispersion angle Δθ easily becomes larger as a result of the increase in the enlargement ratio and movement of driver's viewpoint. This causes blurring of the display image on the periphery of such holograms.

In the ninth embodiment, therefore, it is intended to provide an image display unit in which blurring of the display image never occurs even with a large enlargement ratio of the display image in the hologram.

The heads-up display unit, which is the image display unit of the ninth embodiment, is described below. In the ninth embodiment, the heads-up display unit shown in FIG. 31 has a basic construction substantially the same as that shown in FIG. 1 illustrating the first embodiment, and the same reference numerals are used for the same component parts.

Figure 31:
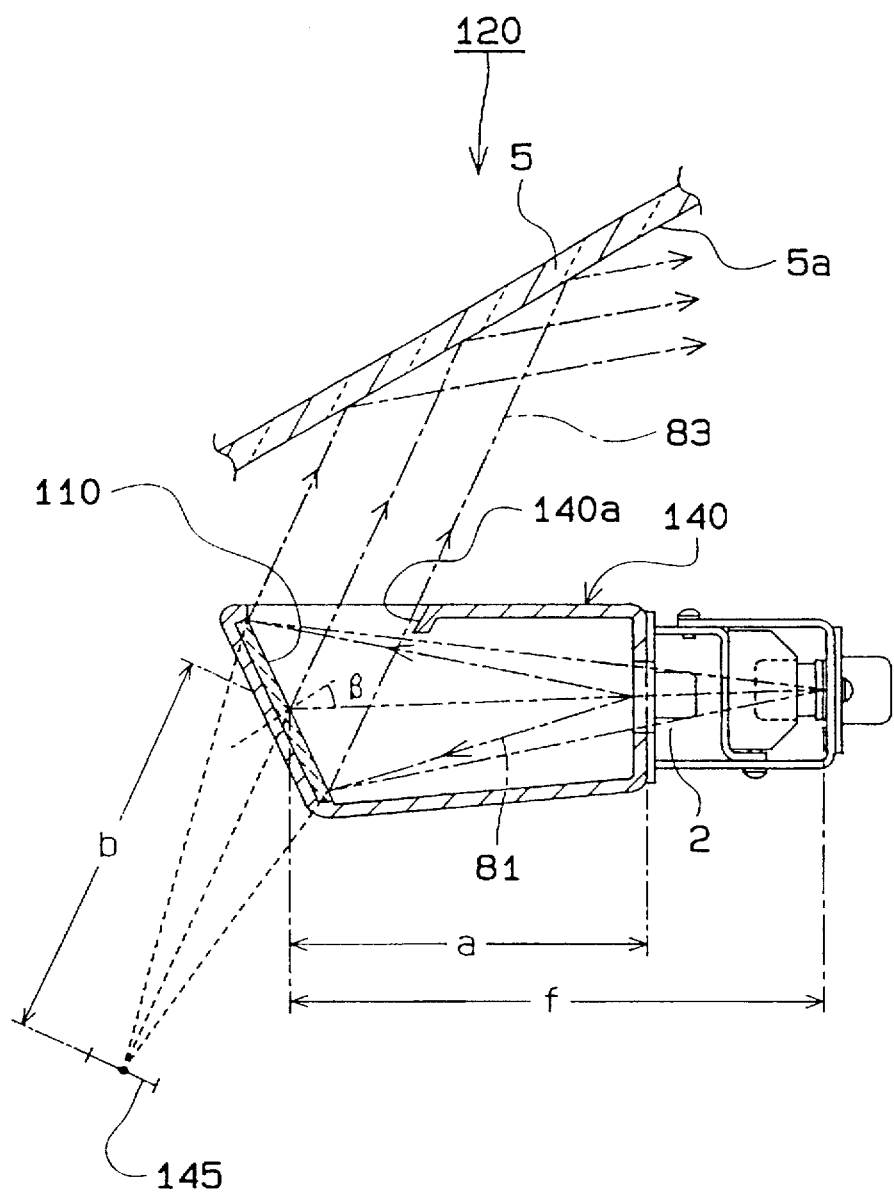
FIG. 31 is a configurational view of a heads-up display unit in a ninth embodiment.

The ninth embodiment covers a heads-up display unit 120 having a construction that causes the diffraction and reflection of display light 81 emitted from a display device 2, and that allows viewing of the resultant diffracted rays, as shown in FIG. 31.

The distance between display device 2 and hologram 110 is set so as to achieve two or more magnifications by hologram 110.

As shown in FIG. 33, on the assumption that the maximum wavelength of the diffraction efficiency giving a maximum value of $\eta_m$ of the diffraction efficiency of hologram 110 is $\lambda_0$, and that half of the wavelength of the diffraction efficiency at which the hologram diffraction efficiency becomes 50% of the maximum value is $\lambda_0 \pm \Delta\lambda_h$, then the angle θ formed between the entering and reflected rays, which are the display light, upon reflection of display light 81 emitted from display device 2 at end 110a of hologram 110 does not vary beyond 0.33° (20') because of the difference in wavelength $\Delta\lambda_h$ between the above-mentioned maximum wavelength $\lambda_0$ and the half-value wavelength $\lambda_0 \pm \Delta\lambda_h$.

Hologram 110 used in this embodiment is described below in further detail. Hologram 110 has the light reflecting property of reflecting only light of a particular wavelength, as shown in FIG. 33. By exposing hologram 110 to light of that particular wavelength, the particular wavelength is reflected. A record of information concerning concave mirror giving a slight aberration (for example, an off-axis parabolic mirror) is contained in hologram 110.

Figure 34:
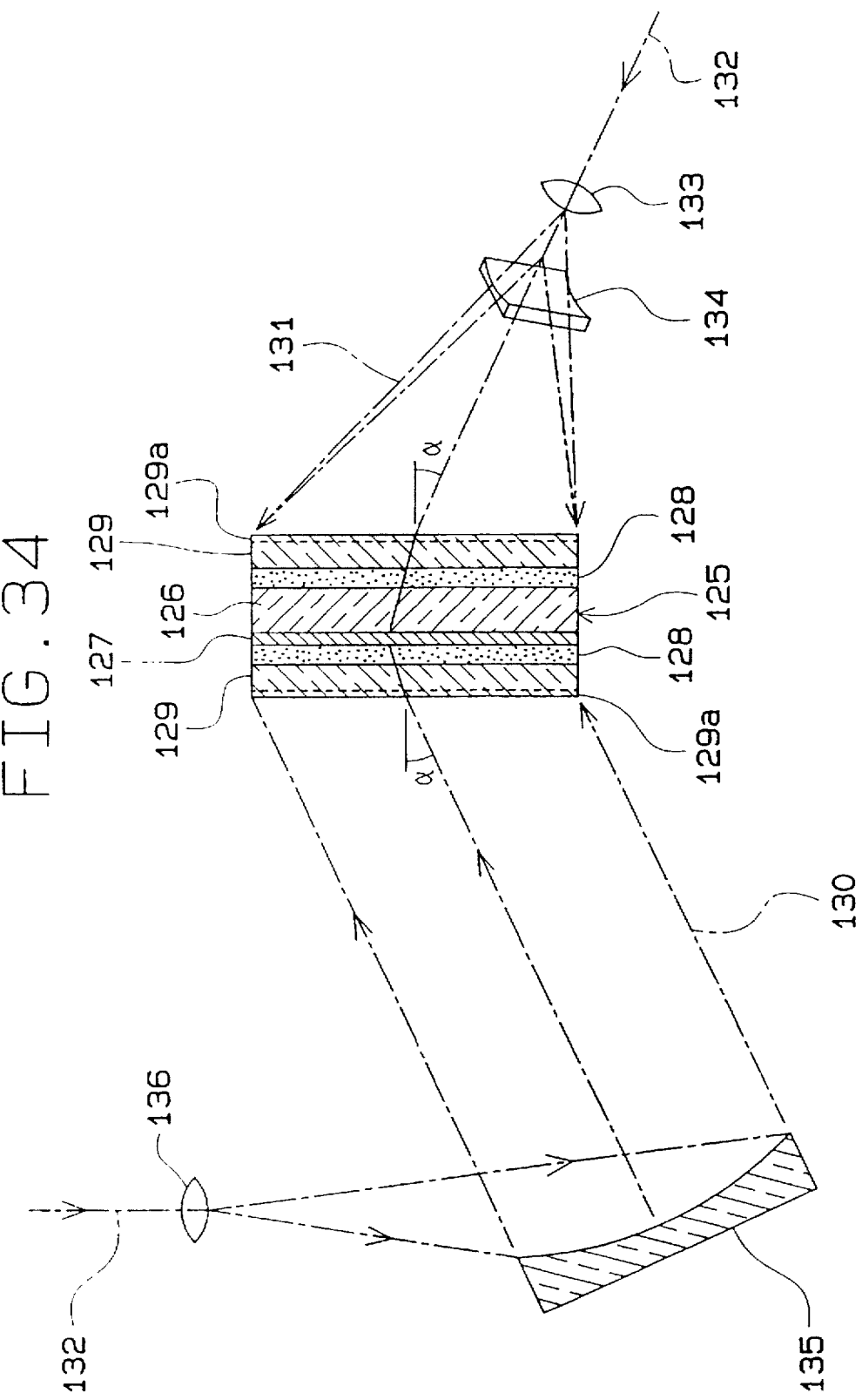
FIG. 34 is a descriptive view of the exposure process of the hologram of the heads-up display unit of the ninth embodiment.

Hologram 110 is exposed and manufactured by the use of an optical system as shown in FIG. 34.

More specifically, hologram dry plate 125 is prepared by depositing gelatin bichromate 127 serving as a photosensitive agent with a thickness of about 25 μm on substrate 126 such as soda glass, and drying it. Glass plates each with reflection preventive film 129a are closely attached via refractive index adjusting liquid 128 to both sides of the hologram dry plate, as shown in FIG. 34.

Hologram dry plate 125 in this state is disposed in a portion of the optical system so that it is exposed to parallel rays 130 on one side and dispersed rays 131 on the other side, both sets of rays being of the same wavelength and emitted from a laser oscillator (not shown).

As the light source of the optical system shown in FIG. 34, a laser beam having a wavelength of 514.5 nm is used, and the optical system is arranged so that the laser beam 132 emitted from a laser oscillator (not shown) passes through dispersing lens 133 and distortion correcting lens 134, and enters, as dispersed rays, one side of hologram dry plate 125.

On the other side of hologram dry plate 125, a concave mirror (off-axis parabolic mirror) 135 is located obliquely in front of it. Part of laser beam 132 emitted from the same laser oscillator is radiated through lens 136 onto concave mirror 135, and parallel rays 130 reflected by concave mirror 135 enter hologram dry plate 125.

As shown in FIG. 34, the angle of incidence α of the dispersed and parallel rays to hologram dry plate 125 is set to, for example, α=β33.5° with a view to agree with the reproduction angle β when hologram 110 is actually applied in a heads-up display (see FIG. 31).

The hologram is prepared by using an optical system as shown in FIG. 34, exposing hologram dry plate 125 to parallel rays 130 and dispersed rays 131, and subjecting the exposed dry plate to prescribed development and fixing treatments, and concave mirror 135 is recorded in hologram 110 in the form of interference fringes.

For the purpose of preventing scattering or reflection on the surface, cover plates are closely affixed through an epoxy resin sealing agent in a sandwich shape, and finished by forming a reflection preventive film and a scattering preventive film onto both exterior surfaces of the cover plates.

As shown in FIG. 31, hologram 110 is attached to the interior of main body 140 of the head-up display unit at a prescribed angle β (33.5°) relative to the optical axis of display device 2.

In the heads-up display unit having the construction as described above, and as shown in FIG. 31, light 30 of a speed indicator image or a warning image which is the display light emitted from display device 2 serving as the display image forming means enters hologram 110, the reflecting means within main body 140, is diffracted by the hologram 110, and then the reflected rays of a particular wavelength go upward through opening 140a, reflected by a vapor-deposited film Sa of the windshield 5 serving as the display means, and enter the eyes of the driver.

Consequently, to the eyes of the driver, the speed image which is the display image displayed on display device 2 is visually interpreted as an image projected in front of windshield 5, and an enlarged display image is displayed, because the enlargement ratio (K=b/a) of the display image is over 1.

In the ninth embodiment, hologram 110 has width d of 100 mm, with focal length f of 380 mm, and distance a between hologram 110 and display device 11 of 240 mm. This results in an enlargement ratio K of 2.7 for the display image from hologram 110 in the ninth embodiment.

(Tenth embodiment)

In the tenth embodiment, a functional test was carried out, in which the display image of the heads-up display unit 10 of the ninth embodiment was visually interpreted. The results are shown in FIG. 35.

In the above-mentioned test, the clearness of the display images was functionally tested for hologram samples of which the maximum wavelength $\lambda_0$ shown in FIG. 33 varied within a range from 525 to 550 nm and the difference Δh between the maximum wavelength $\lambda_0$ and the half-value wavelength varied to various levels.

Figure 35:
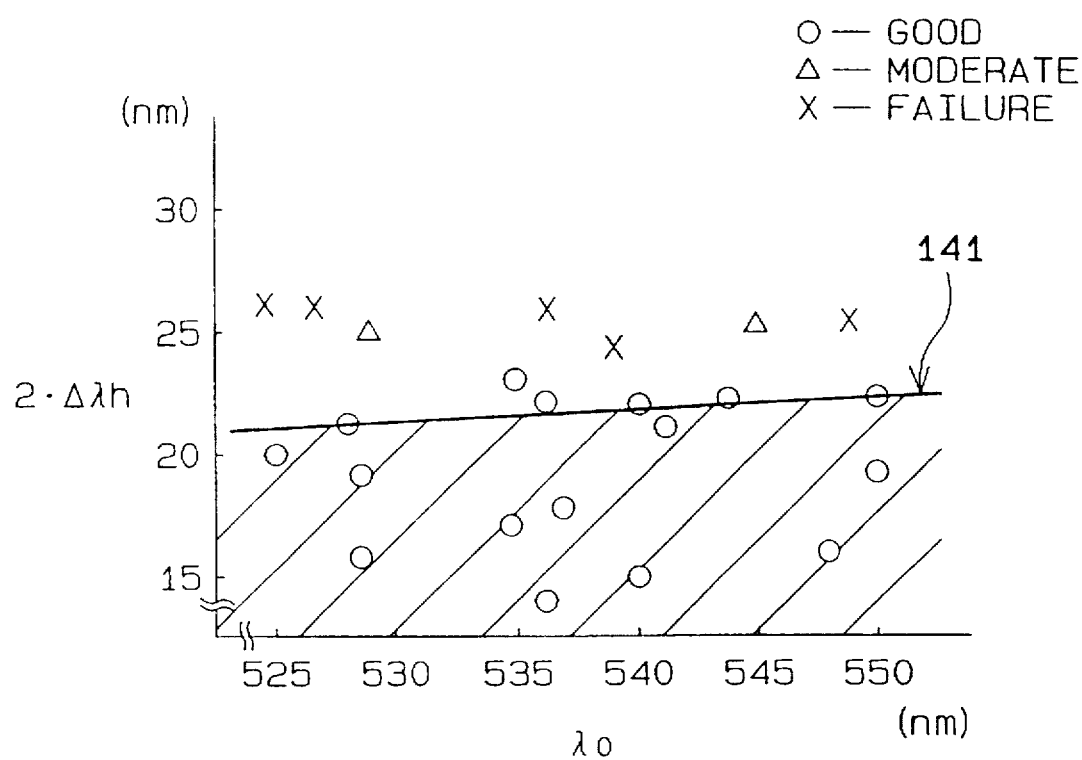
FIG. 35 is a distribution diagram of the results of a functional test of the display image of the heads-up display unit according to a tenth embodiment.

In FIG. 35, the mark O represents a hologram sample of which the display image was felt to be clear; the mark X indicates a hologram sample of which the display image is unclear; and the mark Δ shows one in-between. This evaluation is based on an observer's feeling when viewing the whole field of view of the heads-up display unit.

On the other hand, in hologram 110 in the ninth embodiment, the dispersion color $\Delta\theta_h$ is smaller than 0.33°, and the calculation of the formulae (1) to (4) by incorporating this condition would be as follows:

$$2 \cdot \Delta\lambda_h \leq 21 \text{ to } 22 \text{ nm (for } \lambda_0=525 \text{ to } 550 \text{ nm)} \quad (5)$$

The formula (5) is plotted in the form of the line 141 in FIG. 35. As can be seen in FIG. 35, those satisfying the condition ($\Delta\theta_h \leq 0.33°$) of the ninth embodiment (under the line 141) all show satisfactory results. Most of the samples coming above the line 141 which did not satisfy the condition of the present invention were unacceptable.

The hologram samples used in the above-mentioned functional test were prepared by changing the film thickness of the photosensitive agent for the hologram dry plate, the amount of light for exposure, and the treatment conditions for development and fixing.

(Eleventh embodiment)

Another functional test was carried out as an eleventh embodiment. The results are shown in FIG. 36.

The conditions in the eleventh embodiment included focal length f of the hologram of 250 mm, distance a of 150 mm (hence K=2.5), and width d of 90 mm.

Figure 36:
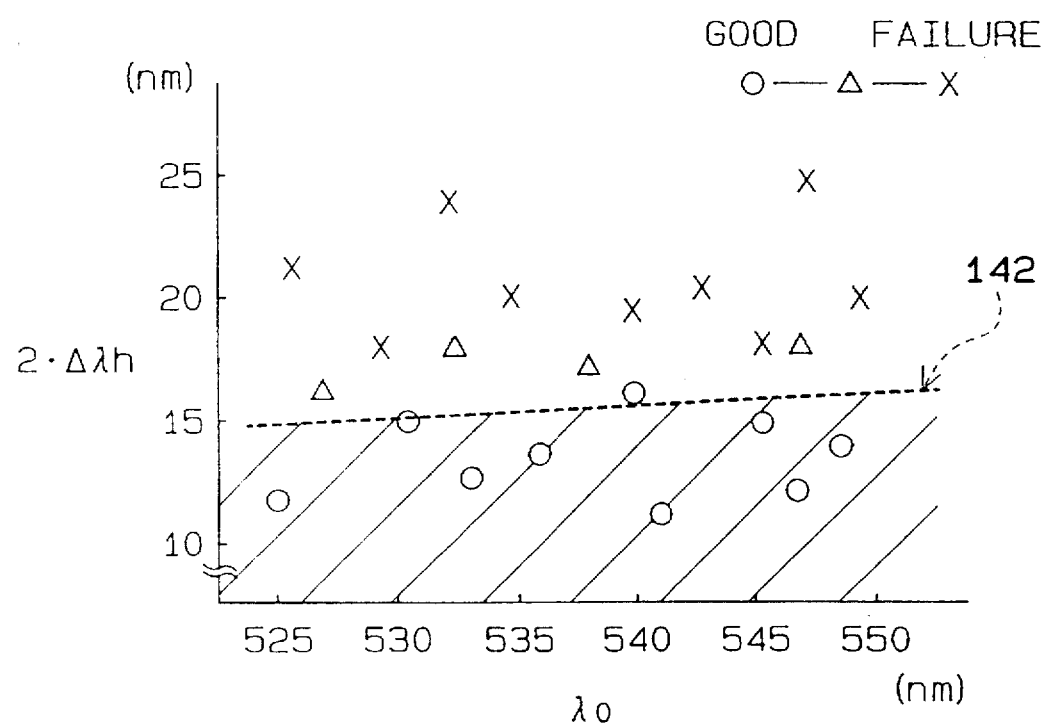
FIG. 36 is a distribution diagram of the results of another functional test of the display image of the heads-up display unit according to an eleventh embodiment.

As is clear from FIG. 36, all the hologram samples under the line 142 which satisfy the condition in the ninth embodiment ($\Delta\theta_h \leq 0.33°$) exhibit good results, whereas most of those not satisfying this condition (above the curve 142) are defective.

Similar results were obtained also for the other systems as a result of functional tests.

(Twelfth embodiment)

Yet another functional test was carried out as a twelfth embodiment. The results are shown in FIG. 37.

Figure 37:
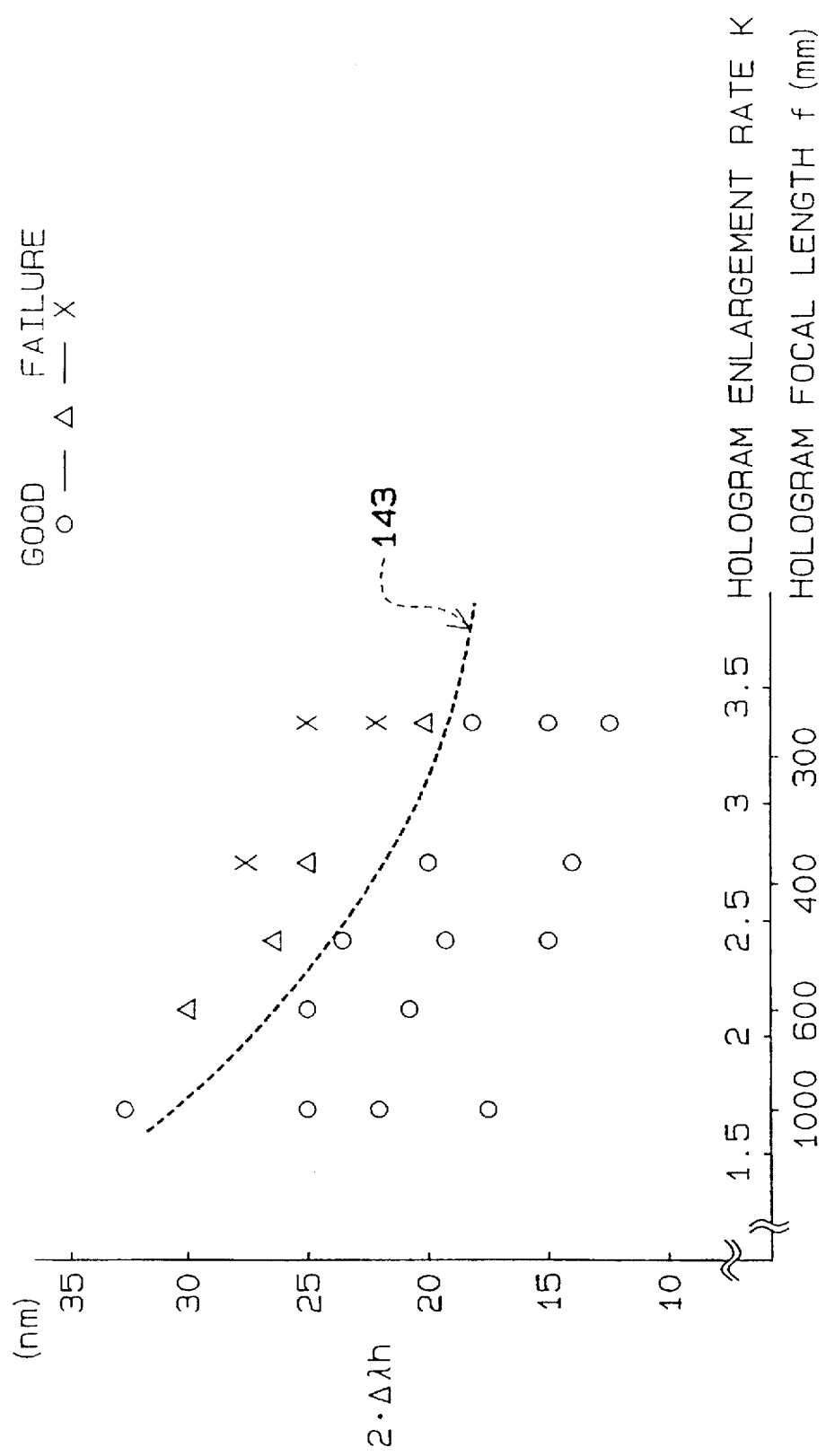
FIG. 37 is a distribution diagram of results of another functional test of the display image of the heads-up display unit according to a twelfth embodiment.

FIG. 37 represents plots of the test results obtained by fixing distance b between hologram 110 and virtual image 145 to 650 mm and hologram 110 width d to 90 mm, and changing the combination of hologram focal length f and distance a between the hologram and the display device 2 and the enlargement ratio K of the hologram (near the wavelength $\lambda_0$=540 nm).

As can be seen in FIG. 37, all samples falling within the region under the curve 143 satisfy the condition of the ninth embodiment ($\Delta\theta_n \leq 0.33°$) and show good results. Those not satisfying this condition (above the curve 143) are generally unacceptable.

Similar results were also obtained for the other systems as a result of functional tests.

According to the ninth to twelfth embodiments, there is provided a heads-up display unit which never causes the blurring of the display image throughout the entire hologram surface even at an enlargement ratio of over twice that of the display image in the hologram.

While gelatin bichromate was used as the photosensitive material for the hologram dry plate in the ninth embodiment, such other materials as photopolymer and polyvinyl carbazole are also applicable.

Figure 38:
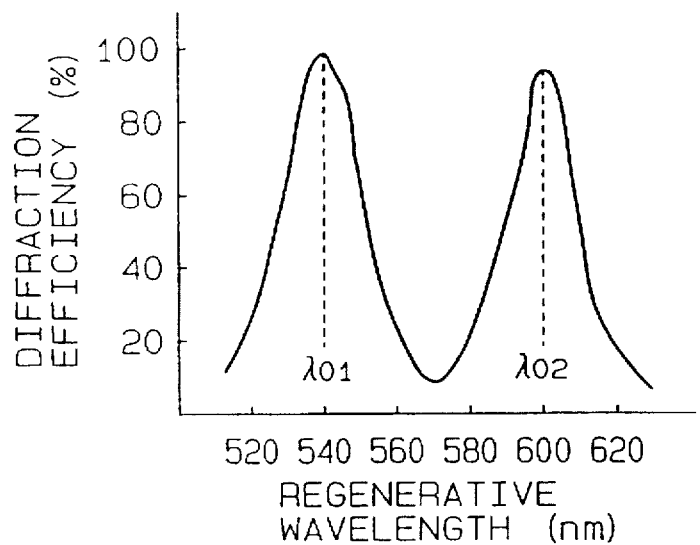
FIG. 38 is a characteristic diagram illustrating the wavelength characteristics of a polychroic hologram.

The hologram in the ninth embodiment has only one maximum wavelength of diffraction efficiency as shown in FIG. 33, i.e., a monochrome hologram. A satisfactory hologram may also be obtained from a bichromic hologram having two maximum wavelengths of diffraction efficiency as shown in FIG. 38, by applying the same condition ($\Delta\theta_h \leq 0.33°$) to the individual maximum wavelengths $\lambda_{o1}$ and $\lambda_{o2}$.

Although an off-axis parabolic mirror was recorded on the hologram as the concave mirror in the ninth to twelfth embodiments, any other non-spherical mirror giving a slight aberration may be recorded.

In the ninth to twelfth embodiments, the concave mirror was recorded on the hologram by the application of the two-beam method, where two beams were used for exposure and parallel and dispersed rays entered the hologram dry plate, one from each side. It is possible to record the concave mirror by a single beam method which comprises, as shown in FIG. 39, applying a prism 146 onto the surface of the hologram dry plate 125 and a reflecting optical element 147 onto the other surface, causing rays to enter only from the surface side, and exposing the hologram by means of the direct rays 148 from the surface and the reflected rays 149 from the back of the reflecting optical element 171.

Figure 39:
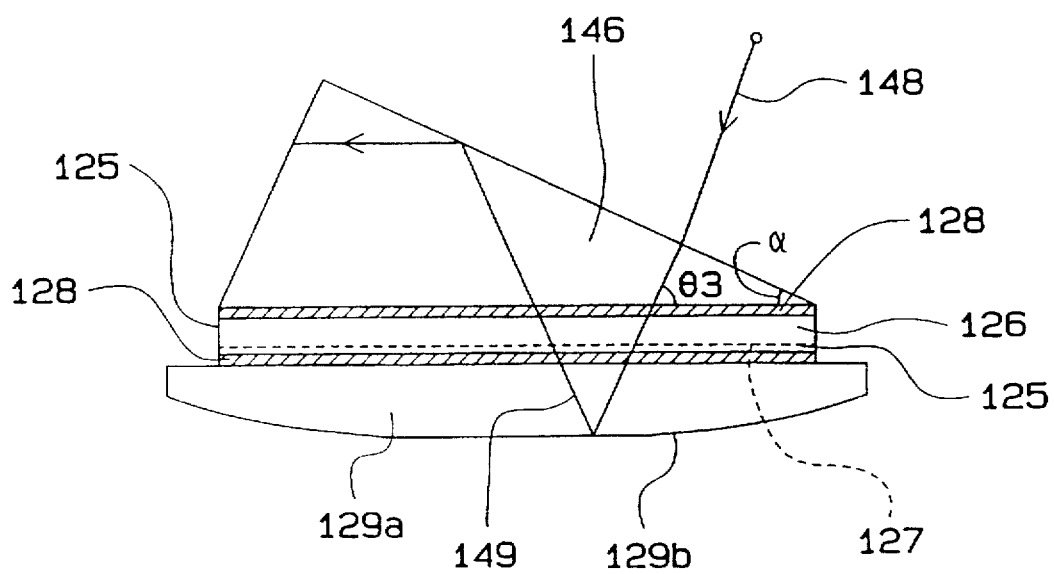
FIG. 39 is a descriptive view of another exposure process of the hologram for the heads-up display unit according to the twelfth embodiment.

In FIG. 39, 129b is a reflecting face of the reflecting optical element 147.

It is not always necessary to place main body 140 of the present apparatus directly under windshield 5 and to emit the image directly upward. Main body 140 may be installed slightly aslant at a position not directly under windshield 5.

While the hologram was located between the light source and the windshield in the ninth to twelfth embodiments, the hologram may be provided in the windshield section.

In FIG. 32, the light source is located on the center line of the hologram, but it suffices to set the hologram characteristics so that the light source forms an angular dispersion $\Delta\theta \leq 0.33°$ irrespective of horizontal shift.

(Thirteen embodiment)

Figure 40:
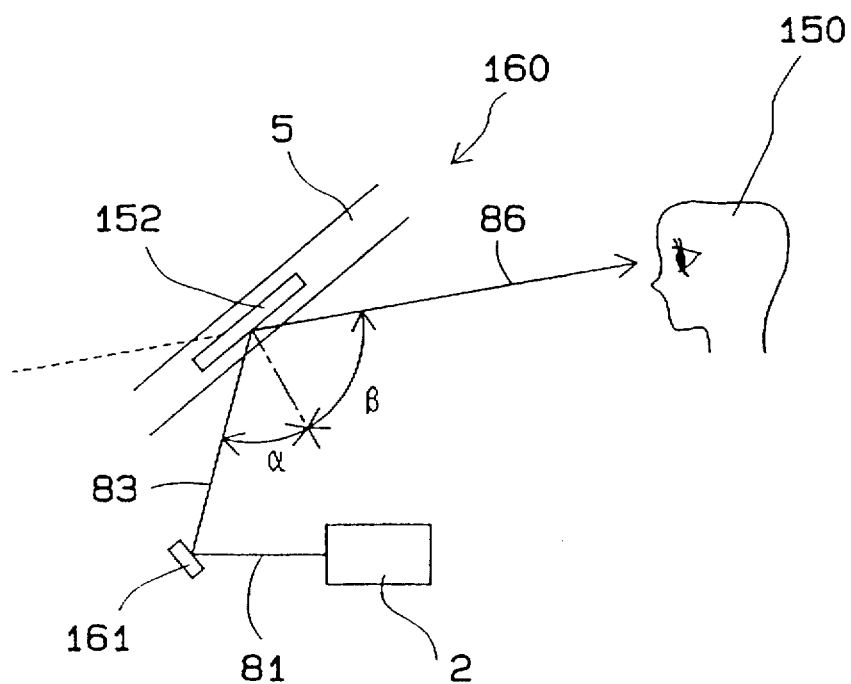
FIG. 40 is a configurational view of the heads-up display unit according to a thirteenth embodiment.

The image display unit in the thirteenth embodiment is illustrated in FIG. 40.

As shown in FIG. 40, the apparatus of the thirteen embodiment is heads-up display unit 160 having such a construction that display light 81 corresponding to a display image emitted from display device 2 is diffracted and reflected by main hologram 152, which is a hologram held in windshield 5 serving as display means in front of observer 150 who can visually interpret the display image formed by resultant reflected diffracted rays 86.

Hologram for correction 161, serving as reflecting means, is disposed in the first stage of main hologram 152. This correcting hologram 161 has such diffraction characteristics that it offsets the changes in diffraction and reflection characteristics caused by forming and holding initially flat-shaped main hologram 152 in the curved surface of windshield 5.

Figure 41:
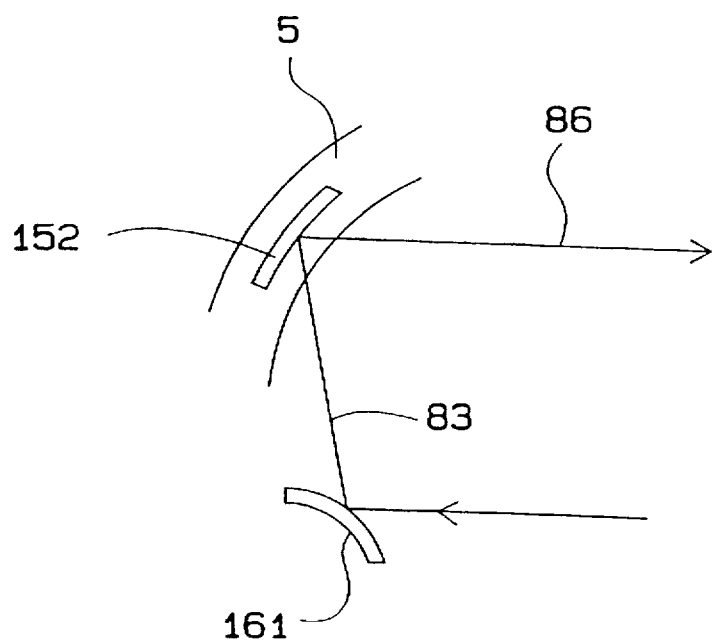
FIG. 41 is a descriptive view of a correcting hologram in the display unit according to the thirteenth embodiment.

As shown in FIG. 40, the main hologram 152 is held in windshield 5. Windshield 5 is curved as shown in FIG. 41, and main hologram 152 is accordingly curved.

Figure 42:
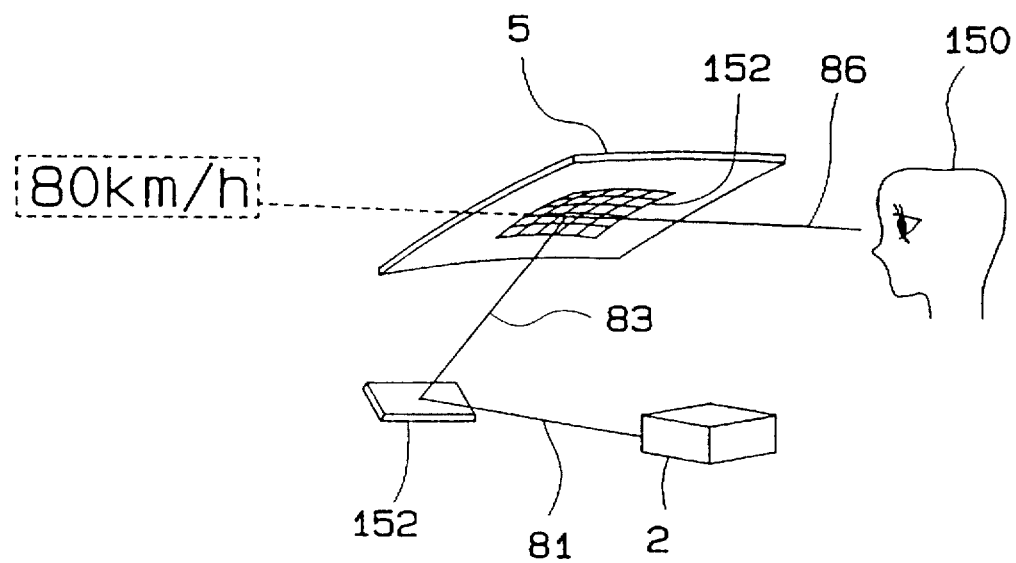
FIG. 42 is a configurational view of the heads-up display according to the thirteenth embodiment.
Figure 43:
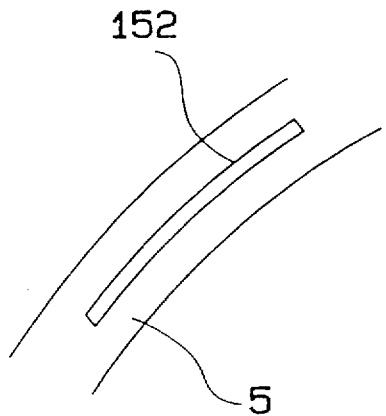
FIG. 43 is a sectional view of the holding state of a hologram onto a windshield of the heads-up display in the thirteenth embodiment.

More specifically, as shown in FIG. 42, while windshield 5 has a curved surface, hologram 152 provided in windshield 5 is produced with a flat shape. As a result, as shown in FIG. 43, main hologram 152 held in windshield 5 is bent by the curved surface of the windshield 5.

Figure 44:
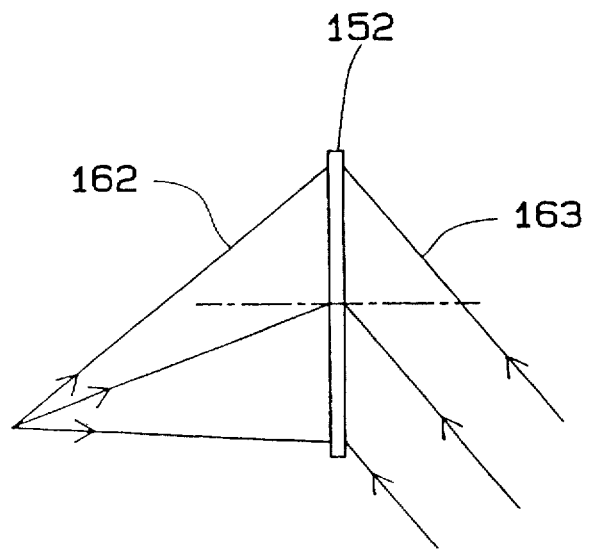
FIG. 44 is a descriptive view of the exposure process of a hologram in the thirteenth embodiment.

As shown in FIG. 44, main hologram 152 and correcting hologram 161 are flat, manufactured by irradiating object rays 162 and reference rays 163 to a flat photosensitive plate to form holograms 152 and 161.

Main hologram 152 has magnifying diffraction characteristics serving to enlarge and reflect diffraction rays 83. As shown in FIG. 40, angle of incidence $\alpha$ a of diffracted rays 83 is smaller than reflection angle $\beta$ of reflected diffracted rays 86 (i.e., $\alpha < \beta$).

Correcting hologram 161 is a reflecting type hologram which diffracts and reflects display light 81 emitted from display device 2. More particularly, display light 81 emitted from display device 2 is diffracted and reflected by correcting hologram 161 and main hologram 152, and then reflected light 86 reaches the eyes of observer 150 where it forms an image.

When main hologram 152 has the diffraction and reflection characteristics of a flat mirror, and windshield 5 has a curved concave surface to diffracted rays 83 as shown in FIG. 41, correcting hologram 161 has such diffraction and reflection characteristics as to offset the changes in characteristics caused by the curved surface of main hologram 152.

Correcting hologram 161 may have the above-mentioned correcting function in addition to an enlarging function as in main hologram 152. This permits further increases in the enlargement ratio of the display image.

In the heads-up display 160 of the thirteenth embodiment, as described above, no distortion is produced in the display image recognized by observer 150, since the changes in characteristics caused by the curvature of main hologram 152 have been corrected by correcting hologram 161. Both holograms 152 and 161 can be easily manufactured as flat-shaped holograms as shown in FIG. 44, giving an excellent production yield.

According to the thirteenth embodiment, as described above, there is provided a heads-up display which causes no distortion in the display image viewed by the observer even when a flat manufactured hologram is deformed and held in the curved windshield.

By adopting the thirteenth embodiment, as described above, even when manufacturing the main hologram in a flat shape as shown in FIG. 44, and subsequently deforming it by placing it in the curved display screen, changes in its characteristics caused by such a deformation can be offset by the correcting hologram.

Therefore, no distortions are caused in the display image.

According to the thirteenth embodiment, as described above, there is provided an image display unit which does not cause distortion of the display image even when a flat-manufactured hologram is deformed and held in a curved display screen such as a windshield.

(Fourteenth embodiment)

Figure 45:
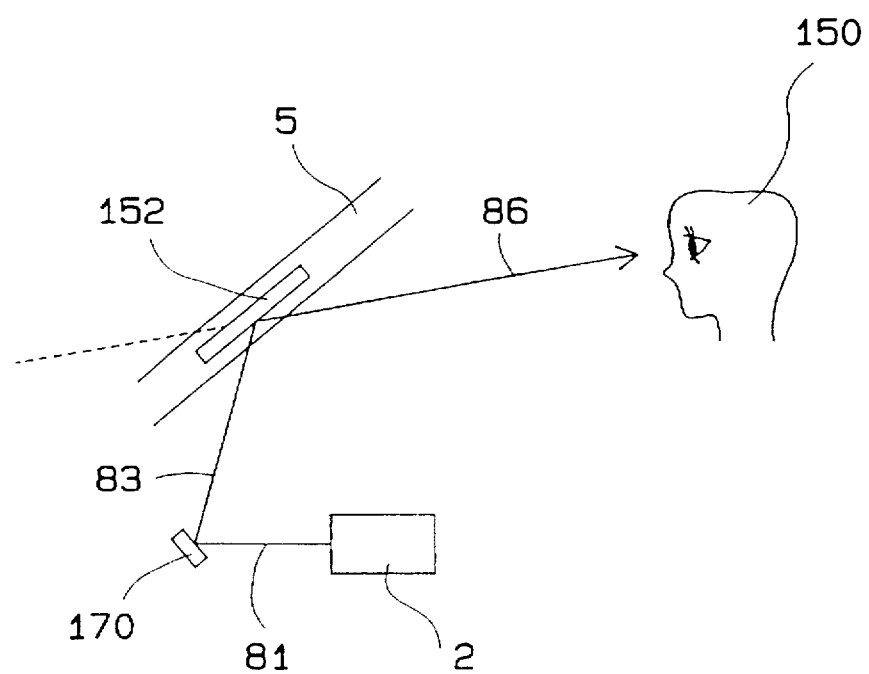
FIG. 45 is a configurational view of the image display unit according to a fifteenth embodiment.

The image display unit of the fourteenth embodiment is shown in FIG. 45.

The image display unit of the fourteenth embodiment is substantially the same as the image display unit of the thirteenth embodiment, and the same reference numerals are used for the same component parts.

In the fourteenth embodiment, a hologram different from correcting hologram 161 is adopted as the reflecting means.

Main hologram 152 has curved surface portions which vary with the direction to match the curvature windshield 5, the curvature of which varies with the direction. Under the effect of curvature, the display image is distorted as compared with display light 81.

In the fourteenth embodiment, therefore, the construction is such that distortion of the display image is offset by adopting hologram 170 which has recorded the image of a concave mirror and serves as a reflecting means having different focal lengths in different directions.

That is, hologram 170 has the same characteristics as those of hologram 3 in the third embodiment.

The use of this construction makes available a display image free from distortion.

Hologram 170 is adopted as the reflecting means. A concave mirror having different focal lengths in different directions, not a hologram, can give similar effects.

While hologram 170, which has recorded therein a concave mirror having different focal lengths in different directions, is adopted as the reflecting means, a display image free from distortion is available by correcting the distortion of the display image caused by the curvature of the main hologram with the main hologram itself by recording such a concave mirror on the main hologram.

Furthermore, the distortion of the display image may be corrected by recording a concave mirror having different curvatures in different directions in both the main hologram and the hologram serving as a reflecting means.

(Fifteenth embodiment)

The image display unit of the fifteenth embodiment is substantially the same as the image display unit of the thirteenth embodiment, except that the hologram serving as the reflecting means records an off-axis concave mirror as in the first embodiment.

More particularly, in the image display unit shown in FIG. 45, the same characteristics as the reflection characteristics of an off-axis concave mirror set at substantially the same off-axis angle as the angle formed by the entering and emitting optical axes of the hologram are recorded by the hologram serving as the reflecting means.

By adopting a hologram serving as the reflecting means which records such an off-axis concave mirror, a display image free from distortion is available.

While a hologram recording an off-axis concave mirror is adopted in the fifteenth embodiment, a concave mirror itself may be adopted as the reflecting means, and a display image free from distortion is available also by having the main hologram held in the windshield record the reflection characteristics of this concave mirror.

(Sixteenth embodiment)

The image display unit of the sixteenth embodiment has substantially the same construction as that of the image display unit of the thirteenth embodiment. In the sixteenth embodiment, however, the main hologram held in the windshield is substantially the same as that described in the fourth embodiment and has a non-spherical curved surface of which the curvature in the transverse direction, which is the first direction, is larger than that in the longitudinal direction, which is the second direction. In this embodiment, a toroidal concave mirror of which the curvature in a third direction, optically parallel to the first direction, is smaller than the curvature in a fourth direction, optically parallel to the second direction, is recorded by the correcting hologram.

By using this construction, it is possible not only to correct the distortion of the display image displayed by the main hologram, but also to obtain an enlargement function not conventionally available through the effective utilization of the curvatures of the main hologram.

Particularly, by optically achieving the reflection characteristics of a spherical concave mirror with the main hologram and the correcting hologram as a whole, it is possible to further improve the enlargement function.

While a hologram recording a toroidal concave mirror is adopted in the sixteenth embodiment, this is not limited to a hologram, but a toroidal concave mirror itself may be adopted for correction.

Furthermore, a toroidal concave mirror having the above-mentioned characteristics may be adopted as the main hologram itself. This means that a main hologram recording a toroidal concave mirror of which the curvature in the third direction optically parallel to the first direction (transverse) of the windshield is smaller than the curvature in the fourth direction optically parallel to the second direction (longitudinal) of the windshield may be adopted. In this case, the correcting hologram has only to have a simple reflection function by recording a flat mirror.

(Seventeenth embodiment)

The image display unit of the seventeenth embodiment has substantially the same construction as the image display unit of the thirteenth embodiment. In the seventeenth embodiment, however, the correcting hologram has the characteristics described in the fifth embodiment.

More specifically, as shown in FIG. 45, when the optical path length differs with the corresponding position between the main hologram and the hologram serving as the reflecting means, a longer optical path length between the main hologram and the hologram serving as the reflecting means leads to the recording of a magnifier having a longer focal length in the hologram serving as the reflecting means.

By adopting such a construction, a display image free from distortion is available even at a sufficiently large enlargement ratio, using the effects of both the hologram serving as the reflecting means and the main hologram.

Although a hologram is adopted as the reflecting means in the seventeenth embodiment, this is not particularly limited to a hologram in the present embodiment, but a magnifier having a longer focal length according to the optical path length between the main hologram and the reflecting means may be adopted.

A magnifier having a longer focal length according to the optical path length between the hologram and the main hologram may be adopted not as the hologram serving as reflecting means but as the main hologram held in the windshield. A magnifier having a longer focal length according to the optical path length between the hologram and the main hologram may be recorded in both the hologram serving as the reflecting means and in the main hologram.

(Eighteenth embodiment)

The eighteenth embodiment is characterized in that, in the image display unit shown in FIG. 45, the characteristics described in the ninth embodiment are recorded in the main hologram and/or a hologram serving as a reflecting means.

More specifically, the feature is that at least one of the holograms has a diffraction function of reflecting only a particular wavelength of the display light from the display device 2. If the maximum wavelength of the diffraction efficiency at which the diffraction efficiency of the diffraction function takes the maximum value η is $\lambda_0$, and if the half-value wavelength of diffraction efficiency at which the diffraction efficiency takes a value of 50% of the maximum value η is $\lambda_0 \pm \Delta\lambda_h$, then the angle θ formed by the entering light and the reflected light upon reflection of the display image at the end of the main hologram and/or the hologram serving as a reflecting means does not vary by over 0.33° due to the effect of the difference in wavelength Δh between the maximum wavelength $\lambda_0$ and the half-value wave-length $\lambda_0 \pm \Delta\lambda_h$.

By adopting the construction as described above, a satisfactory image free from blurring caused by the color aberration of the display image can be obtained, even when enlarging the display image by over two times using the main hologram and the hologram serving as a reflecting means.

(Nineteenth embodiment)

The nineteenth embodiment is a case where the distortion correcting function of the display image in the first to thirteenth embodiments is applied to a stand alone type heads-up display which is an image display unit.

Figure 46:
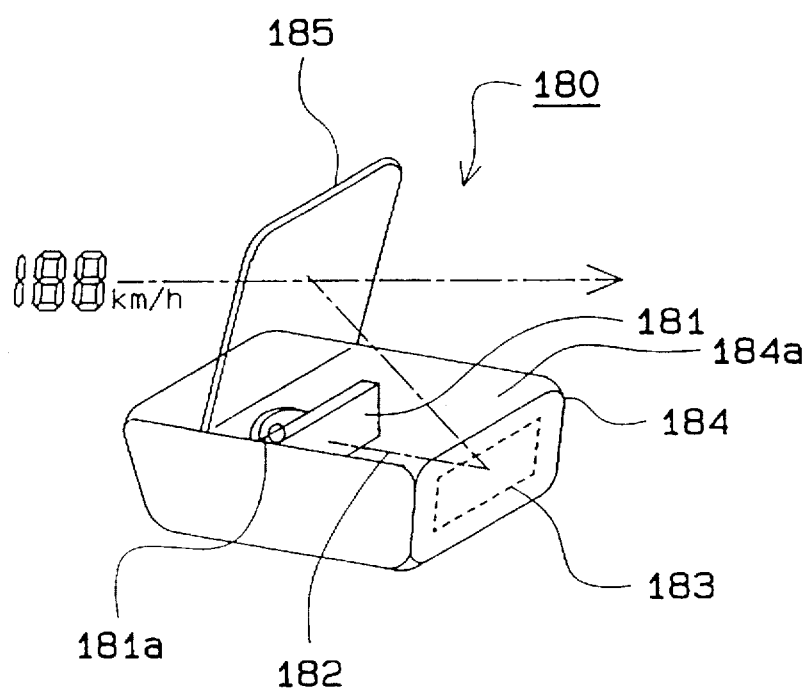
FIG. 46 is a configurational view of the image display unit according to a nineteenth embodiment.

This stand alone type heads-up display is illustrated in FIG. 46. In the case shown, the stand alone type heads-up display 180 is installed on the dashboard of a vehicle.

In heads-up display 180, a display image formed by display device 181 is emitted in the form of display light 182 by light source 181a. This display light is reflected by hologram 183 serving as a reflecting means. The reflected display light 182 passes through opening 184a formed in case 184 holding hologram 183. Subsequently, the light is radiated onto main hologram 185, and a display image is displayed by forming display light 182 into an image. Since the length of the optical path between hologram 183 and main hologram 185 varies at different positions, distortion is produced in the display image formed by the main hologram.

In the nineteenth embodiment, such distortion of the image is eliminated by the use of the means as described in the first to thirteenth embodiments to obtain a satisfactory display image free from distortion.

More specifically, when a concave mirror having different curvatures in different directions is recorded to provide the main hologram 185 with an enlarging function, the concave mirror of the hologram 183 may be caused to have different curvatures in different directions so as to eliminate these curvatures.

The concave mirror recorded in this case should preferably be an off-axis concave mirror.

If, in this case, the transverse (first direction) curvature of main hologram 185 is larger than the longitudinal (second direction) curvature, the curvature of hologram 183 in a third direction optically parallel to the first direction of the main hologram 185 may be smaller than the curvature in a fourth direction optically parallel to the second direction of main hologram 185.

As the optical path length between hologram 183 and main hologram 185 is longer, the hologram 183 or the main hologram or both holograms may accordingly have a longer focal length.

Furthermore, as in the ninth embodiment, the magnifier recorded in hologram 183 or main hologram 185 may have special characteristics.

By adopting the above-mentioned means, a clear display image free from distortion is available by means of the main hologram 185.

While hologram 183 is adopted as a reflecting means in the nineteenth embodiment, a hologram is not required. Rather a flat mirror or a special convex mirror is a suitable alternative.

For main hologram 185 also, a concave mirror or a half mirror having similar reflecting characteristics may be adopted.

While gelatin bichromate is used as the material of the hologram in the nineteenth embodiment, a photopolymer or embossing technique may be adopted.

Although heads-up display 180 is installed on the dashboard of a vehicle in the nineteenth embodiment, it may be incorporated or attached by some other manner to the dashboard.

(Twentieth embodiment)

The twentieth embodiment covers a case where the distortion correcting function of a display image of the first to thirteenth embodiments described above is applied to a heads-up display sealed in a direct-projection to windshield type image display unit.

Figure 47:
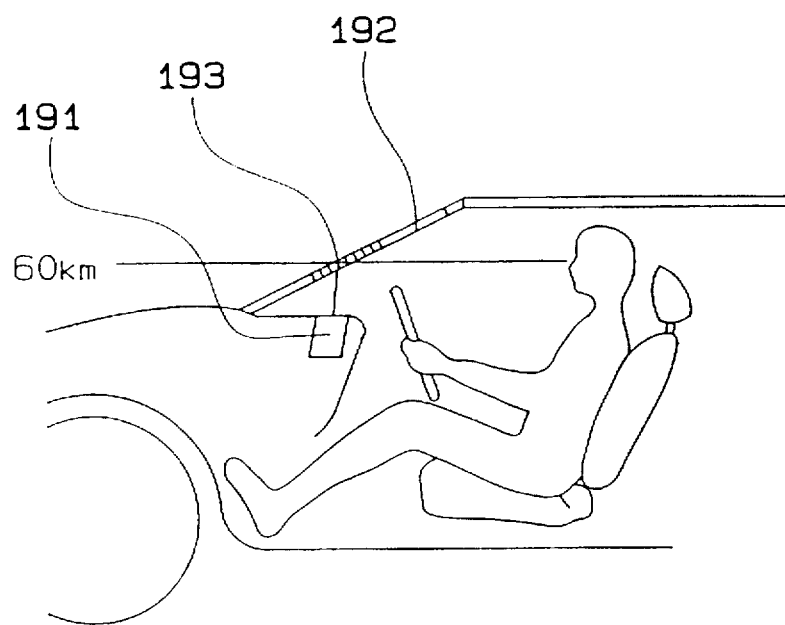
FIG. 47 is a configurational view of the image display unit according to a twentieth embodiment.

This direct-projection type heads-up display 190 is shown in FIG. 47.

In FIG. 47, 191 is a display device serving as display image forming means, 192 is a windshield, and 193 is a hologram, having different focal lengths in different directions, held within the windshield.

In this case, hologram 193 has characteristics applicable in the first to thirteenth embodiments. More specifically, hologram 193 may record the off-axis concave mirror described in the first embodiment.

This hologram 193 may record a concave mirror having different curvatures for different directions so as to offset the curvatures of the windshield 192.

When the curvatures are different for different directions, the curvature in a third direction of the hologram optically parallel to the transverse (first) direction of the windshield may be smaller than the curvature in a fourth direction of the hologram optically parallel to the longitudinal (second) direction of the windshield.

Hologram 193 may have a longer focal length according to the optical path length between the hologram 193 and the display device 191. Also, hologram 193 may have the reflecting characteristics described in the ninth embodiment.

By adopting such a structure, a satisfactory display image free from distortion, even when the image is suitably enlarged, is available.

(Twenty-first embodiment)

The twenty-first embodiment covers a case where the distortion correcting function of the display image in the first to thirteenth embodiments is applied to a heads-up display of the attached rear-view mirror type. This rear-view mirror attached type heads-up display 195 is shown in FIG. 48.

Figure 48:
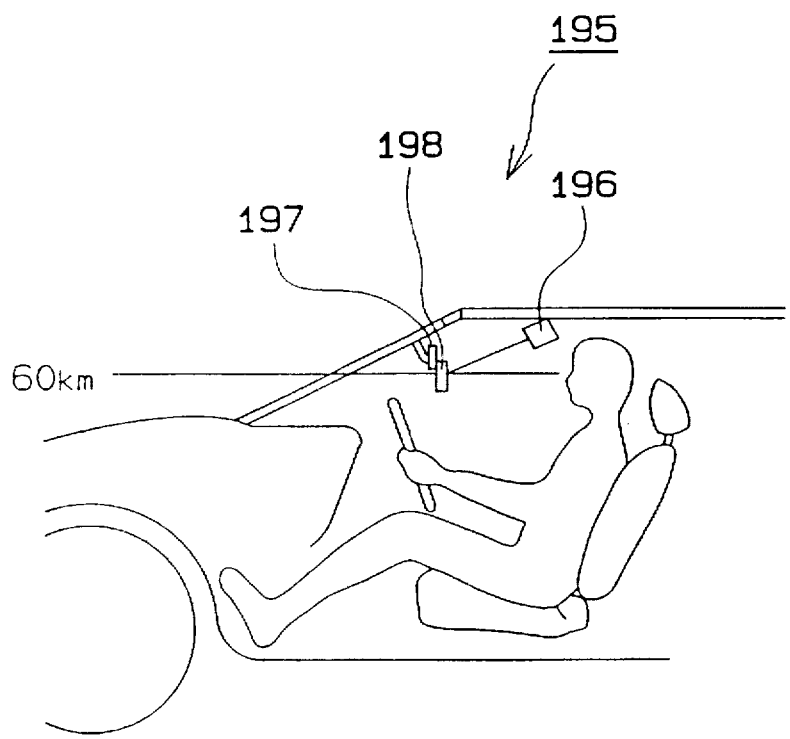
FIG. 48 is a configurational view of the image display unit according to a twenty-first embodiment.

In FIG. 48, 196 is a display device serving as a display image forming means, 197 is a rear-view mirror located in the vehicle's driving compartment and 198 is a hologram serving as a display means attached to the rear-view mirror 197.

In this case, hologram 198 is provided with an image forming function, an enlargement function, and a correcting function by having the characteristics applied in the first to thirteenth embodiments. More specifically, hologram 198 may record the off-axis concave mirror described in the first embodiment.

Hologram 198 may have a longer focal length according to the optical path length between hologram 198 and display device 196. Hologram 198 may have the reflecting characteristics described in the ninth embodiment.

By adopting the structure described above, a satisfactory display image free from distortion is available even when the image is suitably enlarged.

Although a hologram is adopted as the display means in the twenty-first embodiment, it is not limited to a hologram, but may be a non-spherical concave mirror or a half mirror having the reflecting characteristics described above.

(Twenty-second embodiment)

The twenty-second embodiment covers an image display unit which makes available a satisfactory display image suitably enlarged at a distance within a compact installation space. More particularly, the twenty-second embodiment has as an object the solution of the following problems.

Figure 53:
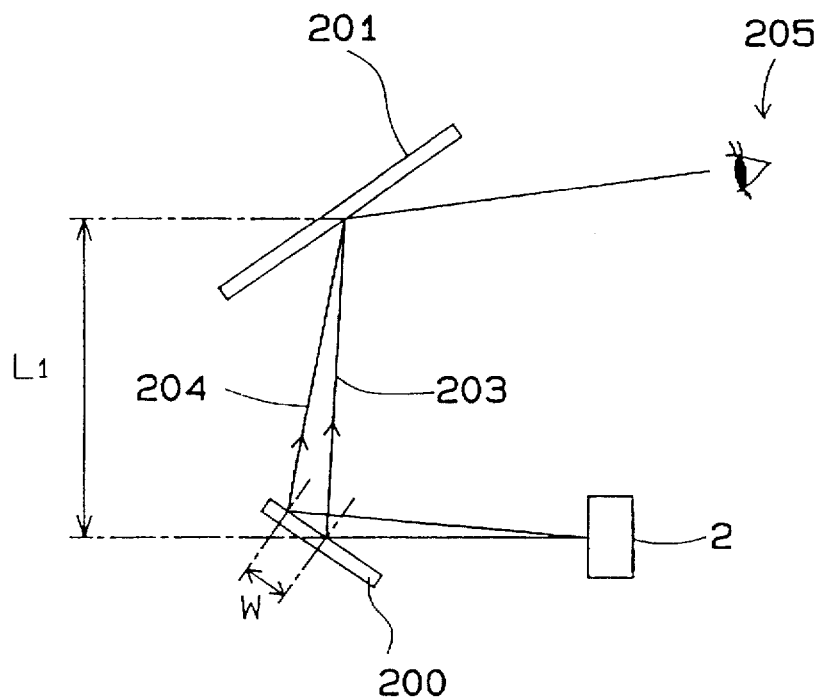
FIG. 53 is a descriptive view of the chromatic aberration correcting function by a hologram in the conventional heads-up display relative to the twenty-second embodiment.

As shown in FIG. 53, by adopting a hologram having a dispersion function as correcting hologram 200 and placing it opposite main hologram 201, which is the first hologram, color aberration can be corrected due to the effects of correcting hologram 200, which is the second hologram.

In this configuration, rays of different wavelengths 204 and 203 are diffracted and reflected by the main hologram 201, and then form an image near the eyes of observer 205 through the same optical path.

Figure 54:
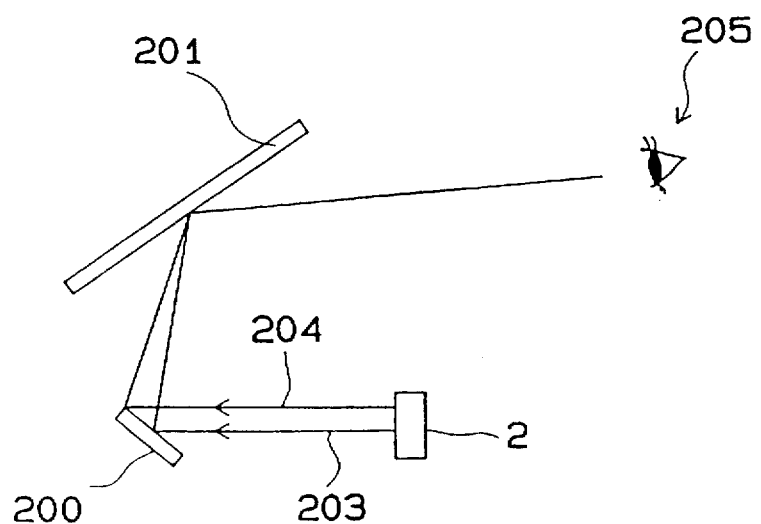
FIG. 54 is a descriptive view of the chromatic aberration of the conventional heads-up display relative to the twenty-second embodiment.

However, as the distance $L_1$ between holograms 200 and 201 becomes larger, the width w of the correcting hologram also becomes larger. As a result, as shown in FIG. 54, a color aberration phenomenon takes place, in which rays of different wavelengths 203 and 204 emitted from different sources pass through the same optical path and reach the eyes of the observer, and this causes blurring of the display image.

To solve this problem, the twenty-second embodiment is characterized in that both the main hologram and the correcting hologram are provided with an enlarging function, and the correcting hologram functions to correct color aberration.

Figure 49:
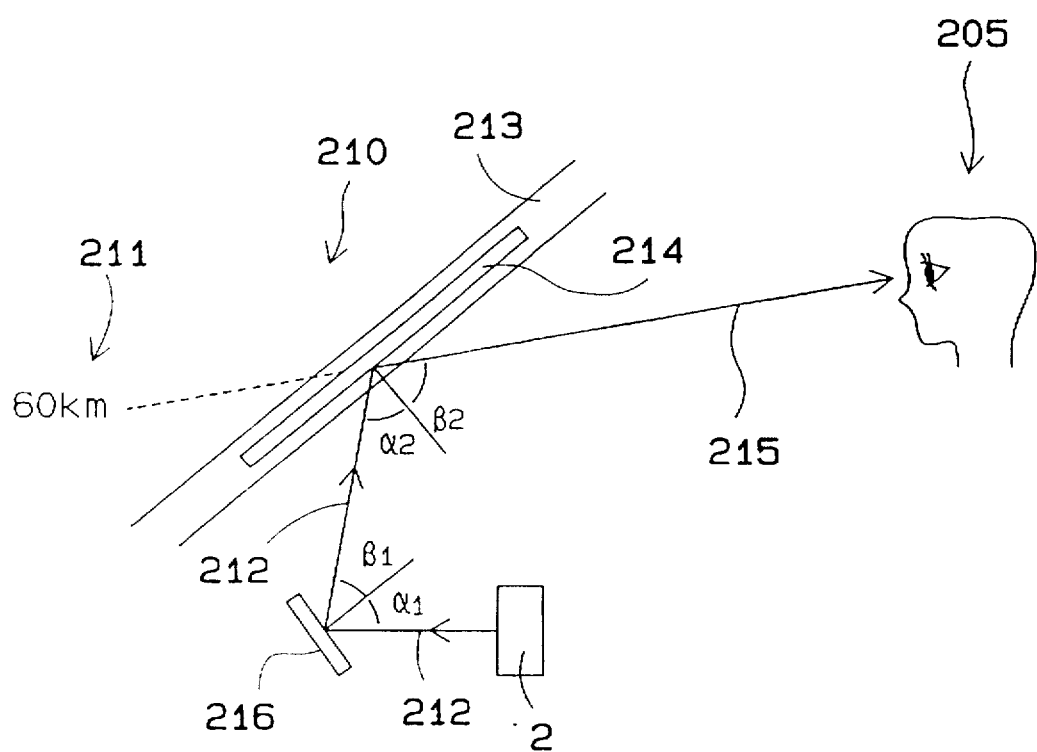
FIG. 49 is a configurational view of the image display unit according to a twenty-second embodiment.

FIG. 49 illustrates heads-up display 210 of the twenty-second embodiment.

In the twenty-second embodiment, display light 212 for formation of display image 211 is emitted from a display device 2, serving as a display image forming means. Display light 212 is diffracted and reflected by main hologram 214, which is the first hologram and located in windshield 213 in front of observer 205. Reproduced rays corresponding to the display image 211 are formed into an image so as to permit visual interpretation by observer 205.

Main hologram 214 has the diffraction and reflection functions of a magnifier which enlarges the image, and sub-hologram 216, being a second hologram, which is an optical element enlarging the image, is located in the first half of main hologram 214.

In addition to an image enlarging function, sub-hologram 216 has diffraction and reflecting functions so as to correct color aberration in main hologram 214.

In the heads-up display 210 of the twenty-second embodiment, display light 212 emitted from display device 2 is diffracted and reflected by sub-hologram 216 to main hologram 2 14. Display light 212 is diffracted and reflected by the main hologram and formed into an image so that reproduced light 215 corresponding to the display image reaches the eyes of observer 205.

Main hologram 214 is held within windshield 213 made of glass. Main hologram 214 is, as shown in FIG. 50, a hologram in which interference fringes are formed by radiating parallel reference rays 221 to one side and object dispersed rays 222 to the other side of photosensitive material 220.

Figure 50:
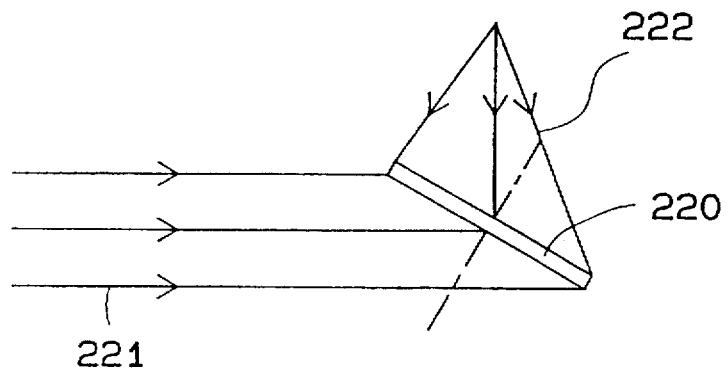
FIG. 50 is a descriptive view of the exposure process of a main hologram for the twenty-second embodiment.
Figure 51:
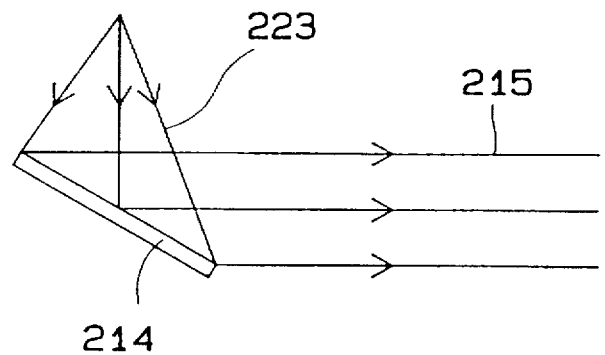
FIG. 51 is a descriptive view of a reproduction optical path of a main hologram according to the twenty-second embodiment.

As shown in FIG. 51, the reproduced rays 215 which are parallel rays are available by causing dispersed rays 223 similar to object rays 222 shown in FIG. 50 to enter completed main hologram 214.

Figure 52:
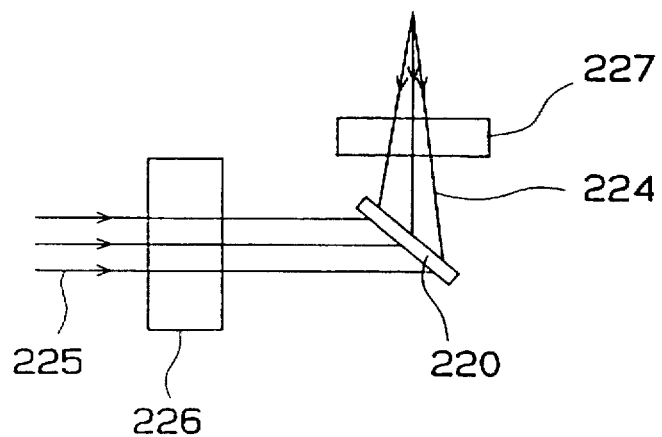
FIG. 52 is a descriptive view of the exposure process of a sub-hologram according to the twenty-second embodiment.

The exposure of the sub-hologram is similar to that shown in FIG. 50 in that object rays 224 which are dispersed rays and reference rays 225 which are parallel rays are used as shown in FIG. 52, but differ from the latter in that correcting optical elements 226 and 227 are arranged in the respective optical paths.

By operating using the correcting optical elements 226 and 227, sub-hologram 216 can have a function of offsetting the dispersion (color aberration) of main hologram 214 in addition to an image enlargement function.

Now, the functions and effects of the heads-up display 210 of the twenty-second embodiment are described below.

In the heads-up display of the twenty-second embodiment, both main hologram 214 and sub-hologram 216 have an image enlargement function. Display image 211 is enlarged in two stages by holograms 214 and 216. Therefore, by keeping the same spatial distance $L_0$ along the optical path between the display device 2 and main hologram 214, it is possible to display image 211 in a greatly enlarged form at a distance in front of observer 205.

A distant enlarged image is achievable by greatly reducing the above-mentioned spatial distance $L_0$. It is therefore possible to achieve heads-up display 210 within a very compact space.

Hologram 216 may be provided with a sufficient color aberration correcting function relative to main hologram 214. Display image 211 is therefore a clear image free from color aberration.

According to the twenty-second embodiment, as described above, a heads-up display is provided which permits achievement of a distantly enlarged display image within a compact installation space and at the same time, makes available a clear display image who se color aberration is corrected.

More specifically, according to the twenty-second embodiment, it is possible, when the hologram and the optical element share the display image enlargement function, to greatly reduce the distance between the display device which is a display image forming means and the hologram as compared with that in the case where the optical element which is the second hologram does not have an enlargement function, and to reduce the width of the enlarging optical element (corresponding to w in FIG. 53).

It is also possible to configure the heads-up display within a compact space because the distance between the display device and the first hologram can be reduced.

When the first hologram is used as an enlarging optical element, a sub-hologram which is the second hologram can be provided with diffraction and reflecting functions to correct the color aberration of the main hologram, and as a result, the display image becomes even clearer.

More specifically, the heads-up display can be provided with a strong display image distant enlargement function while keeping both the distance $L_1$ between the main hologram 201 and the sub-hologram 200, and width w of the sub-hologram small as shown in FIG. 53. Consequently, the color aberration correcting function of the sub-hologram does not deteriorate as shown in FIG. 54.

According to the twenty-second embodiment, a heads-up display is provided, which is an image display unit for vehicles, which produces a satisfactory display image suitably enlarged at a distance within a compact space of installation.

(Twenty-third embodiment)

There is and has been a strong demand for downsizing the heads-up display which is an image display unit, and for this purpose, various restrictions are becoming necessary regarding the attachment angle of main hologram 214 which is the first hologram and sub-hologram 216 which is the second hologram, and the size of the hologram itself.

Because of these restrictions, as described in the ninth embodiment, color aberration becomes a problem as a result of the difference in the angle of reflection at certain wavelengths of reproduced rays 216 and display rays 212, for some angle of incidence and some emitted angles of sub-hologram 216 and main hologram 214.

Taking these problems into consideration, the twenty-third embodiment is characterized in that the difference between the reflection angle caused by the respective wavelengths of the sub-hologram 216 and the main hologram 214 is mutually offset.

The twenty-third embodiment is described below with reference to FIG. 49.

The heads-up display of the twenty-third embodiment has substantially the same construction as that of the twenty-second embodiment, except however that the twenty-third embodiment is characterized by the positional relationship between sub-hologram 216 and main hologram 214.

More specifically, when it is assumed, in the sub-hologram, that the angle of incidence is $\alpha_1$, and the emission angle is $\beta_1$, and in the main hologram 214, the angle of incidence is $\alpha_2$ and the emission angle is $\beta_2$:

$$\alpha_1 + \beta_2 = \alpha_2 + \beta_1 \qquad (1)$$

Sub-hologram 216 and main hologram 214, which substantially satisfy Formula (1), are used.

By adopting the structure as described above, the difference in the angle of reflection caused by the respective wavelengths of sub-hologram 216 and main hologram 214 can be mutually offset, and the occurrence of color aberration can be prevented.

In the twenty-third embodiment, the above-mentioned effects are available even when sub-hologram 216 and main hologram 214 have an enlargement function.

(Twenty-fourth embodiment)

Figure 55:
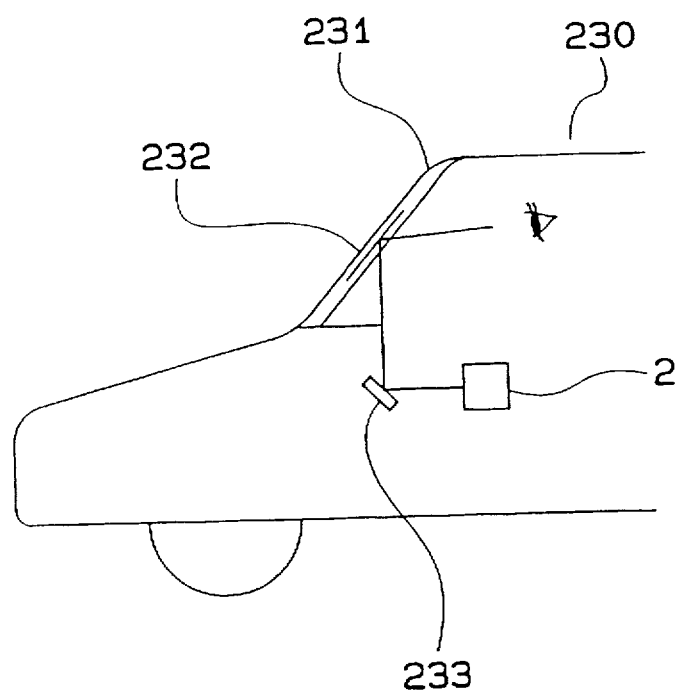
FIG. 55 is a configurational view of the image display unit according to a twenty-fourth embodiment.

For a vehicle 230 as shown in FIG. 55, the different shape of windshield 231 causes changes in the optical characteristics of main hologram 232. It is also necessary to alter the display distance or the display position, for example, which are display characteristics of the display image displayed by main hologram 232 for a different vehicle.

Altering the characteristics of the main hologram 232 between different vehicles is very difficult since the main hologram 232 is sealed within the windshield 231.

The twenty-fourth embodiment is therefore characterized by satisfying differing requirements between vehicles regarding the above-mentioned optical and display characteristics without altering main hologram 232.

More specifically, in the twenty-fourth embodiment, optical characteristics, display distance and display position are changed only by changing the reflection characteristics of sub-hologram 233, which serves as a reflection means.

(Twenty-fifth embodiment)

Figure 56:
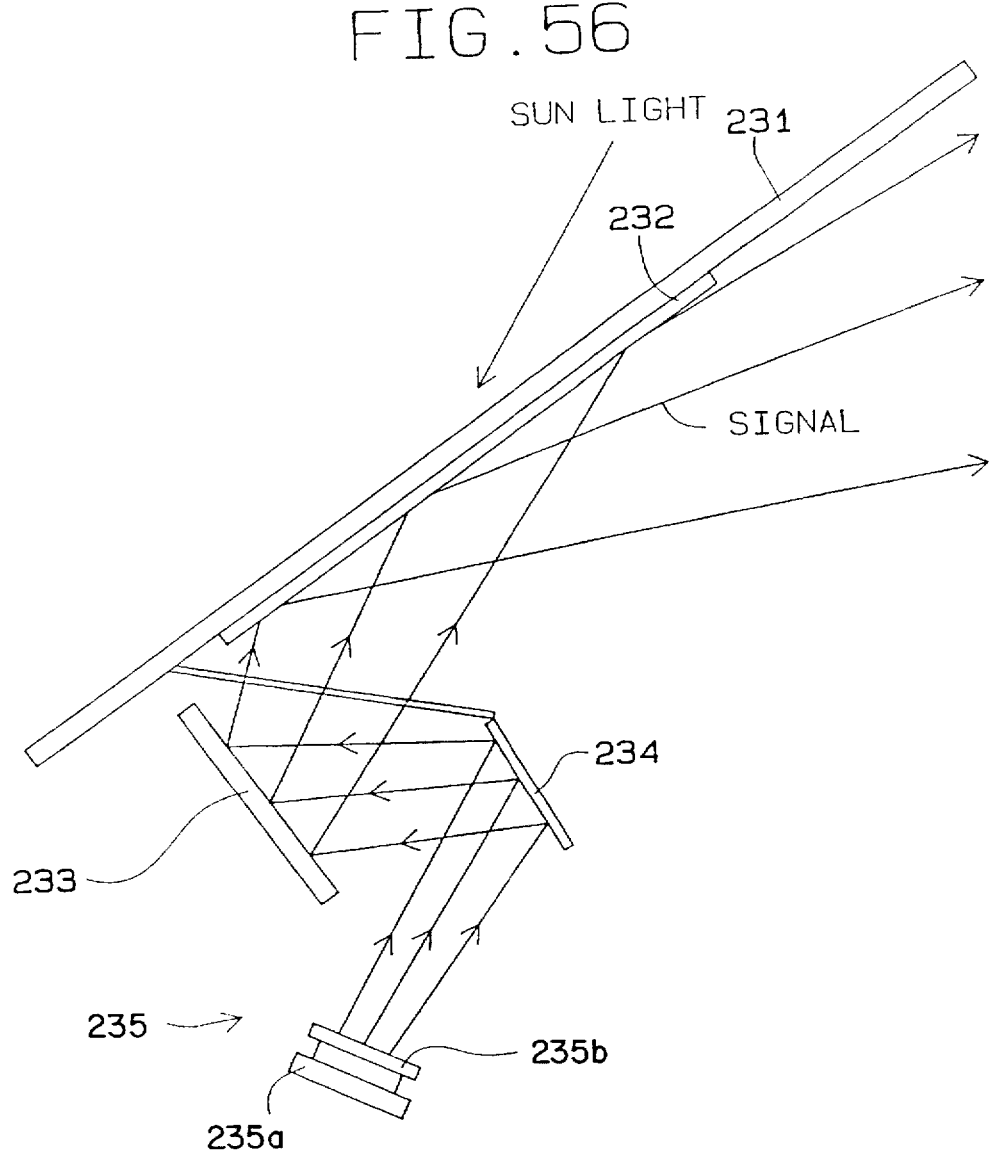
FIG. 56 is a schematic side view of a heads-up type hologram display unit for a vehicle according to a twenty-fifth embodiment.

FIG. 56 is a sectional view of the heads-up hologram display unit for a vehicle, which is an image display unit using the twenty-fifth embodiment.

This heads-up hologram display unit 230 has a construction as described below.

Half mirror 232 serving as display means is vapor-deposited on windshield 231. Hologram plate 233 serving as reflecting means is arranged under windshield 231. In front of hologram plate 233, a mirror 234 is arranged substantially in parallel with hologram plate 233. Under hologram plate 233, display section 235 serving as an image forming means is provided. Hologram plate 233, mirror 234 and display section 235 are housed in an instrument panel (not shown).

Display section 235 comprises a light source 235a, and a liquid crystal panel (a liquid crystal display section in the present invention) 235b arranged in front of the light source 235a.

The light source 235a is an electroluminescent panel (EL panel) having a ZnS:Tb-based electroluminescent element which has an emission spectrum with a center wavelength of 545 nm (green) and a half-value width of 18 nm, and a ZnS:Mn-based electroluminescent element which has an emission spectrum with a center wavelength of 585 nm (amber) and a half-value width of 22 nm. An input power of 5 W is supplied to achieve a luminance of 5,000 cd/m² (545 nm) and 4,500 cd/m² (585 nm).

Liquid crystal panel 235b is an ordinary one, having a liquid crystal film of a prescribed thickness between a pair of glass plates (not shown) arranged between a pair of polarization films (not shown) having a polarization direction differing from each other by 90°. By applying voltage between transparent electrodes (not shown) formed on both glass plates, the polarization angle of the liquid crystal film is controlled, and as a result, the light projected from light source 235a to liquid crystal panel 235b is space-modulated into signal rays. The signal rays representing a prescribed image corresponding to the signal voltage are reflected on the mirror 234 and enter hologram plate 233. The liquid crystal panel functions to display information such as speed, warnings, direction and maps.

Hologram plate 233 is now described in detail below with reference to FIG. 58.

Figure 58:
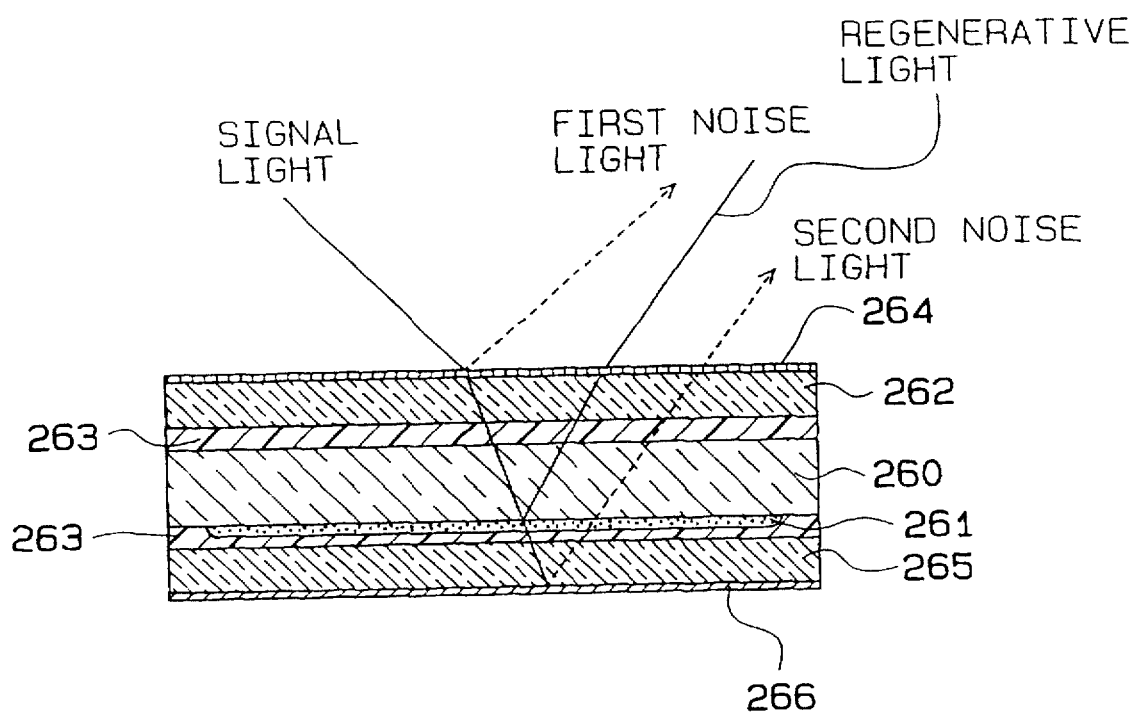
FIG. 58 is a sectional view of a hologram plate in FIG. 56.

In FIG. 58, 260 is a transparent glass substrate having large opposing surfaces. Hologram element 261 is attached to one of these surfaces. A concave lens comprising interference fringes is recorded in hologram element 261. The interference fringes have curvatures having different pitches of 290 nm and 320 nm as imparted by changing the angle of incidence of laser beam to the photo-sensitive agent.

In FIG. 58, 262 is a cover plate composed of transparent glass. One of the surfaces of cover plate 262 is attached to the surface of glass substrate 260 which is not attached to the hologram element 261 via a transparent humidity preventive sealing material 263. Reflection prevention film 264 is formed on the other surface of the cover plate 262.

In FIG. 58, 265 is a cover plate composed of a transparent glass plate. One of the surfaces of cover plate 265 is attached to the surface of glass substrate 260 facing the hologram element 261, via a transparent humidity-preventive sealing material 263. Scattering absorbing film 266 is formed on the other surface of cover plate 265.

Reflection-prevention film 264 may be formed on glass substrate 260 by omitting cover plates 262 and 265. The scattering-prevention film 266 may be formed on the other surface of cover plate 265.

Next, the method of preparing the hologram element 261 is described.

The preparation method comprises first applying gelatin bichromate (D.C.G.) as the photosensitive agent on the surface of glass substrate 260 into a thickness of 10 to 40 μm, and after gelation or drying, stabilizing the film in an atmosphere of about 50 RH % at 20° C. Then, a concave mirror as the magnifier is recorded using a laser beam of the above-mentioned two wavelengths in the photosensitive agent, and after development and drying, the assembly is held by sealing agent 263 between cover plates 261 and 263 for fixing.

Figure 59:
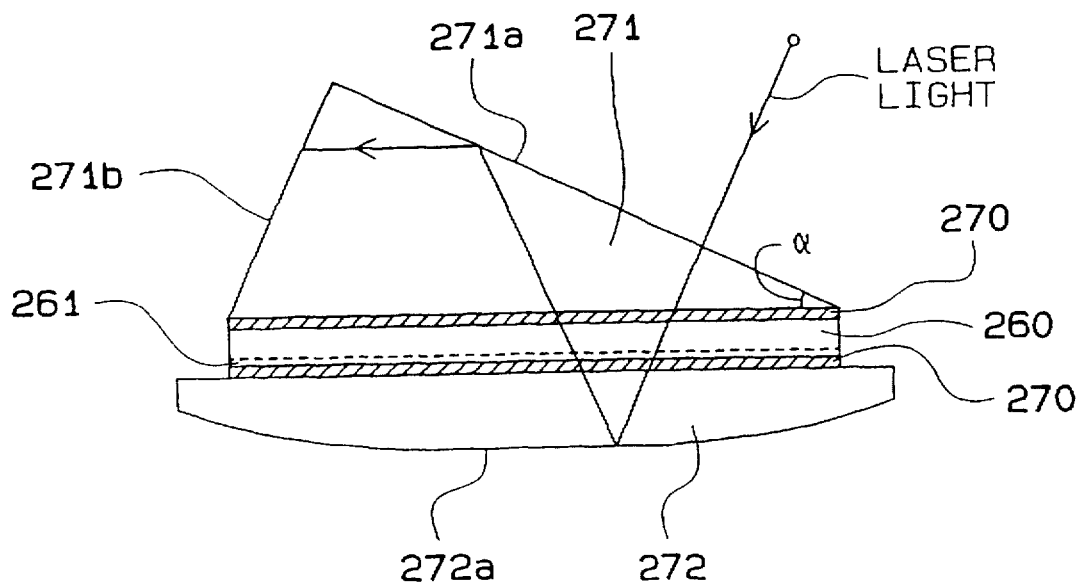
FIG. 59 is a sectional view illustrating the exposure process of a hologram element shown in FIG. 58.

The method of the above-mentioned recording is described below with reference to FIG. 59.

First, the glass substrate 260 already applied with the photosensitive agent is brought into close contact with a prism 271 and a concave lens 272 through silicone oil 270, which serves as a refractive index adjusting liquid to reduce changes in the refractive index.

Then, an argon-laser beam having a wavelength of 514.5 nm enters, as an incident ray, from the prism 271 side. After entrance, the laser beam travels straight toward concave lens 272, as the refractive index is uniform, and when the reflected rays reflected from reflecting film 272a formed on the open to air surface of concave mirror 272 passes through the photosensitive agent, interferes with the rays before reflection from concave mirror 272 after direct radiation from the laser beam, and forms interference fringes in the photosensitive agent.

Part of the reflected rays from concave mirror 272 pass through silicone oil 270 and substrate glass 260 and reenters prism 271. Part of the rays having re-entered are reflected on entering surface 271a of the prism 271.

Figure 60:
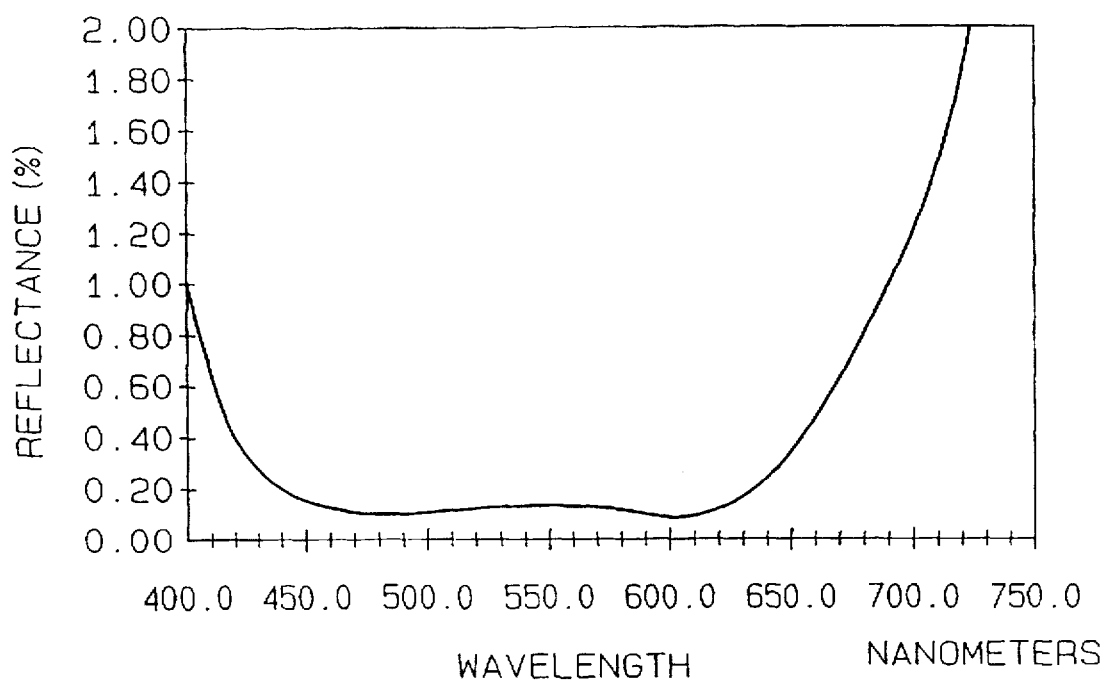
FIG. 60 is a reflectance-wavelength characteristic diagram of a reflection preventive film shown in FIG. 58.

As shown in FIG. 60, the angle α formed by entering surface 271a of prism 271 is appropriately set relative to the entering rays so that the rays reflected from entering surface 271a of prism 271 are not reflected again toward the photosensitive agent. In this embodiment, side 271b of prism 271 is coated black so as to absorb the rays reflected from entering surface 271a of prism 271.

An example of the exposure process is described below further detail.

A gelatin bichromate film as the photosensitive agent having a thickness of 25 μm was formed on glass substrate (comprising soda glass with a refractive index of 1.52) 260 having a size of 112 mm×46 mm×1.8 mm. The photosensitive agent was prepared by dissolving 0.6 g of ammonium bichromate in 100 ml of 4% gelatin solution, and had a refractive index of 1.55.

The glass substrate 260 coated with the photosensitive agent was held for 72 hours in a dryer containing a 50% RH atmosphere at 20° C.

Subsequently, an argon/laser beam having a wavelength of 514.5 nm was converted in the apparatus shown in FIG. 59 so that the reproduced rays ( with an angle of incidence of 33.5) had two colors at 540 nm and 600 nm, formed by slightly changing the angle of incidence. The photosensitive agent was exposed to a laser power of 500 mJ in total. Lens 272 had a focal length of 1,000 mm.

After exposure, glass substrate 260 was water-rinsed to totally eliminate color, and then immersed in a commercially available hard film fixing agent for photography (Rapid Fixer manufactured by Kodak) for ten minutes. After water rinsing, the substrate was immersed in a 90% isopropanol solution for ten minutes, and dried by hot air. Thereafter, the substrate was heat-aged for four hours at 150° C. to avoid changes in the wavelength when in actual operation in the vehicle.

Next, a cover plate (112 m×46 mm×1.0 mm) was prepared which was covered with a reflection-preventive film (made by Asahi Glass) having a visual reflectance of 0.2% prepared by laminating MgF$_2$ and TiO$_2$ having prescribed thicknesses alternatively in four layers.

Furthermore, another cover plate (112 m×46 mm×10 μm) 265 was prepared, which was covered with scattering-preventive film 266 having a thickness of 10 μm made by adding 5% black pigment (Glasslight 500 made by Cashu) to an epoxy resin.

Sealing agent 263 comprising an epoxy thermosetting resin (product name CS-2340-5, made by Cemedyne) and having a refractive index of 1.55 was applied to the surfaces of cover plates 262 and 265 to a thickness of 50 μm, and substrate glass 260 was held by cover plates 262 and 265 with the substrate there between.

The reproduced rays had wavelengths around 540 nm and 580 nm at an angle of incidence of signal rays of 30°, diffraction efficiencies of 92% (540 nm) and 90% (580 nm), and a spectral width at half the diffraction efficiency (below referred to a "half-value width") of 20 nm (540 nm) and 21 nm (580 nm).

The reflection characteristics of reflection-preventive film 264 are shown in FIG. 60.

Half mirror 232 was formed by vapor-deposition of a thin silver film.

Figure 57:
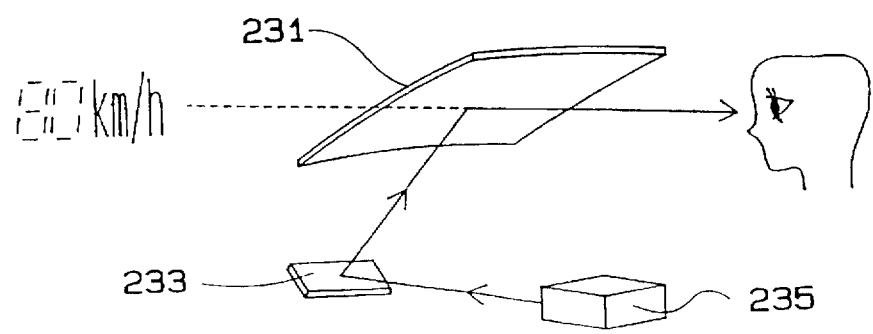
FIG. 57 is a schematic perspective view illustrating the operations of the apparatus shown in FIG. 56.

Now, operations of this apparatus are described below with reference to FIG. 57.

The two-color rays emitted from light source 235 are space-modulated by liquid crystal panel 235b. After reflection from mirror 234, the rays pass through the reflection-prevention film 264 of hologram plate 233, cover plate 262, and substrate glass 260, and are diffracted at hologram element 261. Thereafter, the rays follow the reverse route, are emitted upward from reflection-preventive film 264, reflected from half mirror 232 to go in the direction of observation, and finally visually interpreted by the driver as a virtual image displayed far in front of the windshield.

The following functions and effects are available in the twenty-fifth embodiment.

Figure 61:
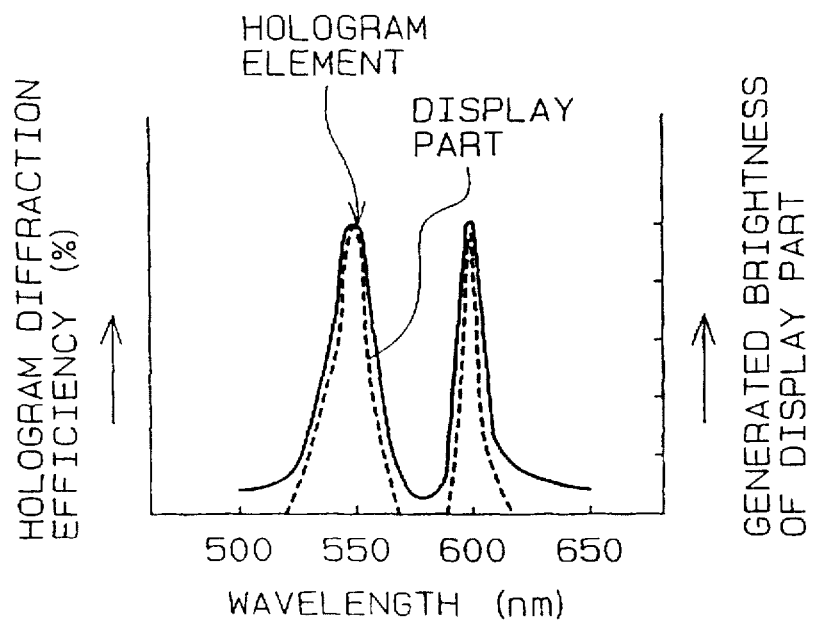
FIG. 61 is a spectral diagram showing the diffraction spectrum of the hologram element and the light emitting spectrum of the light source in the twenty-fifth embodiment.

First, in the twenty-fifth embodiment, the emission spectrum of light source 235a agrees with the diffraction spectrum of hologram element 261 of hologram plate 233, as shown in FIG. 61. Consequently, since light of a spectrum not associated with the above-mentioned diffraction (below referred to as the "unnecessary spectrum"), although emitted in light source 235a, is not emitted from light source 235a, the unnecessary spectrum does not enter liquid crystal panel 235b, without being absorbed by the liquid crystal panel 235b to heat the liquid crystal, thus alleviating many problems, including decreased contrast in the liquid crystal.

Furthermore, it is advisable that the diffraction peak value of hologram plate 233 and the wavelength of emission spectrum of the light source 235a have substantially the same peak wavelength values, and the wavelength range of upper and lower half-value wavelengths of the emission spectrum of light source 235a should preferably be within a range of ±30% of the wavelength range of the upper and lower half-value wavelengths of the diffraction spectrum of hologram plate 233.

The upper and lower half-value wavelengths indicate a wavelength range between the lower half-value wavelengths and the upper half-value wavelengths (spectral width), and being within a range of ±30% means that the sum of the difference in the lower half-value wavelength between the light source and the hologram plate and the difference in the upper half-value wavelengths of both components is within ±30% relative to the range of the upper and lower half-value wavelengths of the diffraction spectrum of the hologram plate.

Since light of the unnecessary spectrum never passes through liquid crystal panel 235b, it is possible to prevent light of the unnecessary spectrum from being reflected by reflection-preventive film 264 of hologram plate 233, from being reflected by the half mirror 232, and thus from heading in the direction of observation.

As described above, reflection is minimized relative to the spectrum of the signal light to prevent reflection of the signal light from mirror 234 under the effect of reflection-preventive film 264, as described above. It has therefore stronger reflecting characteristics for light of the unnecessary spectrum other than the signal light. As a result, the SN ratio is reduced because part of the light of the above-mentioned unnecessary spectrum is reflected by the reflection-preventive film 264, and goes in the direction of observation as first noise light.

Even if light of the unnecessary spectrum should enter through reflection-prevention film 264 into the hologram plate 233, it is not diffracted at hologram plate 261, but is reflected on the surface of cover plate 265, for example, and can reduce the SN ratio of the signal light in the form of second noise light travelling in the direction of observation, as shown in FIG. 58.

According to the twenty-fifth embodiment, since the emission spectrum of light source 235a is in substantial agreement with the diffraction spectrum, containing almost no unnecessary light, it is possible to improve the SN ratio of the signal light, in addition to the prevention of heating of the liquid crystal, as described above.

Next, a few considerations are made on a case where sunlight enters hologram element 261 in substantially the reverse direction to the signal light, as shown in FIG. 56.

In this case, the spectral components of the sunlight are diffracted at hologram element 261, pass through the mirror 234, and enter liquid crystal panel 235b. Part of the spectral components are reflected on the surface of the liquid crystal panel 235b and go toward hologram plate 233 again.

However, it is possible to minimize the sunlight directed toward hologram plate 233, by providing a reflection-preventive film on the surface of liquid crystal panel 235b.

Because these unnecessary components accounting for most of the sunlight spectrum are not diffracted, however, by hologram element 261 of hologram plate 233, only a very slight amount of light enters the liquid crystal panel 235b through the mirror 234. Thus, the liquid crystal of the liquid crystal panel 235b is never heated.

According to the twenty-fifth embodiment, more specifically, it is possible to avoid most of the strong sunlight, 100,000 lux at noon in summer for example, from entering the liquid crystal panel 52 and heating it.

The third point is that the apparatus of the twenty-fifth embodiment has the advantage of reducing the above-mentioned second noise light.

In the twenty-fifth embodiment, the major part of the signal light from mirror 234 having entered hologram 233, or the sunlight again reflected, is absorbed by scattering absorbing film 266, because scattering absorbing film 266 and cover glass 265 are set to have substantially equal refractive indices.

In the twenty-fifth embodiment, furthermore, a halogen lamp is used as light source 235a, and color filters of a plurality of colors are simultaneously used to achieve a green+amber spectrum of the incident rays to liquid crystal panel 235b.

The liquid crystal panel 235b has, prior to the arrangement of color filters, an emission luminance of 35,000 cd/m$^2$ (power consumption: 15 Wh), and after arrangement an emission luminance of 14,000 cd/m$^2$ for the green spectral components, and 13,000 cd/m$^2$ for the amber spectral components. The surface of hologram plate 233 has a luminance of 3,000 cd/M$^2$ for the green spectral components, and 2,800 cd/m$^2$ for the amber spectral components.

It is needless to mention that a CRT or various other devices may be adopted as light source 235a.

Applicable materials for the scattering-prevention film include a synthetic resin binder such as melanine or acryl with a black pigment or the like added with a view to forming a film capable of absorbing the black or dark components of light.

So far as no problem is posed for durability and environment of use, the scattering-preventive film may be formed with black paint or tape. Applicable materials for the reflection-preventive film include $MgF_2$, $TiO_2$ and $ZrO_2$, formed into a single layer or combined into multiple layers.

A reflection-preventive film formed by dip-coating extra-fine $SiO_2$-based particles may be used.

(Twenty-sixth embodiment)

Figure 62:
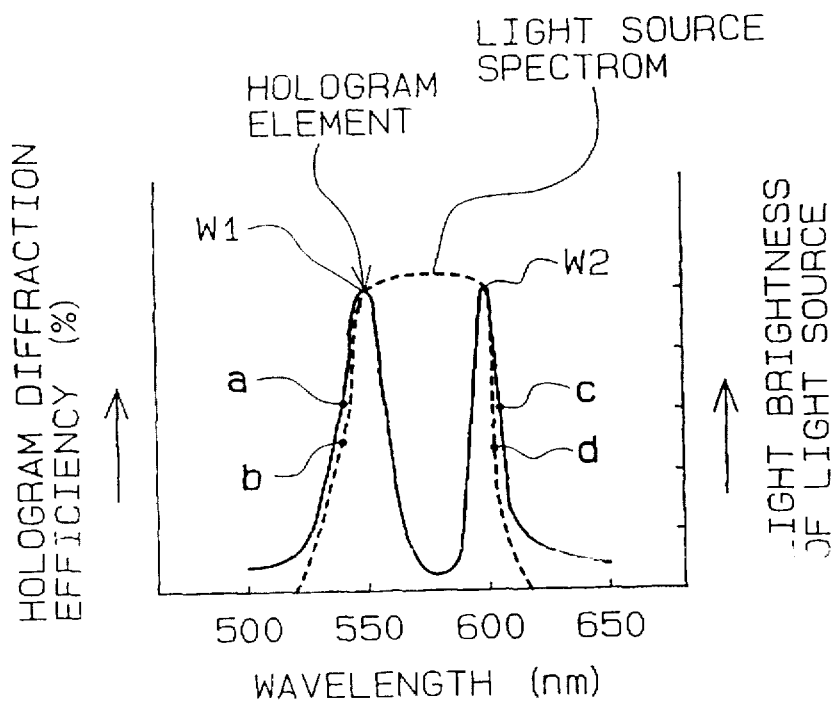
FIG. 62 is a spectral diagram illustrating the diffraction spectrum and the light source spectrum in the twenty-sixth embodiment.

The twenty-sixth embodiment is characterized in that, when using hologram plate 233 having a multiple-peak type (twin-peak type) diffraction spectrum, the light source spectrum has the characteristics shown in FIG. 62. More specifically, the light source in this twenty-sixth embodiment has a peak wavelength in the middle between peak wavelengths w1 and w2 of the diffraction spectrum.

The half-value width wavelength value b on the shorter wavelength side of the emission spectrum of the light source is kept within a range of ±30 nm relative to the half-value width wavelength value a on the shorter wavelength side of the peak spectrum on the shorter wavelength side of the diffraction spectrum of hologram plate 233. Similarly, the half-value width wavelength value d on the longer wavelength side of the emission spectrum of the light source is kept within a range of ±30 nm relative to half-value width wavelength value c on the longer wavelength side of the peak spectrum on the longer wavelength side of diffraction spectrum of the hologram plate 233. That is, agreement is attempted between the diffraction spectrum having a twin-peak type spectrum and the light source spectrum.

It is thus possible, as in the twenty-sixth embodiment, to prevent light having no relation to the diffraction spectrum from entering liquid crystal display section 235b, and to reduce the loss of the quantity of light through color filters as compared with the combination of color filters shown in FIG. 62.

Figure 63:
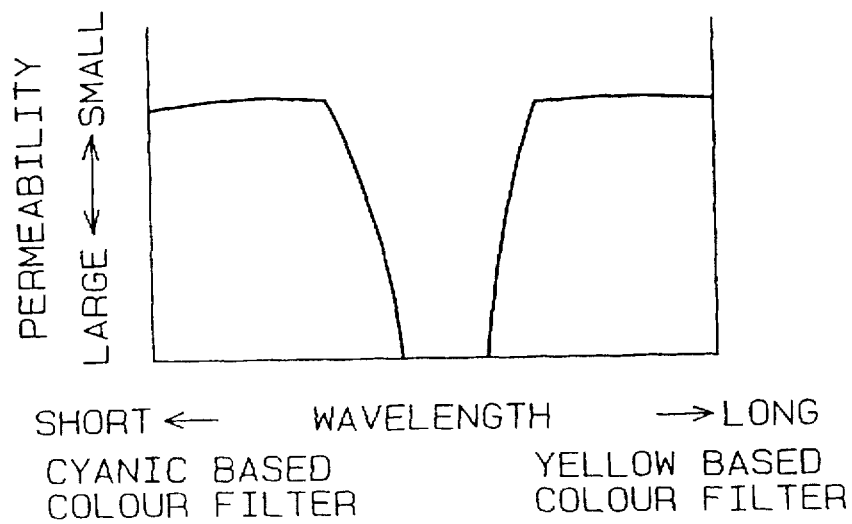
FIG. 63 is a transmission spectral diagram of color filters used in the twenty-sixth embodiment.

A typical design of the light source in the twenty-sixth embodiment is shown in FIG. 63.

This suggests the availability of the light source spectrum of FIG. 62 by treating white light from an incandescent lamp as the light source with cyanic and yellow color filters.

By adopting either of twenty-fifth or twenty-sixth embodiments, it suffices for the liquid crystal display section to project only rays within the wavelength range of the diffraction spectrum to the hologram plate, because the diffraction spectrum of the hologram plate is in a narrow band from the diffraction principle.

By setting the emission spectrum of the light source so as to be substantially equal to the wavelength range of the above-mentioned diffraction spectrum, therefore, it is possible to inhibit the deterioration of the image quality caused by an increase in temperature of the liquid crystal section, by reducing the amount of light entering the liquid crystal display section from the light source without affecting the quality of the signal light.

In the apparatus in which the hologram plate has multiple peak wavelengths of diffraction spectrum, the light source has a narrow spectrum having a peak wavelength in the middle between the multiple peak wavelengths of the above-mentioned diffraction spectrum. It is therefore possible to inhibit the deterioration of the image quality caused by increase in temperature of the liquid crystal display section and to simplify the design of the light source, by reducing the amount of light entering the liquid crystal display section from the light source as to the multiple- peak diffraction spectrum.

INDUSTRIAL APPLICABILITY

As described above, the image display unit of the present invention provides a display image free from distortion, and when applied to a heads-up display unit for a vehicle, can effectively provide a clear display image.

What is claimed is:

1. An image display unit comprising:

image forming means for forming a display image;

reflecting means for reflecting light emitted from said image forming means; and display means for forming said display image from light emitted from said image forming means and reflected by said reflecting means, said display means having a first curvature in a first direction and a second curvature in a second direction perpendicular to said first direction, said first curvature being smaller than said second curvature, wherein said reflecting means is provided between said image forming means and said display means, and has optical characteristics of a concave mirror with a curvature being larger than zero in any direction, said reflecting means having a third curvature in a third direction optically parallel to said first direction and a fourth curvature in a fourth direction optically parallel to said second direction, said third curvature of said reflecting means being larger than said fourth curvature thereof so as to offset distortion of said display image caused by said first and said second curvatures of said display means.

2. An image display unit according to claim 1, wherein said reflecting means is a hologram having recorded therein said optical characteristics of said concave mirror.

3. An image display unit according to claim 1, wherein said concave mirror is a toroidal concave mirror.

4. An image display unit according to claim 1, wherein said display means and said reflecting means together have optical reflecting characteristics of a spherical concave mirror.

5. An image display unit according to claim 1, wherein:

said reflecting means has a plurality of portions, each having a corresponding optical path length between said image forming means and said reflecting means, and a corresponding focal length in accordance with said optical path length, so that light reflected by said reflecting means has a plurality of focal points.

6. An image display unit according to claim 5, wherein said reflecting means is a hologram having said plurality of portions with said plurality of focal points recorded therein.

7. An image display unit according to claim 1, wherein:

said reflecting means has a diffraction function for reflecting only a particular wavelength of said light emitted from said image forming means, said diffraction function being such that when a maximum wavelength at which a diffraction efficiency of said reflecting means has a maximum value $\eta_m$ is $\lambda_0$, and when a half-value wavelength at which said diffraction efficiency has a value of one-half said maximum value $\eta_m$ is $\lambda_0 \pm \Delta\lambda_h$, a variation of an angle between an incident ray and an emitted ray of said reflecting means is less than 0.33° when light of said image display varies in wavelength $\Delta\lambda_n$ between said maximum wavelength $\lambda_0$ and said half-value wavelength $\lambda_0 \pm \Delta\lambda_h$.

8. An image display unit according to claim 1, wherein said display means comprises a windshield.

9. An image display unit according to claim 1, wherein said display means includes a hologram having an enlarging function for enlarging said display image.

10. An image display unit according to claim 1, further comprising an angle adjusting mechanism, on which said reflecting means is disposed, for adjusting an attachment angle of said reflecting means with respect to said display means.

11. An image display unit comprising:

image forming means for forming a display image;

reflecting means for reflecting light emitted by said image forming means; and display means for forming said display image from light emitted by said image forming means and reflected by said reflecting means, wherein said reflecting means is provided between said image forming means and said display means, and has a plurality of portions, each having a corresponding optical path length between said image forming means and said reflecting means, and a corresponding focal length in accordance with said optical path length, so that light reflected by said reflecting means has a plurality of focal points.

12. An image display unit according to claim 11, wherein said reflecting means includes a hologram having said plurality of portions with said plurality of focal points recorded therein.

13. An image display unit according to claim 11, wherein:

said reflecting means has a diffraction function for reflecting only a particular wavelength of said light emitted from said image forming means, said diffraction function being such that when a maximum wavelength at which a diffraction efficiency of said reflecting means has a maximum value $\eta_m$ is $\lambda_0$, and when a half-value wavelength at which said diffraction efficiency has a value of one-half said maximum value $\eta_m$ is $\lambda_0 \pm \Delta\lambda_h$, a variation of an angle between an incident ray and an emitted ray of said reflecting means is less than 0.33° when light of said image display varies in wavelength $\Delta\lambda_h$ between said maximum wavelength $\lambda_0$ and said half-value wavelength $\lambda_0 \pm \Delta\lambda_h$.

14. An image display unit according to claim 11, wherein said display means comprises a windshield.

15. An image display unit according to claim 11, wherein said display means includes a hologram having an enlarging function for enlarging said display image.

16. An apparatus for displaying an image comprising:

a display device which generates said image; and an optical element that receives light of said image from said display device and projects said light from said optical element, said optical element having a plurality of portions, each having a corresponding optical path length between said display device and said optical element, and a corresponding focal length in accordance with said optical path length, so that said light projected from said optical element has a plurality of focal points.

17. An apparatus according to claim 16, wherein said optical element has a diffraction function for reflecting only a particular wavelength of said light emitted from said display device, said diffraction function being such that when a maximum wavelength at which a diffraction efficiency has a maximum value $\eta_m$ is $\lambda_0$, and when a half-value wavelength at which said diffraction efficiency has a value of one-half said maximum value $\eta_m$ is $\lambda_0 \pm \Delta\lambda_h$, a variation of an angle between an incident ray and an emitted ray of said optical element is less than 0.33° when said light of said image varies in wavelength $\Delta\lambda_h$ between said maximum wavelength $\lambda_0$ and said half-value wavelength $\lambda_0 \pm \Delta\lambda_h$.

18. An apparatus according to claim 16, wherein said optical element includes a hologram having said plurality of portions with said plurality of focal points recorded therein, respectively.

19. An apparatus according to claim 18, wherein said hologram has optical characteristics of a mirror.

20. An apparatus according to claim 16, further comprising a windshield on which said optical element projects said light.

* * * * *